(12) United States Patent
Kitani et al.

(10) Patent No.: US 7,399,080 B2
(45) Date of Patent: Jul. 15, 2008

(54) BI-ASPHERICAL TYPE PROGRESSIVE-POWER LENS AND METHOD OF DESIGNING THE SAME

(75) Inventors: Akira Kitani, Tokyo (JP); Yoshihiro Kikuchi, Tokyo (JP); Takashi Hatanaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 136 days.

(21) Appl. No.: 10/579,295

(22) PCT Filed: Nov. 29, 2004

(86) PCT No.: PCT/JP2004/017730

§ 371 (c)(1),
(2), (4) Date: May 30, 2006

(87) PCT Pub. No.: WO2005/066696

PCT Pub. Date: Jul. 21, 2005

(65) Prior Publication Data

US 2007/0182923 A1    Aug. 9, 2007

(30) Foreign Application Priority Data

Nov. 27, 2003  (JP)  ............................. 2003-398205
Nov. 27, 2003  (JP)  ............................. 2003-398243
Nov. 27, 2003  (JP)  ............................. 2003-398251
Dec. 3, 2003   (JP)  ............................. 2003-404539

(51) Int. Cl.
G02C 7/06   (2006.01)

(52) U.S. Cl. .................. 351/169; 351/161; 351/168; 351/177

(58) Field of Classification Search ................ 359/161, 359/168, 169, 177
See application file for complete search history.

(56) References Cited

U.S. PATENT DOCUMENTS

| 4,062,629 | A | * | 12/1977 | Winthrop | .................... 351/169 |
| 5,710,615 | A | * | 1/1998 | Kitani | .................... 351/169 |
| 2005/0110945 | A1 | | 5/2005 | Haimerl et al. | |

FOREIGN PATENT DOCUMENTS

| EP | 0 809 127 A1 | 11/1997 |
| EP | 1 510 852 A1 | 3/2005 |
| JP | A 47-23943 | 7/1972 |
| JP | A 57-10112 | 1/1982 |
| JP | A 6-118353 | 4/1994 |
| JP | A 9-90291 | 4/1997 |
| JP | A 10-123469 | 5/1998 |
| JP | A 10-206805 | 8/1998 |
| JP | A 2000-21846 | 1/2000 |
| JP | A 2000-227579 | 8/2000 |
| JP | A 2000-338452 | 12/2000 |
| JP | A 2001-021846 | 1/2001 |
| JP | A 2001-209012 | 8/2001 |
| JP | 2003344813 A | * 12/2003 |
| WO | WO 97/19382 | 5/1997 |
| WO | WO 97/19383 | 5/1997 |
| WO | WO 00/62116 A1 | 10/2000 |
| WO | WO 02/084382 A2 | 10/2002 |
| WO | WO 03/079095 A2 | 9/2003 |

* cited by examiner

*Primary Examiner*—Ricky L Mack
*Assistant Examiner*—James R Greece
(74) *Attorney, Agent, or Firm*—Oliff & Berridge, PLC

(57) ABSTRACT

To provide a bi-aspherical type progressive-power lens which provides an excellent visual acuity correction for prescription values and a wide effective visual field with less distortion in wearing, by reducing a magnification difference of an image between a distance portion and a near portion of a lens, and a method of designing the same.

A progressive action of a progressive-power lens is divided in the vertical direction and the horizontal direction of the lens and then an optimal sharing ratio between the front and rear two surfaces of the object side and the eyeball side is set in each direction to configure one bi-aspherical type progressive-power lens, a sharing ratio of a progressive action in the horizontal direction of a rear surface (eyeball side surface) is set higher so that an advantage of increasing the visual field in the horizontal direction can be obtained, a sharing ratio of a progressive action in the vertical direction of a front surface (object side surface) is set higher so that a disadvantage of increasing an eyeball turning angle between the distance and near portions in the vertical direction can be restrained, also a wide effective visual field with less distortion in wearing can be provided by reducing a magnification difference of an image between the distance portion and the near portion on the progressive-power lens, further making it possible to obtain a bi-aspherical type progressive-power lens capable of reducing a machining time and cost by making it possible to machine only the surface of an eyeball side as a bilaterally asymmetrical curved surface coping with a convergence action of an eye in near vision after receiving an order, by using "bilaterally symmetrical semi-finished product" as an object side surface of the progressive refractive power lens.

24 Claims, 65 Drawing Sheets

FIG. 7

| TABLE 1-1 | DVf1 | DHf1 | DVn1 | DHn1 | DVf2 | DHf2 | DVn2 | DHn2 |
|---|---|---|---|---|---|---|---|---|
| PRIOR ART EXAMPLE A (CONVEX SURFACE PROGRESSION) | 4.00 | 4.00 | 7.00 | 7.00 | 4.00 | 4.00 | 4.00 | 4.00 |
| PRIOR ART EXAMPLE B (DOUBLE SURFACE PROGRESSION) | 4.75 | 4.75 | 6.25 | 6.25 | 4.75 | 4.75 | 3.25 | 3.25 |
| PRIOR ART EXAMPLE C (CONCAVE SURFACE PROGRESSION) | 5.50 | 5.50 | 5.50 | 5.50 | 5.50 | 5.50 | 2.50 | 2.50 |
| EXAMPLE 1 | 4.75 | 4.75 | 7.75 | 4.75 | 4.75 | 4.75 | 4.75 | 1.75 |
| EXAMPLE 4 | 5.50 | 4.00 | 8.50 | 4.00 | 5.50 | 4.00 | 5.50 | 1.00 |
| EXAMPLE 5 | 6.25 | 6.25 | 6.25 | 3.25 | 6.25 | 6.25 | 3.25 | 0.25 |
| EXAMPLE 6 | 8.50 | 4.50 | 6.50 | 4.50 | 6.50 | 4.50 | 3.50 | 1.50 |

| TABLE 1-2 | SMVf | SMVn | SMVfn | SMHf | SMHn | SMHfn |
|---|---|---|---|---|---|---|
| PRIOR ART EXAMPLE A (CONVEX SURFACE PROGRESSION) | 1.0087 | 1.1467 | 0.1380 | 1.0077 | 1.1092 | 0.1015 |
| PRIOR ART EXAMPLE B (DOUBLE SURFACE PROGRESSION) | 1.0104 | 1.1464 | 0.1360 | 1.0092 | 1.1080 | 0.0988 |
| PRIOR ART EXAMPLE C (CONCAVE SURFACE PROGRESSION) | 1.0120 | 1.1462 | 0.1342 | 1.0107 | 1.1068 | 0.0961 |
| EXAMPLE 1 | 1.0104 | 1.1446 | 0.1342 | 1.0092 | 1.1046 | 0.0954 |
| EXAMPLE 4 | 1.0120 | 1.1428 | 0.1308 | 1.0076 | 1.1028 | 0.0952 |
| EXAMPLE 5 | 1.0137 | 1.1438 | 0.1301 | 1.0123 | 1.1024 | 0.0901 |
| EXAMPLE 6 | 1.0143 | 1.1431 | 0.1288 | 1.0086 | 1.1042 | 0.0956 |

FIG. 8

| TABLE 2-1 | DVf1 | DHf1 | DVn1 | DHn1 | DVf2 | DHf2 | DVn2 | DHn2 |
|---|---|---|---|---|---|---|---|---|
| PRIOR ART EXAMPLE A (CONVEX SURFACE PROGRESSION) | 9.00 | 9.00 | 12.00 | 12.00 | 3.00 | 3.00 | 3.00 | 3.00 |
| PRIOR ART EXAMPLE B (DOUBLE SURFACE PROGRESSION) | 9.75 | 9.75 | 11.25 | 11.25 | 3.75 | 3.75 | 2.25 | 2.25 |
| PRIOR ART EXAMPLE C (CONCAVE SURFACE PROGRESSION) | 10.50 | 10.50 | 10.50 | 10.50 | 4.50 | 4.50 | 1.50 | 1.50 |
| EXAMPLE 2 | 9.75 | 9.75 | 12.75 | 9.75 | 3.75 | 3.75 | 3.75 | 0.75 |
| EXAMPLE 7 | 9.00 | 9.00 | 15.00 | 9.00 | 3.00 | 3.00 | 6.00 | 0.00 |

| TABLE 2-2 | SMVf | SMVn | SMVfn | SMHf | SMHn | SMHfn |
|---|---|---|---|---|---|---|
| PRIOR ART EXAMPLE A (CONVEX SURFACE PROGRESSION) | 1.1661 | 1.3936 | 0.2275 | 1.1452 | 1.2777 | 0.1325 |
| PRIOR ART EXAMPLE B (DOUBLE SURFACE PROGRESSION) | 1.1684 | 1.3961 | 0.2277 | 1.1487 | 1.2755 | 0.1268 |
| PRIOR ART EXAMPLE C (CONCAVE SURFACE PROGRESSION) | 1.1709 | 1.3989 | 0.2280 | 1.1523 | 1.2733 | 0.1210 |
| EXAMPLE 2 | 1.1683 | 1.3834 | 0.2151 | 1.1486 | 1.2685 | 0.1199 |
| EXAMPLE 7 | 1.1658 | 1.3724 | 0.2066 | 1.1451 | 1.2639 | 0.1188 |

FIG. 9

| TABLE 3-1 | DVf1 | DHf1 | DVn1 | DHn1 | DVf2 | DHf2 | DVn2 | DHn2 |
|---|---|---|---|---|---|---|---|---|
| PRIOR ART EXAMPLE A (CONVEX SURFACE PROGRESSION) | 1.00 | 1.00 | 4.00 | 4.00 | 7.00 | 7.00 | 7.00 | 7.00 |
| PRIOR ART EXAMPLE B (DOUBLE SURFACE PROGRESSION) | 1.75 | 1.75 | 3.25 | 3.25 | 7.75 | 7.75 | 6.25 | 6.25 |
| PRIOR ART EXAMPLE C (CONCAVE SURFACE PROGRESSION) | 2.50 | 2.50 | 2.50 | 2.50 | 8.50 | 8.50 | 5.50 | 6.50 |
| EXAMPLE 3 | 1.75 | 1.75 | 4.75 | 1.75 | 7.75 | 7.75 | 7.75 | 4.75 |

| TABLE 3-2 | SMVf | SMVn | SMVfn | SMHf | SMHn | SMHfn |
|---|---|---|---|---|---|---|
| PRIOR ART EXAMPLE A (CONVEX SURFACE PROGRESSION) | 0.8953 | 0.9428 | 0.0475 | 0.9140 | 0.9914 | 0.0774 |
| PRIOR ART EXAMPLE B (DOUBLE SURFACE PROGRESSION) | 0.8973 | 0.9391 | 0.0418 | 0.9149 | 0.9899 | 0.0750 |
| PRIOR ART EXAMPLE C (CONCAVE SURFACE PROGRESSION) | 0.8991 | 0.9354 | 0.0363 | 0.9157 | 0.9884 | 0.0727 |
| EXAMPLE 3 | 0.8973 | 0.9485 | 0.0512 | 0.9149 | 0.9875 | 0.0726 |

FIG. 11
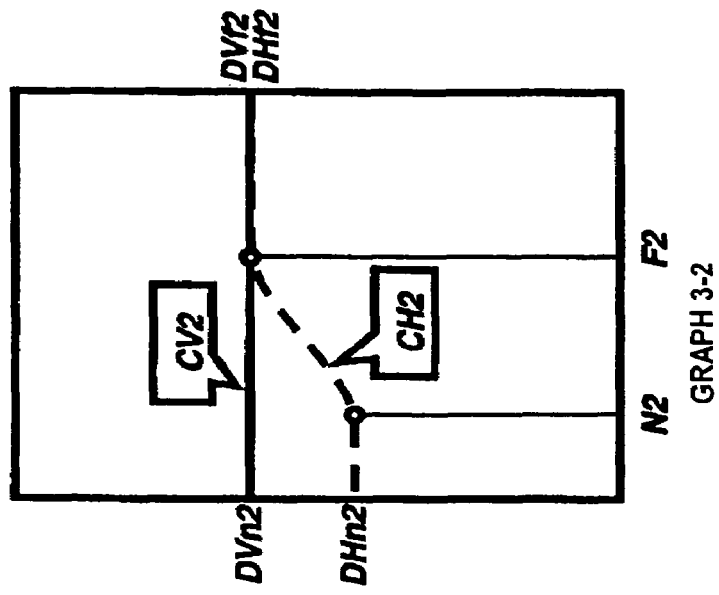
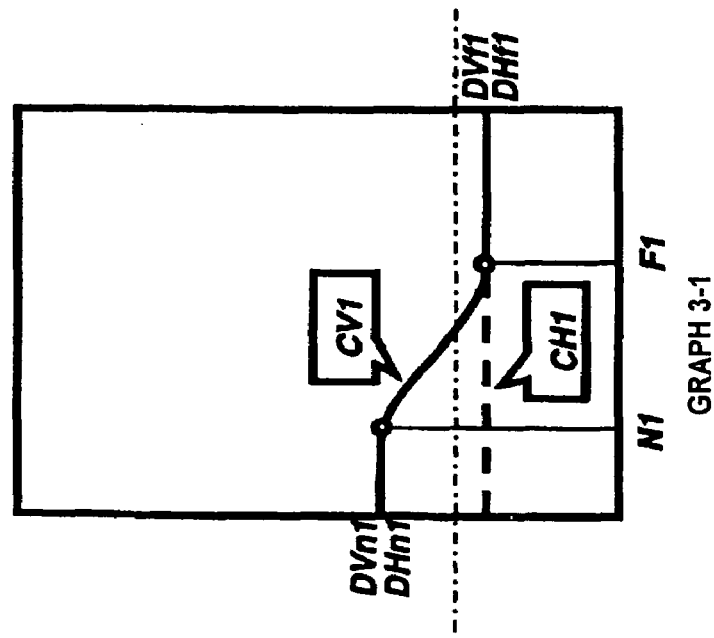

FIG. 13
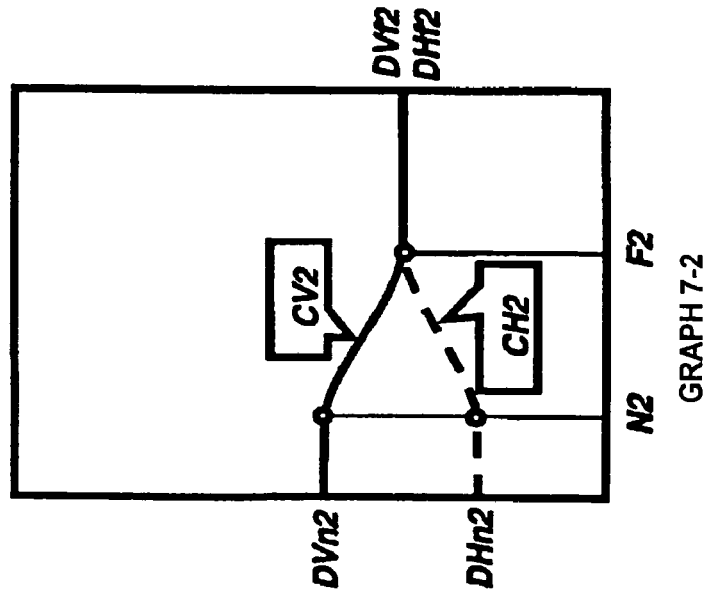
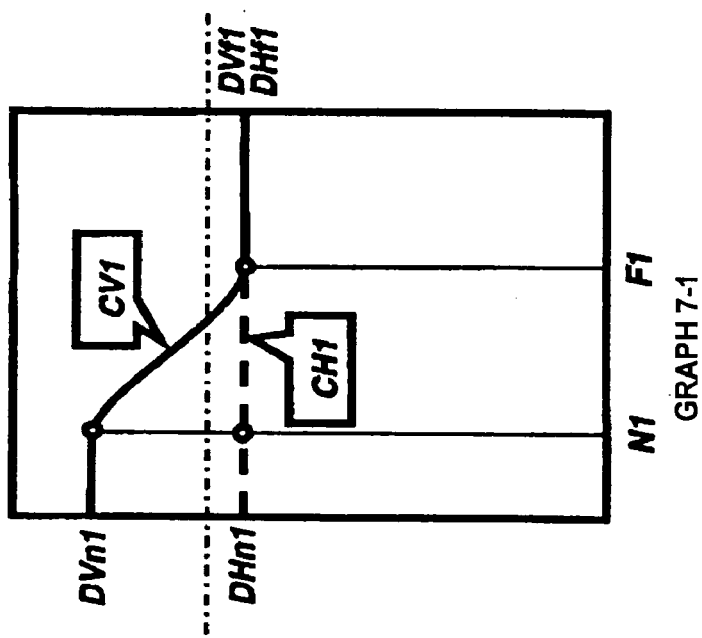
EXAMPLE 7

**BI-ASPHERICAL TYPE
PROGRESSIVE-POWER LENS**

BI-ASPHERICAL TYPE PROGRESSIVE-POWER LENS AND METHOD OF DESIGNING THE SAME

TECHNICAL FIELD

The present invention relates to a bi-aspherical type progressive-power lens, used as, for example, a progressive-power lens for a spectacle for presbyopia that is configured such that a progressive refractive power action is dividedly allotted to a first refractive surface being an object side surface and a second refractive surface being an eyeball side surface, and a combination of the first surface and the second surface gives a far vision diopter (Df) and an addition diopter (ADD) based on prescription values, and to a method of designing the same.

BACKGROUND ART

A progressive-power lens is widely used in general because of an advantage that in appearance it is hardly detected from others as a spectacle for the aged in spite of a spectacle lens for presbyopia, an advantage that it allows a wearer to clearly look continuously from a far distance to a near distance without discontinuity, and so on. However, due to the necessity of arrangement of a plurality of visual fields such as a field for looking far, a field for looking near, and a field for looking at a distance intermediate therebetween, without a boundary line existing within a limited lens area, each visual field is not always sufficiently wide. Moreover, it is widely known that it presents disadvantages specific to the progressive-power lens such that there is a region mainly in a side visual field which causes the wearer to feel distortion or sway of an image.

Various proposals have been made since long ago to improve the disadvantages specific to the progressive-power lens, and most of such conventional progressive-power lenses have a surface structure created by a combination of a "progressive surface" arranged on an object side surface and a "spherical surface" or an "astigmatism surface" arranged on an eyeball side surface. Conversely to those, Atoral Variplas as a progressive-power lens, which is characterized in that a "progressive action" is added to the eyeball side surface, is released in 1970 from Essel Optical Co. (now Essilor), France.

Besides, recently proposed prior arts include, for example, technologies described in Patent Document 1 and Patent Document 2 and so on, which are generally called rear surface progression (or concave surface progression). The surface structure in the rear surface progression proposed in the Patent Document 1 has a main purpose of improving distortion and sway of an image by allotting a portion or the whole of a necessary addition diopter from an object side surface to an eyeball side surface to reduce the magnification difference of an image between a distance portion and a near portion.

Specifically, in the Patent Document 1, the object side surface is made as a spherical surface or a rotationally symmetrical aspherical surface to completely offset the "progressive action," and a "progressive surface" providing a predetermined addition diopter is added (fused) to only the eyeball side surface. Besides, the Patent Document 2 proposes that the addition diopter on the "progressive surface" being the object side surface is made lower than a predetermined value and a "progressive surface" providing a deficiency in addition diopter is added (fused) to a "spherical surface" or "astigmatism surface" on the rear surface side.

Although having different purposes and reasons, other prior arts of the progressive-power lens having a structure of adding the "progressive action" to the eyeball side surface include, for example, Patent Document 3, Patent Document 4, Patent Document 5, Patent Document 6, and so on, and moreover, prior arts in which the "progressive action" is provided to both surfaces of a lens as in one described in the Patent Document 2 include, for example, Patent Document 7 and Patent Document 8. Commonly, in these prior arts, a combination of two surfaces of the object side and the eyeball side of a lens gives a necessary addition diopter.

[Patent Document 1] WO97/19382
[Patent Document 2] WO97/19383
[Patent Document 3] Japanese Patent Publication No. Sho 47-23943
[Patent Document 4] Japanese Patent Application Laid-open No. Sho 57-10112
[Patent Document 5] Japanese Patent Application Laid-open No. Hei 10-206805
[Patent Document 6] Japanese Patent Application Laid-open No. 2000-21846
[Patent Document 7] Japanese Patent Application Laid-open No. 2000-338452
[Patent Document 8] Japanese Patent Application Laid-open No. Hei 6-118353

DISCLOSURE OF THE INVENTION

Problems to be Solved by the Invention

The above-described prior arts have a main purpose of improving distortion and sway of an image due to magnification difference by allotting a portion or the whole of a necessary addition diopter for the progressive-power lens from the object side surface to the eyeball side surface of a lens to reduce the magnification difference between a distance portion and a near portion. Clear description, however, on reasons of their improved effects can be rarely found, and only partial description thereof is found just in the Patent Document 2 (hereinafter, also described as Prior art 1) or the like. Namely, Patent Document 2 discloses the following calculation equations for a lens magnification SM shown in the equation (1) to the equation (3), which is used as a basic evaluation parameter for lens design.

Here, description in Patent Document 2 is cited.

"The lens magnification SM is generally expressed by the following equation.

$$SM = Mp \times Ms \qquad (1),$$

where Mp is called a power factor, and Ms is called a shape factor. When the distance from a vertex of an eyeball side surface (inside vertex) of a lens to an eyeball is an inter-vertex distance L, a refractive power at the inside vertex (inside vertex refractive power) is Po, a thickness at the center of the lens is t, a refractive index of the lens is n, and a base curve (refractive power) of the object side surface of the lens is Pb, Mp and Ms are expressed as follows.

$$Mp = 1/(1 - L \times Po) \qquad (2)$$

$$Ms = 1/(1 - (t \times Pb)/n) \qquad (3)$$

It should be noted that for calculations of the equation (2) and the equation (3), diopter (D) is used for the inside vertex refractive power Po and the base curve Pb, and meter (m) is used for the distance L and thickness t, respectively."

Then, in the Patent Document 2, these calculation equations for the lens magnification SM are used to calculate a difference in magnification between a distance portion and a near portion. It is regarded that the distortion and sway of an image are improved because of a small magnification difference.

The study by the inventor of the invention shows that though some effects are recognized in the above-described Prior art 1 as compared to the other prior arts, the following points need to be discussed to design a lens with higher performance.

a. Basic evaluation parameters used in the above-described Prior art 1 include a parameter which should be essentially applied only to a portion near the center of a lens. This is clear from the description of "the distance L from a vertex of an eyeball side surface of a lens to an eyeball" and "a thickness t at the center of the lens." More specifically, in an example in the Patent Document 2, the basic evaluation parameter to be applied only to a distance portion near the center of the lens, is applied also to a near portion positioned at a great distance below the lens center, and thus a possibility of error generation is remained.

b. In Prior art 1, the lens magnification SM is calculated using five basic evaluation parameters, which are the aforementioned L, t, Po, Pb with addition of the "refractive index of the lens n." However, as is instantly found when tilting forward and backward a lens having an actual diopter, it is considered that the size of an image is strongly influenced by an "angle between a sight line and a lens surface." Therefore, this leads to a consideration that the "angle between a sight line and a lens surface" is nonnegligible particularly in calculation of the magnification of the near portion positioned at a great distance below the lens center. Accordingly, the lens design of Prior art 1 has a possibility of error caused by the calculation of the lens magnification with no consideration of the "angle between a sight line and a lens surface."

c. The "magnification" in Prior art 1 lacks idea on direction other than a description of an application example to an astigmatism lens. Due to the lack of this idea, there may be a case that, for example, "magnifications in the vertical direction and the horizontal direction are different" in the near portion positioned at a great distance below the lens center, which causes a possibility of error.

d. To accurately calculate the magnification for the near portion, the distance to a visual target, that is, an "object distance" should be added as a calculation factor. However, in Prior art 1, the "object distance" is not taken into consideration. Accordingly, a possibility of error due to the lack of this consideration can not be denied.

e. In Prior art 1, the influence by a prism action is not taken into consideration in the magnification calculations. Accordingly, there is also a possibility of error due to the lack of this consideration.

As described above, the Prior art 1 is not always sufficient from a viewpoint of more accurately calculating the "magnification."

In order to solve the above-described problem the present invention is provided, and its object is to provide a bi-aspherical type progressive-power lens considering an influence by the aforementioned "angle between a sight line and a lens surface" and "an object distance", and reducing a magnification difference of images between a distance portion and a near portion of a lens, and providing an excellent visual acuity correction for prescription values and a wide effective visual field with less distortion in wearing, and a method of designing the same.

Means for Solving the Problems

In order to solve the above-described problems, the present invention has the following structures.

(First Structure)

In a bi-aspherical type progressive-power lens with a progressive refractive power action dividedly allotted to a first refractive surface being an object side surface and a second refractive surface being an eyeball side surface, when on the first refractive surface, a surface refractive power in a horizontal direction and a surface refractive power in a vertical direction, at a far vision diopter measurement position F1, are DHf and DVf respectively, and on the first refractive surface, a surface refractive power in a horizontal direction and a surface refractive power in a vertical direction, at a near vision diopter measurement position N1, are DHn and DVn respectively, relation of DHn and DVn are expressed by $$DHf+DHn<DVf+DVn, \text{ and } DHn<DVn,$$

surface astigmatism components at F1 and N1 of the first refractive surface are offset by the second refractive surface, and a combination of the first and second refractive surfaces gives a far vision diopter (Df) and an addition diopter (ADD) based on prescription values, and a distribution of astigmatism on the first refractive surface is bilaterally symmetrical with respect to one meridian passing through the far vision diopter measurement position F1, a distribution of astigmatism on the second refractive surface is bilaterally asymmetrical with respect to one meridian passing through a far vision diopter measurement position F2 of the second refractive surface, and a position of a near vision diopter measurement position N2 on the second refractive surface is shifted inward to a nose by a predetermined distance.

According to this structure, a visual field in the horizontal direction can be increased by setting a sharing ratio of a progressive action in the horizontal direction of the eyeball side surface higher, a sight line can be easily moved between the distance and near portions by setting a sharing ratio of a progressive action in the vertical direction of the object side surface higher, and a progressive-power lens having a large binocular visual field with less astigmatism and having less sway and distortion in wearing can be provided.

(Second Structure)

In the bi-aspherical type progressive-power lens according to the first structure, a distribution of transmission average diopter in a near portion of the bi-aspherical type progressive-power lens is arranged such that a nose side is dense and a temple side is sparse.

According to this structure, in addition to the effect of the first structure, the transmission average diopter particularly from the near portion to the side becomes approximate between the left and right eyes, and an excellent binocular vision can be obtained.

(Third Structure)

In a method of designing a bi-aspherical type progressive-power lens with a progressive refractive power action dividedly allotted to a first refractive surface being an object side surface and a second refractive surface being an eyeball side surface, when on the first refractive surface, a surface refractive power in a horizontal direction and a surface refractive power in a vertical direction, at a far vision diopter measurement position F1, are DHf and DVf respectively, and on the first refractive surface, a surface refractive power in a horizontal direction and a surface refractive power in a vertical direction, at a near vision diopter measurement position N1, are DHn and DVn respectively, the relation of DHn and DVn is expressed by $$DHf+DHn<DVf+DVn, \text{ and } DHn<DVn,$$

surface astigmatism components at F1 and N1 of the first refractive surface are offset by the second refractive surface, and a combination of the first and second refractive surfaces gives a far vision diopter (Df) and an addition diopter (ADD) based on prescription values, and a distribution of astigmatism on the first refractive surface is bilaterally symmetrical with respect to one meridian passing through the far vision diopter measurement position F1, a distribution of astigmatism on the second refractive surface is bilaterally asymmetrical with respect to one meridian passing through a far vision diopter measurement position F2 of the second refractive surface, and a position of a near vision diopter measurement position N2 on the second refractive surface is shifted inward to a nose by a predetermined distance.

According to this structure, a visual field in the horizontal direction can be increased by setting a sharing ratio of a progressive action in the horizontal direction of the eyeball side surface higher, a sight line can be easily moved between the distance and near portions by setting a sharing ratio of a progressive action in the vertical direction of the object side surface higher, and a designing method capable of obtaining a progressive-power lens having a large binocular visual field with less astigmatism and having less sway and distortion in wearing can be provided.

(Fourth Structure)

In the method of designing a bi-aspherical type progressive-power lens according to the third structure, a distribution of transmission average diopter in a near portion of the bi-aspherical type progressive-power lens is arranged such that a nose side is dense and a temple side is sparse.

According to this structure, in addition to the effect of the third structure, the transmission average diopter particularly from the near portion to the side becomes approximate between the left and right eyes, and an excellent binocular vision can be obtained.

(Fifth Structure)

In a bi-aspherical type progressive-power lens with a progressive refractive power action dividedly allotted to a first refractive surface being an object side surface and a second refractive surface being an eyeball side surface, when on the first refractive surface, a surface refractive power in a horizontal direction and a surface refractive power in a vertical direction, at a far vision diopter measurement position F1, are DHf and DVf respectively, and on the first refractive surface, a surface refractive power in a horizontal direction and a surface refractive power in a vertical direction, at a near vision diopter measurement position N1, are DHn and DVn respectively, the relation of DHn and DVn is expressed by $$DHf+DHn<DVf+DVn, \text{ and } DHn<DVn,$$

surface astigmatism components at F1 and N1 of the first refractive surface are offset by the second refractive surface, and a combination of the first and second refractive surfaces gives a far vision diopter (Df) and an addition diopter (ADD) based on prescription values, and a distribution of average diopter on the first refractive surface is bilaterally symmetrical with respect to one meridian passing through the far vision diopter measurement position F1, a distribution of average diopter on the second refractive surface is bilaterally asymmetrical with respect to one meridian passing through a far vision diopter measurement position F2 of the second refractive surface, and a position of a near vision diopter measurement position N2 on the second refractive surface is shifted inward to a nose by a predetermined distance.

According to this structure, a visual field in the horizontal direction can be increased by setting a sharing ratio of a progressive action in the horizontal direction of the eyeball side surface higher, a sight line can be easily moved between the distance and near portions by setting a sharing ratio of a progressive action in the vertical direction of the object side surface higher, and a progressive-power lens having a large binocular visual field with an appropriate average diopter and having less sway, distortion and blur in wearing can be provided.

(Sixth Structure)

In the bi-aspherical type progressive-power lens according to the fifth structure, a distribution of transmission average diopter in a near portion of the bi-aspherical type progressive-power lens is arranged such that a nose side is dense and a temple side is sparse.

According to this structure, in addition to the effect of the fifth structure, the transmission average diopter particularly from the near portion to the side becomes approximate between the left and right eyes, and an excellent binocular vision can be obtained.

(Seventh Structure)

In a method of designing a bi-aspherical type progressive-power lens with a progressive refractive power action dividedly allotted to a first refractive surface being an object side surface and a second refractive surface being an eyeball side surface, when on the first refractive surface, a surface refractive power in a horizontal direction and a surface refractive power in a vertical direction, at a far vision diopter measurement position F1, are DHf and DVf respectively, and on the first refractive surface, a surface refractive power in a horizontal direction and a surface refractive power in a vertical direction, at a near vision diopter measurement position N1, are DHn and DVn respectively, the relation of DHn and DVn is expressed by $$DHf+DHn<DVf+DVn, \text{ and } DHn<DVn,$$

surface astigmatism components at F1 and N1 of the first refractive surface are offset by the second refractive surface, and a combination of the first and second refractive surfaces gives a far vision diopter (Df) and an addition diopter (ADD) based on prescription values, and a distribution of average diopter on the first refractive surface is bilaterally symmetrical with respect to one meridian passing through the far vision diopter measurement position F1, a distribution of average diopter on the second refractive surface is bilaterally asymmetrical with respect to one meridian passing through a far vision diopter measurement position F2 of the second refractive surface, and a position of a near vision diopter measurement position N2 on the second refractive surface is shifted inward to a nose by a predetermined distance.

According to this structure, a visual field in the horizontal direction can be increased by setting a sharing ratio of a progressive action in the horizontal direction of the eyeball side surface higher, a sight line can be easily moved between the distance and near portions by setting a sharing ratio of a progressive action in the vertical direction of the object side surface higher, and a designing method capable of obtaining a progressive-power lens having a large binocular visual field with an appropriate average diopter and having less sway, distortion and blur in wearing can be provided.

(Eighth Structure)

In the method of designing a bi-aspherical type progressive-power lens according to the seventh structure, a distribution of transmission average diopter in a near portion of the bi-aspherical type progressive-power lens is arranged such that a nose side is dense and a temple side is sparse.

According to this structure, in addition to the effect of the seventh structure, the transmission average diopter particularly from the near portion to the side becomes approximate between the left and right eyes, and an excellent binocular vision can be obtained.

(Ninth Structure)

In a bi-aspherical type progressive-power lens with a progressive refractive power action dividedly allotted to a first refractive surface being an object side surface and a second refractive surface being an eyeball side surface, when on the first refractive surface, a surface refractive power in a horizontal direction and a surface refractive power in a vertical direction, at a near vision diopter measurement position N1, are DHn and DVn respectively, the relation of DHn and DVn is expressed by, $$DVn-DHn>ADD/2,$$

a surface astigmatism component at N1 of the first refractive surface is offset by the second refractive surface, and a combination of the first and second refractive surfaces gives a near vision diopter (Dn) based on prescription values.

According to this structure, a visual field in the horizontal direction can be increased by setting a sharing ratio of a progressive action in the horizontal direction of the eyeball side surface particularly in the near portion higher, and at the same time, a sharing ratio of a progressive action in the vertical direction of the object side surface is increased, and a progressive-power lens which allows a sight line to move easily between the distance and near portions and has less sway and distortion in wearing can be provided.

(Tenth Structure)

In the bi-aspherical type progressive-power lens according to the ninth structure, when on the first refractive surface, a surface refractive power in a horizontal direction and a surface refractive power in a vertical direction, at a far vision diopter measurement position F1, are DHf and DVf respectively, the relation of DHf and DVf is expressed by $$DHf+DHn<DVf+DVn, \text{ and } DVn-DVf>ADD/2, \text{ and}$$
$$DHn-DHf<ADD/2,$$

surface astigmatism components at F1 and N1 of the first refractive surface are offset by the second refractive surface, and a combination of the first and second refractive surfaces gives a far vision diopter (Df) and an addition diopter (ADD) based on prescription values.

According to this structure, in addition to the effect of the ninth structure, a progressive-power lens in which sway and distortion are suppressed in the distance portion and also on the entire lens surface can be provided.

(11th Structure)

In the bi-aspherical type progressive-power lens according to the ninth structure or the tenth structure, the first refractive surface is bilaterally symmetrical with respect to one meridian passing through the far vision diopter measurement position F1, the second refractive surface is bilaterally asymmetrical with respect to one meridian passing through a far vision diopter measurement position F2 of the second refractive surface, and a position of a near vision diopter measurement position N2 on the second refractive surface is shifted inward to a nose by a predetermined distance.

According to this structure, in addition to the effect of the ninth structure or the tenth structure, a larger binocular vision can be provided particularly when moving a sight line from the distance portion to the near portion.

(12th Structure)

In the bi-aspherical type progressive-power lens according to any one of the ninth structure to the 11th structure, the first refractive surface is a rotation surface with one meridian passing through the far vision diopter measurement position F1 as a generating line, the second refractive surface is bilaterally asymmetrical with respect to one meridian passing through a far vision diopter measurement position F2 on the second refractive surface, and an arrangement of a near vision diopter measurement position N2 on the second refractive surface is shifted inward to a nose by a predetermined distance.

According to this structure, in addition to the effect of any one of the ninth structure to the 11th structure, it is possible to prevent generation of deformation of a surface, which can cause sway of an image, on the object side surface. Also, a larger binocular vision can be provided when moving a sight line from the distance portion to the near portion.

(13th Structure)

In the bi-aspherical type progressive-power lens according to any one of the ninth structure to the 11th structure, on the first refractive surface, a sectional curve in the horizontal direction passing through the far vision diopter measurement position F1 is not a perfect circle but has a predetermined refractive power change, and a sectional curve of a cross section in the vertical direction including a normal line at an arbitrary position on the sectional curve in the horizontal direction is substantially the same as a meridian passing through the far vision diopter measurement position F1.

According to this structure, in addition to the effect of any one of the ninth structure to the 11th structure, distortion in both the left and right sides can be alleviated and a side vision can be improved by adopting the above-described structure.

(14th Structure)

In the bi-aspherical type progressive-power lens according to any one of the ninth structure to the 13th structure, in a structure of a combination of the first and second refractive surfaces giving the far vision diopter (Df) and the addition diopter (ADD) based on the prescription values and providing as necessary a prism refractive power (Pf), an aspherical correction is performed to at least one or more items of occurrence of astigmatism and a diopter error and occurrence of distortion of an image in a peripheral visual field, due to the fact that the sight line in a wearing state and a lens surface can not intersect at right angles.

According to this structure, a progressive-power lens can be provided, in which occurrence of transmission average diopter and transmission diopter error, distortion of an image in a peripheral vision, and the like are suppressed by the above-described aspherical correction, in addition to the effect of any one of the ninth structure to the 13th structure.

(15th Structure)

In a method of designing a bi-aspherical type progressive-power lens with a progressive refractive power action dividedly allotted to a first refractive surface being an object side surface and a second refractive surface being an eyeball side surface, when on the first refractive surface, a surface refractive power in a horizontal direction and a surface refractive power in a vertical direction, at a near vision diopter measurement position N1, are DHn and DVn respectively, the relation of DHn and DVn is expressed by $$DVn-DHn>ADD/2,$$

and a surface astigmatism component at N1 of the first refractive surface is offset by the second refractive surface, and a combination of the first and second refractive surfaces gives a near vision diopter (Dn) based on prescription values.

According to this structure, a visual field in the horizontal direction can be increased by setting a sharing ratio of a progressive action in the horizontal direction of the eyeball side surface particularly in the near portion higher, and at the same time, a sharing ratio of a progressive action in the vertical direction of the object side surface is increased, and a designing method capable of obtaining a progressive-power lens which allows a sight line to move easily between the distance and near portions and has less sway and distortion in wearing can be provided.

(16th Structure)

In the method of designing a bi-aspherical type progressive-power lens according to the 15th structure, when on the first refractive surface, a surface refractive power in a horizontal direction and a surface refractive power in a vertical direction, at a far vision diopter measurement position F1, are DHf and DVf respectively, the relation of DHf and DVf is expressed by $$DHf+DHn<DVf+DVn, \text{ and } DVn-DVf>ADD/2, \text{ and}$$
$$DHn-DHf<ADD/2,$$

surface astigmatism components at F1 and N1 of the first refractive surface are offset by the second refractive surface, and a combination of the first and second refractive surfaces gives a far vision diopter (Df) and an addition diopter (ADD) based on prescription values.

According to this structure, in addition to the effect of the 15th structure, a designing method capable of obtaining a progressive-power lens in which sway and distortion are suppressed in the distance portion and also on the entire lens surface can be provided.

(17th Structure)

In the method of designing a bi-aspherical type progressive-power lens according to the 15th structure or the 16th structure, the first refractive surface is bilaterally symmetrical with respect to one meridian passing through the far vision diopter measurement position F1, the second refractive surface is bilaterally asymmetrical with respect to one meridian passing through a far vision diopter measurement position F2 of the second refractive surface, and a position of a near vision diopter measurement position N2 on the second refractive surface is shifted inward to a nose by a predetermined distance.

According to this structure, in addition to the effect of the 15th structure or the 16th structure, a larger binocular vision can be provided particularly when moving a sight line from the distance portion to the near portion.

(18th Structure)

In the method of designing a bi-aspherical type progressive-power lens according to any one of the 15th structure to the 17th structure, the first refractive surface is a rotation surface with one meridian passing through the far vision diopter measurement position F1 as a generating line, the second refractive surface is bilaterally asymmetrical with respect to one meridian passing through a far vision diopter measurement position F2 on the second refractive surface, and a position of a near vision diopter measurement position N2 on the second refractive surface is shifted inward to a nose by a predetermined distance.

According to this structure, in addition to the effect of any one of the 15th structure to the 17th structure, it is possible to prevent generation of deformation of a surface, which can cause sway of an image, on the object side surface. Also, a larger binocular vision can be provided when moving a sight line from the distance portion to the near portion.

(19th Structure)

In the method of designing a bi-aspherical type progressive-power lens according to any one of the 15th structure to the 17th structure, on the first refractive surface, a sectional curve in the horizontal direction passing through the far vision diopter measurement position F1 is not a perfect circle but has a predetermined refractive power change, and a sectional curve of a cross section in the vertical direction including a normal line at an arbitrary position on the sectional curve in the horizontal direction is substantially the same as a meridian passing through the far vision diopter measurement position F1.

According to this structure, in addition to the effect of any one of the 15th structure to the 17th structure, distortion in both the left and right sides can be alleviated and a side vision is improved, by adopting the above-described structure.

(20th Structure)

In the method of designing a bi-aspherical type progressive-power lens according to any one of the 15th structure to the 19th structure, in a structure of a combination of the first and second refractive surfaces giving the far vision diopter (Df) and the addition diopter (ADD) based on the prescription values and providing as necessary a prism refractive power (Pf), an aspherical correction is performed to at least one or more items of occurrence of astigmatism and a diopter error and occurrence of distortion of an image in a peripheral visual field, due to the fact that a sight line and a lens surface in a wearing state intersect at right angles.

According to this structure, a progressive-power lens can be provided, in which occurrence of transmission average diopter and transmission diopter error, distortion of an image in a peripheral vision, and the like are suppressed by the above-described aspherical correction, in addition to the effect of any one of the 15th structure to the 19th structure.

(21st Structure)

In a bi-aspherical type progressive-power lens with a progressive refractive power action dividedly allotted to a first refractive surface being an object side surface and a second refractive surface being an eyeball side surface, when on the first refractive surface, a surface refractive power in a horizontal direction and a surface refractive power in a vertical direction, at a far vision diopter measurement position F1, are DHf and DVf respectively, and on the first refractive surface, a surface refractive power in a horizontal direction and a surface refractive power in a vertical direction, at a near vision diopter measurement position N1, are DHn and DVn respectively, the relation of DHn and DVn is expressed by $$DVn-DVf>ADD/2,$$

surface astigmatism components at F1 and N1 of the first refractive surface are offset by the second refractive surface, and a combination of the first and second refractive surfaces gives an addition diopter (ADD) based on prescription values, and on a sectional curve in the vertical direction passing through F1, at an arbitrary position in a rectangle surrounded by two horizontal lines located at ±4 mm in the vertical direction, with a position providing 50% of a change of a sectional diopter in the vertical direction ranging from F1 to the same height as N1 being the center, and two vertical lines located at ±15 mm in the horizontal direction from a straight line in the vertical direction passing through F1, a surface sectional diopter in the vertical direction on the first refractive surface has differential values such that the absolute value of a differential value in the vertical direction is larger than the absolute value of a differential value in the horizontal direction.

According to this structure, deformation of a surface on the object side surface can be decreased and sway and distortion of an image can be suppressed particularly in a frequently used center region of the progressive-power lens by setting a sharing ratio of a progressive action in the vertical direction of the object side surface higher.

(22nd Structure)

In a bi-aspherical type progressive-power lens with a progressive refractive power action dividedly allotted to a first refractive surface being an object side surface and a second refractive surface being an eyeball side surface, when on the first refractive surface, a surface refractive power in a horizontal direction and a surface refractive power in a vertical direction, at a far vision diopter measurement position F1, are DHf and DVf respectively, and on the first refractive surface, a surface refractive power in a horizontal direction and a surface refractive power in a vertical direction, at a near vision diopter measurement position N1, are DHn and DVn respectively, the relation of DHn and DVn is expressed by $DVn-DVf>ADD/2$, surface astigmatism components at F1 and N1 of the first refractive surface are offset by the second refractive surface, and a combination of the first and second refractive surfaces gives an addition diopter (ADD) based on prescription values, and on a sectional curve in the vertical direction passing through F1, at an arbitrary position in a rectangle surrounded by two horizontal lines located at ±4 mm in the vertical direction, with a position providing 50% of a change of a sectional diopter in the vertical direction ranging from F1 to the same height as N1 being the center, and two vertical lines located at ±15 mm in the horizontal direction from a straight line in the vertical direction passing through F1, a surface astigmatism amount on the first refractive surface has differential values such that the absolute value of a differential value in the vertical direction is larger than the absolute value of a differential value in the horizontal direction, and at an arbitrary position in the rectangle, a surface average diopter on the first refractive surface has differential values such that the absolute value of a differential value in the vertical direction is larger than the absolute value of a differential value in the horizontal direction.

According to this structure, deformation of a surface on the object side surface can be decreased and sway and distortion of an image can be suppressed particularly in a frequently used center region of the progressive-power lens by setting a sharing ratio of a progressive action in the vertical direction of the object side surface higher. Also, evaluation of an optical performance of a lens becomes easy by using the surface astigmatism amount and the surface average diopter as indexes.

(23rd Structure)

In a method of designing a bi-aspherical type progressive-power lens with a progressive refractive power action dividedly allotted to a first refractive surface being an object side surface and a second refractive surface being an eyeball side surface, when on the first refractive surface, a surface refractive power in a horizontal direction and a surface refractive power in a vertical direction, at a far vision diopter measurement position F1, are DHf and DVf respectively, and on the first refractive surface, a surface refractive power in a horizontal direction and a surface refractive power in a vertical direction, at a near vision diopter measurement position N1, are DHn and DVn respectively, the relation of DHn and DVn is expressed by $DVn-DVf>ADD/2$, surface astigmatism components at F1 and N1 of the first refractive surface are offset by the second refractive surface, and a combination of the first and second refractive surfaces gives an addition diopter (ADD) based on prescription values, and on a sectional curve in the vertical direction passing through F1, at an arbitrary position in a rectangle surrounded by two horizontal lines located at ±4 mm in the vertical direction, with a position providing 50% of a change of a sectional diopter in the vertical direction ranging from F1 to the same height as N1 being the center, and two vertical lines located at ±15 mm in the horizontal direction from a straight line in the vertical direction passing through F1, a surface sectional diopter in the vertical direction on the first refractive surface has differential values such that the absolute value of a differential value in the vertical direction is larger than the absolute value of a differential value in the horizontal direction.

According to this structure, deformation of a surface on the object side surface can be decreased and sway and distortion of an image can be suppressed particularly in a frequently used center region of the progressive-power lens by setting a sharing ratio of a progressive action in the vertical direction of the object side surface higher.

(24th Structure)

In a method of designing a bi-aspherical type progressive-power lens with a progressive refractive power action dividedly allotted to a first refractive surface being an object side surface and a second refractive surface being an eyeball side surface, when on the first refractive surface, a surface refractive power in a horizontal direction and a surface refractive power in a vertical direction, at a far vision diopter measurement position F1, are DHf and DVf respectively, and on the first refractive surface, a surface refractive power in a horizontal direction and a surface refractive power in a vertical direction, at a near vision diopter measurement position N1, are DHn and DVn respectively, the relation of DHn and DVn is expressed by $DVn-DVf>ADD/2$, surface astigmatism components at F1 and N1 of the first refractive surface are offset by the second refractive surface, and a combination of the first and second refractive surfaces gives an addition diopter (ADD) based on prescription values, and on a sectional curve in the vertical direction passing through F1, at an arbitrary position in a rectangle surrounded by two horizontal lines located at ±4 mm in the vertical direction, with a position providing 50% of a change of a sectional diopter in the vertical direction ranging from F1 to the same height as N1 being the center, and two vertical lines located at ±15 mm in the horizontal direction from a straight line in the vertical direction passing through F1, a surface astigmatism amount on the first refractive surface has differential values such that the absolute value of a differential value in the vertical direction is larger than the absolute value of a differential value in the horizontal direction, and at an arbitrary position in the rectangle, a surface average diopter on the first refractive surface has differential values such that the absolute value of a differential value in the vertical direction is larger than the absolute value of a differential value in the horizontal direction.

According to this structure, deformation of a surface on the object side surface can be decreased and sway and distortion of an image can be suppressed particularly in a frequently used center region of the progressive-power lens by setting a sharing ratio of a progressive action in the vertical direction of the object side surface higher. Also, evaluation of an optical performance of a lens becomes easy by using the surface astigmatism amount and the surface average diopter as indexes.

Advantageous Effect of the Invention

According to the present invention, a progressive action of a progressive-power lens is divided in the vertical direction and the horizontal direction of a lens and then an optimal sharing ratio between the front and rear two surfaces of the object side and the eyeball side is set in each direction to configure one bi-aspherical type progressive-power lens, a sharing ratio of a progressive action in the horizontal direction of a rear surface (eyeball side surface) is set higher so that an advantage of increasing the visual field in the horizontal direction can be obtained, a sharing ratio of a progressive action in the vertical direction of a front surface (object side surface) is set higher so that a disadvantage of increasing an eyeball turning angle between the distance and near portions in the vertical direction can be restrained Also, a wide effective visual field with less distortion in wearing can be provided by reducing a magnification difference of an image between the distance portion and the near portion on the progressive-power lens.

Moreover, it is possible to use a "bilaterally symmetrical semi-finished product" as an object side surface of the progressive-power lens and it is also possible to machine only the eyeball side surface after receiving an order into a bilaterally asymmetrical curved surface corresponding to a convergence action of an eye in nearsightedness, and a machining time and cost can be reduced.

BEST MODE FOR CARRYING OUT THE INVENTION

Hereinafter, an embodiment of the present invention will be described with reference to the drawings. Note that in the description, the process of clarification by the present inventors will be described first, and a bi-aspherical type progressive-power lens according to the present invention based on the clarification will be described subsequently.

Here, FIG. 1 is an explanatory view of various surface refractive powers at positions on a spectacle lens surface, FIG. 2 is an explanatory view of a positional relation among an eyeball, sight lines, and a lens, FIG. 3-1, FIG. 3-2, and FIG. 3-3 and FIG. 4-1, FIG. 4-2, and FIG. 4-3 are explanatory views on a magnification Mγ of a prism, being explanatory views on a difference between a plus lens and a minus lens and on a difference in magnification in viewing mainly using a near portion which is a lower portion of a lens, FIG. 5-1 is an explanatory view of an optical layout of progressive-power lens, being a front view of the progressive-power lens when viewed from an object side surface, FIG. 5-2 is an explanatory view of the optical layout of the progressive-power lens, being a side view illustrating a cross section in the vertical direction, FIG. 5-3 is an explanatory view of the optical layout of the progressive-power lens, being an elevational view illustrating a cross section in the transverse direction, and FIG. 6 is an explanatory view illustrating the difference of definition on "addition diopter." Note that in these drawings, symbol F denotes a far vision diopter measurement position, symbol N denotes a near vision diopter measurement position, and symbol Q denotes a prism diopter measurement position. In addition, other symbols shown in FIG. 1 and so on denote, DVf: surface refractive power at F of a sectional curved line in the vertical direction passing through F, DVn: surface refractive power at N of a sectional curved line in the vertical direction passing through N, DHf: surface refractive power at F of a sectional curved line in the horizontal direction passing through F, and DHn: surface refractive power at N of a sectional curved line in the horizontal direction passing through N. Further, suffix 1 is added to all of the symbols when the refractive surface of a drawing is a first refractive surface being the object side surface, and suffix 2 is added to all of the symbols when the surface is a second refractive surface being the eyeball side surface for recognition.

Besides, symbols F1 and F2 denote far vision diopter measurement positions on the object side surface and the eyeball side surface, and similarly symbols N1 and N2 denote near vision diopter measurement positions on the object side surface and the eyeball side surface. Further, symbol E is an eyeball, symbol C a center of rotation of the eyeball, symbol S a reference surface around C, symbols Lf and Ln sight lines passing through the far vision diopter measurement position and near vision diopter measurement position respectively. Besides, symbol M is a curved line called a principal sight line through which a sight line passes when one looks with both eyes from an upper front to a lower front portion. Then, symbols F1, N1, F2, N2, and N3 indicate positions, on which an opening of a lens meter is placed, differing depending on the definition of the "addition diopter."

[The Process of Clarification]

The present inventor decided to obtain, as will be explained below, a calculation equation of a magnification corresponding to the near portion improved by "corresponding parameters to the near portion" that is the problem (a) and "considering the object distance" that is the problem (d), which are explained in the above-described prior art. Namely, when Mp is a power factor and Ms is a shape factor, a magnification SM of an image is expressed by $$SM = Mp \times Ms \qquad (1').$$

Here, when the objective power (inverse number of the object distance expressed in a unit of m) to a visual target is Px, the distance from the eyeball side surface in the near portion of the lens to the eyeball is L, the refractive power in the near portion (inside vertex refractive power in the near portion) is Po, the thickness in the near portion of the lens is t, the refractive index of the lens is n, and the base curve (refractive power) of the object side surface in the near portion of the lens is Pb, the following relation is established.

$$Mp=(1-(L+t)Px)/(1-L \times Po) \quad (2')$$

$$Ms=1/(1-t \times (Px+Pb)/n) \quad (3')$$

These equations, in which the parameters are made to correspond to the distance portion, and 0 that is a value corresponding to infinity is substituted for Px indicating power of the object distance, match the equations of the above-described Prior art 1. In other words, the equations used in Prior art 1 can be considered to be "equations dedicated for the farsightedness having an infinitive object distance." By the way, although the equation (1') here is identical to the equation of the above-described Prior art 1, the object distance in nearsightedness is generally about 0.3 m to about 0.4 m, and thus Px which is the inverse number thereof becomes a value from about −2.5 to about −3.0. Accordingly, the value of Mp increases in the equation (2') because the value of the numerator increases, and the value of Ms decreases in the equation (3') because the value of the denominator increases. This shows that the influence by the shape factor Ms in the nearsightedness is less than that by the calculations of Prior art 1. For example, when Pb=−Px, that is, the base curve (refractive power) of the surface on the object side of a lens has a value ranging from about +2.5 to about +3.0, Ms=1, which shows that the shape factor in the nearsightedness is completely irrelevant to the magnification of an image.

In the above-described manner, the calculation equations for magnification with the parameters corresponding to the near portion and the "object distance" taken into consideration have been obtained. However, the "angle between a sight line and a lens surface" which is the problem (b) of the above-described Prior art 1 also needs to be taken into consideration to calculate a magnification in actual nearsightedness. What is important here is that the "angle between a sight line and a lens surface" has a directional property. Then, taking the "angle between a sight line and a lens surface" into consideration is nothing but concurrently taking into consideration the directional property of the "magnification of an image" which is the problem (c) of the above-described Prior art 1.

Reviewing the first calculation equation of the above-described equations (1') to (3') in this viewpoint, it has as calculation factors influenced by the "angle between a sight line and a lens surface," the inside vertex refractive power Po in the near portion and the base curve (refractive power) Pb of the object side surface in the near portion. Here, when well-known Martin's approximate equations are used, with the angle formed between the sight line in nearsightedness and the optical axis of the region in the near portion being $\alpha$ and the angle formed between the sight line in the nearsightedness and the normal line on the object side surface in the near portion being $\beta$, the inside vertex refractive power in the vertical direction in the near portion: $Pov = Po \times (1+\text{Sin}^2 \alpha \times 4/3)$, the inside vertex refractive power in the horizontal direction in the near portion: $Poh = Po \times (1+\text{Sin}^2 \alpha \times 1/3)$, the vertical section refractive power on the object side surface in the near portion: $Pbv = Pb \times (1+\text{Sin}^2 \beta \times 4/3)$, and the transverse section refractive power on the object side surface in the near portion: $Pbh = Pb \times (1+\text{Sin}^2 \beta \times 1/3)$.

As long as the angles $\alpha$ and $\beta$ and Po and Pb are not zero, the refractive powers, power factors, and shape factors have different values between the vertical and horizontal directions as described above, resulting in a difference in magnification occurring between the vertical direction and the horizontal direction.

While the approximate equations are used here to explain simply a fact that "the refractive power varies depending on the direction of the sight line," these values are desirably obtained by accurate ray tracing calculation in the actual optical design. In a non-limiting example of the method of calculating these will be described.

First, an optical path along the sight line is calculated using Snell's law to calculate L, t, and the distance from the object side refractive surface to an object point. Then, along this optical path, the first fundamental form, the second fundamental form, Weingarten formulas, or the like in differential geometry can be used to calculate the refractive power with the influence of refraction on the optical path on the object side refractive surface and the eyeball side refractive surface of a lens taken into consideration. These equations and formula and calculating methods are known from long ago and described in a known literature, for example, "Differential Geometry" (written by Kentaro Yano, published by Asakura Shoten Kabusikikaisya, the first edition, 1949) and so on, and thus the description thereof is omitted.

By the way, by performing such accurate ray tracing calculations, four calculation factors L, Po, t, and Pb which are the problems (a) to (d) in the above-described Prior art 1 are taken into consideration, and accurate magnification calculations can be possible in all of sight line directions as well as in the near portion located at a great distance below the lens center.

In such a manner, the above-described items, the inside vertex refractive power in the vertical direction in the near portion: Pov, the inside vertex refractive power in the horizontal direction in the near portion: Poh, the vertical section refractive power on the object side surface in the near portion: Pbv, and the transverse section refractive power on the object side surface in the near portion: Pbh, can be obtained at an accuracy much higher than that in a case using Martin's approximate equations.

It will be easily understood that all of the above-described magnification calculations of an image have to correspond to the difference in the direction of the sight line from the fact that "the refractive power varies in accordance with the direction of the sight line," as described above. Here, when Mp is the power factor and Ms is the shape factor, and suffix v is added for the vertical direction and suffix h is added for the horizontal direction to express the magnification SM of an image, the above-described equations (1') to (3') are rewritten as follows:

$$SMv = Mpv \times Msv \quad (1v')$$

$$SMh = Mph \times Msh \quad (1h')$$

$$Mpv = (1-(L+t)Px)/(1-L \times Pov) \quad (2v')$$

$$Mph = (1-(L+t)Px)/(1-L \times Poh) \quad (2h')$$

$$Msv = 1/(1-t \times (Px+Pbv)/n) \quad (3v')$$

$$Msh = 1/(1-t \times (Px+Pbh)/n) \quad (3h')$$

The above way could cope with the above-described problems (a) to (d) of Prior art 1.

At last, the "influence by the prism action" which is the above-described problem (e) of Prior art 1 in calculating the magnification in the actual nearsightedness will be described.

While a prism itself has no refractive power unlike a lens, the magnification $M\gamma$ of the prism varies depending on the incident angle and exit angle of rays to/from the prism. Here, an angle magnification $\gamma$ when a ray incident from a vacuum to a medium with a refractive index n, as shown on the left side in FIG. 3-1 and FIG. 4-1, is refracted on the surface of the medium is considered. When the incident angle is i and the refractive angle is r in this event, $n = \sin i / \sin r$ by well-known Snell's law. Besides, the angle magnification $\gamma$ by refraction is expressed by $\gamma = \cos i / \cos r$.

Since $n \geq 1$, generally $i \geq r$ and $\gamma \leq 1$. Here, $\gamma$ becomes a maximum value 1 when $i = r = 0$, that is, in the case of a normal incidence. When the refractive angle r is as $n = 1/\sin r$, $\gamma$ becomes a theoretical minimum value, $\gamma = 0$ At this time, $i = \pi/2$, and thus r is equal to a critical angle of total reflection when a ray exits from the medium.

On the other hand, an angle magnification $\gamma'$ when a ray exits from a medium with a refractive index of n to a vacuum, as shown on the right side in FIG. 3-1 and FIG. 4-1, becomes completely reverse to the above. More specifically, when the incident angle of a ray, which is refracted on a medium surface and exits from within the medium to a vacuum, is i' and the refractive angle is r', $1/n = \sin i'/\sin r'$ by Snell's law, and the angle magnification is expressed by $\gamma' = \cos i'/\cos r'$. Since $n \geq 1$, generally $r' \geq i'$ and $\gamma' \geq 1$. Here, $\gamma'$ becomes a maximum value 1 when $i' = r' = 0$, that is, in the case of a normal incidence. When the incident angle i' is as $n = 1/\sin i'$, $\gamma'$ becomes a theoretical maximum value, $\gamma' = \infty$. At this time, $r' = \pi/2$, and thus i' is equal to a critical angle of total reflection when a ray exits from the medium.

As shown in FIG. 3-3 and FIG. 4-3, a case in which a ray incident on the object side surface of one spectacle lens passes through the inside of the lens, exits from the eyeball side surface, and reaches an eyeball, is considered (hereinafter, it should be conveniently considered that the refractive index of air is approximated to be 1 that is the same as in a vacuum to simplify description). When the refractive index of a spectacle lens is n, the incident angle of a ray incident on the object side surface is i, the refractive angle is r, the incident angle of a ray from within the lens reaching the eyeball side surface is i', and the refractive angle of an emergent ray is r', the angle magnification $M\gamma$ passing through the two surfaces of the spectacle lens is expressed by a product of the above-described two kinds of angle magnifications, $M\gamma = \gamma \times \gamma' = (\cos i \times \cos i')/(\cos r \times \cos r')$.

This is irrelevant to the refractive power on the lens surface and known as a magnification of a prism.

Here, when a case of i=r' and r=i' as shown in FIG. 3-1 and FIG. 4-1 is considered, $M\gamma = \gamma \times \gamma' = 1$, which means that there is no change in magnification of an image seen through a prism. Meanwhile, when a ray is perpendicularly incident on the object side surface of the spectacle lens as shown in FIG. 3-2, $M\gamma = \gamma' = \cos i'/\cos r' \geq 1$, and conversely, when a ray perpendicularly exits from the eyeball side surface of the spectacle lens as shown in FIG. 4-2, $M\gamma = \gamma = \cos i/\cos r \leq 1$.

Here, what is important is that the magnifications $M\gamma$ of a prism have a directional property. More specifically, when the distribution of prisms in a progressive-power lens is considered, it naturally varies depending on the diopter and prescription prism value, in which generally prisms in the farsightedness near the lens center are small and prisms in the vertical direction in the nearsightedness located at a lower portion of the lens are large. Therefore, it can be said that the magnification $M\gamma$ of the prism has great influence especially on the vertical direction in the nearsightedness.

Not only a progressive-power lens, but also a typical spectacle lens has a meniscus shape in which the object side surface is convex and the eyeball side surface is concave, and thus taking it into consideration that the sight line in nearsightedness is in a downward direction, it can be said that the nearsightedness through the progressive-power lens having a positive refractive power in the near portion as shown in FIG. 3-3, is similar to the shape in FIG. 3-2 of $M\gamma \geq 1$ rather than in FIG. 3-1 of $M\gamma = 1$, and at least $M\gamma > 1$. Similarly, it can be said that the nearsightedness through the progressive-power lens having a negative refractive power in the near portion as shown in FIG. 4-3, is similar to the shape in FIG. 4-2 of $M\gamma \leq 1$ rather than in FIG. 4-1 of $M\gamma = 1$, and at least $M\gamma < 1$. Accordingly, $M\gamma > 1$ in the nearsightedness through the progressive-power lens having a positive refractive power in the near portion, and $M\gamma < 1$ in the nearsightedness through the progressive-power lens having a negative refractive power in the near portion.

As a result, while the magnification SM of the lens in Prior art 1 is grasped only as a product of the power factor Mp and the shape factor Ms as described above, the present invention aims to further multiply the product by the magnification $M\gamma$ of a prism to obtain a correct magnification of a lens.

The magnification $M\gamma$ by a prism is called a "prism factor" in contrast with Mp and Ms, and when suffix v is added for the vertical direction, and suffix h is added for the horizontal direction to express the magnification SM of an image, the above-described equations (1v') and (1h') are rewritten as follows:

$SMv = Mpv \times Msv \times M\gamma v$ (1v")

$SMh = Mph \times Msh \times M\gamma h$ (1h")

It should be noted that these $M\gamma v$ and $M\gamma h$ can be obtained in the process of the above-described accurate ray tracing calculations. This can solve the problem of the influence by the prism action in the magnification calculations of a spectacle.

In a typical convex surface progressive-power lens, the distance portion is lower than the near portion in surface refractive power of a "progressive surface" being the object side surface. In contrast to this, in the progressive-power lens of Prior art 1, the distance portion is set equal to the near portion in surface refractive power of a "progressive surface" being the object side surface, thereby changing the ratio in the shape factor between the distance and near portions and decreasing the magnification difference of an image between the distance and near portions, so as to improve the distortion and sway of an image by the progressive-power lens.

In the study in the present invention, however, it is shown that although a reduction in the surface refractive power difference between the distance and near portions of a "progressive surface" being the object side surface presents an advantage of a decrease in the magnification difference of an image between the distance and near portions in the horizontal direction, this advantage has some problems in decreasing the surface refractive power difference in the vertical direction.

A first problem is influence by the prism factor Mγv in the vertical direction.

The prism factor Mγv in the vertical direction is as Mγv<1 when the near portion has a negative refractive power, and Mγv>1 when the near portion has a positive refractive power as described above, and this tendency is enhanced by decreasing the surface refractive power difference in the vertical direction, whereby Mγv deviates from Mγv=1, which is a magnification of a naked eye, in either case of the diopter in the near portion being positive or negative. Meanwhile, the prism factor Mγh in the horizontal direction receives no such influence, and thus it is kept as Mγh=1. As a result, there arises a difference between the vertical and horizontal directions in the magnification of an image especially in a portion from the near portion to a portion lower than that, thereby causing a disadvantage that an item which should look square under proper condition looks longer than wider in a plus diopter and wider than longer in a minus diopter.

A second problem is one occurring only when the near portion has a positive refractive power especially in the vertical direction. Specifically, when the surface refractive power difference in the vertical direction is decreased, the angle between the sight line and the lens surface in the near-sightedness is further increased, whereby the power factor Mpv in the vertical direction is increased and acts doubly with the increase in the prism factor Mγv in the vertical direction, which is the first problem, to increase the magnification SMv in the vertical direction, resulting in a disadvantage that the magnification difference of an image between the distance and near portions increases.

In short, it is shown that the reduction in the surface refractive power difference between the distance and near portions of a progressive surface being the object side surface is an advantage in the horizontal direction but is conversely deterioration in the vertical direction. Therefore, in a conventional-type convex surface progressive-power lens, the above-described problems can be solved by dividing the progressive surface being the object side surface into the vertical direction and the horizontal direction, and decreasing the surface refractive power difference between the distance and near portions only in the horizontal direction.

These things completely apply to the fact that "the visual field is widened" which is generally regarded as a merit of rear surface progression (or concave surface progression) that is the eyeball side of a lens as described below.

It is generally known that an excellent visual field in the horizontal direction has its limits since there is astigmatism in the peripheral portion of the "progressive surface." Then, if the "progressive surface" is placed on the eyeball side surface, the "progressive surface" itself approaches the eye to present an advantage that the excellent visual filed is widened in the horizontal direction. On the other hand, this results conversely in a further distance between the distance and near visual regions in the vertical direction to present a disadvantage that a labor increases in rotating the eye from the far-sightedness to the nearsightedness. In other words, the rear surface progression (or concave surface progression), as compared to the conventional front surface progression (or convex surface progression), presents an advantage of widening the visual field in the horizontal direction but a disadvantage of increasing an eyeball turning angle from the far-sightedness to the nearsightedness in the vertical direction.

The present invention, however, includes the progressive refracting surface which satisfies the relational equations DHf+DHn<DVf+DVn and DHn<DVn, or DVn−DVf>ADD/2 and DHn+DHf<ADD/2 as described above, and thus the present invention has characteristics created by the rear surface progression (or concave surface progression) greater than those by the conventional front surface progression (or convex surface progression) in the horizontal direction, and characteristics created by the conventional front surface progression (or convex surface progression) greater than those by the rear surface progression (or concave surface progression) in the vertical direction. Therefore, according to the present invention, it is possible to restrain the disadvantage of increasing the eyeball turning angle between the distance and near portions in the vertical direction while receiving the advantage of increasing the visual field in the horizontal direction.

Particularly, as shown in Example 1, which will be described later, when DVn−DVf=ADD and DHn−DHf=0, a lens has progressions identical to the conventional front surface progression (or convex surface progression) in the vertical direction and to the rear surface progression (or concave surface progression) in the horizontal direction. Therefore, this case presents an extremely excellent result that the advantage in the horizontal direction can be obtained while avoiding the disadvantage in the vertical direction.

The above things are also effective for decreasing the magnification difference of an image between the distance portion and the near portion and improving the distortion and sway of the image as described above, and thus they can be said to be effects of the present invention.

As has been described, the most important characteristic of the present invention is that a progressive action of a progressive-power lens is divided in the vertical direction and the horizontal direction of the lens, and then an optimal sharing ratio between the front and rear two surfaces is set in each direction to configure one bi-aspherical type progressive-power lens. Here, the sharing ratio of the progressive action in the vertical direction of the object side surface and the sharing ratio of the progressive action in the horizontal direction of the eyeball side surface of the lens can be set in a form surpassing at least 50%. For example, it is also possible to set a sharing ratio such that all the progressive action in the vertical direction is provided by the object side surface of the lens, and all the progressive action in the horizontal direction is provided by the eyeball side surface of the lens.

When adopting this structure, either of the front and rear two faces of the lens does not function as a normal progressive surface only by one surface, and the addition diopter as a progressive surface cannot be specified. Then, a cylindrical surface or the like is combined with this surface based on a prescription.

Contrarily, although all the above-described various prior arts are different in sharing ratio of addition diopter, the "value" of a required addition diopter as a progressive surface is allotted first to front and rear two surfaces respectively, and after an actual progressive surface to which each allotted addition diopter is given is imagined, a combined surface with a cylindrical surface is configured as required. In other words, the preset invention does not have a structure such that the progressive action is separately set in the vertical direction and the horizontal direction on the object side surface and the eyeball side surface of a lens.

As described above, the lens according to the present invention is a bi-aspherical type progressive-power lens having an utterly novel structure such that an aspherical surface having progressive actions different in both the vertical and horizontal directions is used for both surfaces.

[Bi-aspherical Type Progressive-power Lens According to the Present Invention]

Hereinafter, the bi-aspherical type progressive-power lens according to an embodiment of the present invention of the application will be described.

(Procedures of Lens Design)

While various procedures can be adopted in the outline of procedures of an optical designing method of the bi-aspherical type progressive-power lens, the following method can be used for example:

[1] Setting of input information for lens design,
[2] Double surface design of a lens as a convex progressive-power lens,
[3] Conversion into a convex surface shape according to the present invention and accompanying rear surface correction of the lens, and
[4] Rear surface correction of the lens accompanying a transmission design, a Listing's law-compliant design, and so on.

Hereinafter, the individual procedure will be made into further divided steps for detailed description.

([1] Setting of Input Information for Lens Design)

Input information for defining a predetermined progressive-power spectacle lens in lens design is set. Here, the input information is roughly divided into the following two types, item specific information and wearer specific information, to be explained (incidentally, factors other than those for optical design are omitted).

[1]-1: Item Specific Information

It is data specific to a lens item. It is data regarding lens physicality/form factor such as a refractive index of a raw material Ne, a minimum center thickness CTmin, a minimum edge thickness ETmin, progressive surface design parameters, and so on.

[1]-2: Wearer Specific Information

Data of factors regarding a prescription, wearing state, lens and frame, such as a far vision diopter (a spherical surface diopter S, a cylindrical diopter C, a cylindrical axis AX, a prism diopter P, a prism base direction PAX, and so on), an addition diopter ADD, frame shape data (preferably, three-dimensional shape data), frame wearing data (a forward tilt angle, a horizontal tilt angle, and so on), an inter-vertex distance, lay-out data (a farsightedness PD, a nearsightedness CD, an eye point position, and so on), and other data on an eyeball.

It should be noted that progressive surface design parameters such as a progressive zone length specified by a wearer, a measuring method of an addition diopter, an amount of inner shift of the near portion are classified into the wearer specific information.

([2] Double Surface Design of a Lens as a Convex Progressive-power Lens)

In an initial stage, a lens is designed, divided into a convex surface and a concave surface, as a conventional type convex progressive-power lens.

[2]-1: Convex Surface Shape (Convex Progressive Surface) Design

To realize the addition diopter ADD and the progressive zone length provided as input information, a conventional type convex progressive surface shape is designed in accordance with the progressive surface design parameters being the input information. Various conventional lens design methods can be used in the design in this step.

A specific example of this lens design method is, for example, a method of setting first a "principal meridian" corresponding to the spine of a lens when forming a lens surface. It is preferable that the "principal meridian" is finally a "principal sight line" corresponding to an intersecting line of a sight line and a lens surface when a spectacle wearer looks with both eyes from a front upper portion (far) to a lower portion (near). However, the inner shift of the near region in response to the convergence action of the eye in the nearsightedness is not necessarily dealt with through inner shift of the "principal sight line" as will be described later. Therefore, the "principal sight line" here is defined as one meridian (principal meridian) in the vertical direction which passes through the lens center and divides the lens surface into a right part and a left part. Further, a lens has front and rear two surfaces, and thus there are two "principal meridians" on the front and rear surfaces. The "principal meridian" looks straight when viewed perpendicularly to the lens surface, but it generally becomes a curved line in a three-dimensional space when the lens surface is a curved surface.

Then, based on the information such as a predetermined addition diopter and progressive zone length, an appropriate refractive power distribution along the "principal meridian" is set. Although the refractive power distribution can be set dividedly to the front and rear two surfaces, with the influence by the thickness of the lens and an angle between a sight line and a refractive surface taken into consideration, all the progressive action should be provided on a first refractive surface being an object side surface since the conventional type convex progressive surface shape is adopted in the design in this step.

Therefore, for example, assuming that when a surface refractive power of a front surface (a first refractive surface being an object side surface) of a lens is $D_1$, and a surface refractive power of a rear surface (a second refractive surface being an eyeball side surface) of the lens is $D_2$, a resulting transmission refractive power is D, generally the transmission refractive power D can be approximately obtained as $D \approx D_1 - D_2$. The combination of $D_1$ and $D_2$ in this lens, however, preferably has a meniscus shape in which the object side surface is convex and the eyeball side surface is concave.

Note that $D_2$ has a positive value here. Although the rear surface of the lens is generally a concave surface and thus has a surface refractive power of a negative value, $D_2$ should be given a positive value in this specification for simplification of description to calculate the transmission refractive power D by subtracting $D_2$ from $D_1$.

A relational equation between the surface refractive power and the surface shape is generally defined by the following equation, $$Dn=(N-1)/R$$

where Dn: a surface refractive power of an n-th surface (unit: diopter), N: a refractive index of a lens material, R: a radius of curvature (unit: m). Therefore, a method of converting the distribution of the surface refractive power into a distribution of curvature uses the equation, $$1/R=Dn/(N-1),$$

created by transforming the above relational equation. By obtaining the distribution of curvature, the geometrical shape of the "principal meridian" is uniquely determined, which means that the "principal meridian" corresponding to the spine in forming a lens surface is set.

What is required next is designing a "sectional curved line group in the horizontal direction" corresponding to costae in forming the lens surface. Though intersecting angles of the "sectional curved line group in the horizontal direction" and the "principal meridian" are not necessarily right angles, each "sectional curved line in the horizontal direction" should intersect at right angles with the "principal meridian" to simplify the description. Further, although "surface refractive powers in the horizontal direction" of the "sectional curved line group in the horizontal direction" at intersections with the "principal meridian" do not always need to be identical to "surface refractive powers in the vertical direction" along the "principal meridian", the surface refractive powers in the vertical direction and the horizontal direction at the intersections are identical with each other in this embodiment.

All the "sectional curved lines in the horizontal direction" can be simple circular curved lines having surface refractive powers at the intersections, and can also be made with applications by various prior arts incorporated thereto. One of conventional technologies on surface refractive power distribution along the "sectional curved line in the horizontal direction" is, for example, a technology in Japanese Patent Publication No. Sho 49-3595. This technology is characterized in that one "sectional curved lines in the horizontal direction" in an almost circular shape is set near the center of a lens, and sectional curved lines positioned at an upper portion is made to have a distribution of surface refractive power increasing from the center to the side, and sectional curved lines positioned at a lower portion is made to have a distribution of surface refractive power decreasing from the center to the side. As described above, the "principal meridian" and the "sectional curved line group in the horizontal direction" composed of an uncountable number of lines positioned side by side thereon, form a lens surface as the spine and costae, thus determining a refractive surface.

[2]-2: Concave Surface Shape (Spherical or Cylindrical Surface) Design

To realize the far vision diopter provided as the input information, a concave surface shape is designed. The surface becomes a cylindrical surface if the far vision diopter includes a cylindrical diopter, and a spherical surface if not. In this event, the center thickness CT suitable for the diopter and the tilt angle between surfaces, the convex surface and the concave surface, are also designed at the same time, thus determining the shape as a lens. Various conventional known design technologies can also be used in the design in this step.

([3] Conversion into a Convex Shape of the Present Invention and Accompanying Rear Surface Correction of the Lens)

In accordance with the far vision diopter and the addition diopter ADD provided as the input information, the conventional type convex progressive-power lens is converted into the shape as a lens of the present invention.

[3]-1: Convex Surface Shape (the Present Invention) Design

In accordance with the far vision diopter, the addition diopter ADD, and so on provided as the input information, the conventional type convex progressive surface is converted into the convex surface shape of the present invention. In this event, they are divided in the vertical direction and the horizontal direction of the lens in advance to set preferable sharing ratios between the front and rear two surfaces in each direction. More specifically, when a surface refractive power in the horizontal direction and a surface refractive power in the vertical direction, at a far vision diopter measurement position F1, are DHf and DVf respectively, and a surface refractive power in the horizontal direction and a surface refractive power in the vertical direction, at a near vision diopter measurement position N1, are DHn and DVn respectively, the above-described first convex progressive lens surface (the first refractive surface being the object side surface) is converted into a progressive refracting surface which satisfies the relational equations, $$DHf+DHn<DVf+DVn, \text{ and } DHn<DVn,$$

or the relational equations, $$DVn-DVf>ADD/2, \text{ and } DHn-DHf<ADD/2.$$

In this embodiment, it is set to satisfy the both.

In this event, the shape is preferably converted into the convex surface shape of the present invention without changing the average surface refractive power of the whole convex surface. Specifically, it is conceivable, for example, to keep the total average value of the surface refractive powers in the vertical and horizontal directions in the distance portion and the near portion. The value is, however, preferred to be within a range keeping a meniscus shape of the lens, in which the object side surface is convex and the eyeball side surface is concave.

[3]-2: Concave Surface Shape (the Present Invention) Design

The amount of transformation in converting from the conventional type convex progressive surface into the convex surface shape of the present invention in the above-described [3]-1, is added to the concave surface shape designed in [2]-2. In other words, the amount of transformation, identical to that of the front surface (the first refractive surface being the object side surface) of the lens added in the process [3]-1, is added to the rear surface (the second refractive surface being the eyeball side surface) of the lens. This transformation is not uniform over the whole lens surface though it is similar to "bending" in which the lens itself is bent, but makes a surface which satisfies the relational equations described in [3]-1.

It should be noted that, depending on a prescription or specification of a lens, the present invention may be completed in this step. However, it is preferable to handle the above-described corrections as corrections of linear approximation and further add the following rear surface correction step of [4].

([4] Rear Surface Correction of a Lens Accompanying Transmission Design, a Listing's Law-compliant Design, and so on)

To realize the optical function provided as the input information in a lens, in a situation in which a wearer actually wears the lens, it is preferred to further add rear surface correction to the lens according to the present invention obtained in [3].

[4]-1: Concave Surface Shape (the Present Invention) Design with Transmission Design The transmission design means a designing method for obtaining an essential optical function in the situation in which a wearer actually wears a lens, a designing method of adding a "correction action" for eliminating or reducing occurrence of astigmatism and change in diopter primarily caused by impossibility of a sight line intersecting at right angles with a lens surface.

Specifically, as described above, the difference of optical performance of the lens with respect to a target essential optical performance is grasped through accurate ray tracing calculation in accordance with the direction of the sight line, and surface correction (curve correction) to offset the difference is implemented. By repeating this, the difference can be minimized to obtain an optimal solution.

Generally, it is often very difficult and actually impossible to directly calculate a lens shape having a target optical performance. This is because a "lens shape having an arbitrarily set optical performance" does not always actually exist. Conversely, it is relatively easy to obtain an "optical performance of an arbitrarily set lens shape." Therefore, it is possible to bring the optical performance to a target optical performance by first provisionally calculating a linearly approximated surface by an arbitrary method, finely adjusting the design parameters in accordance with evaluation results on the optical performance of the lens shape using the approximated surface, then sequentially modulating the lens shape and returning to the evaluation step for a repeat of reevaluation and readjustment. This technique is an example of well-known techniques called "optimization."

[4]-2: Concave Surface Shape (the Present Invention) Design for a Listing's Law-compliant Design It is known that three-dimensional rotating motions of eyes when we look around are based on a rule called "Listing's law." When a prescription diopter of a lens includes a cylindrical diopter, cylindrical axes of a spectacle lens and the eye may not match to each other in peripheral vision even if the cylindrical axis of the lens is matched to the "cylindrical axis of the eye in front vision." It is also possible to add a "correction action" for eliminating or reducing occurrence of astigmatism and change in diopter caused by such a mismatch between the cylindrical axes of the lens and the eye in the peripheral vision, to a curved surface being the surface on the side having a cylindrical correction action of a lens according to the present invention.

Specifically, in order to add the "correction action" to the curved surface of the lens according to the present invention, similarly to the method of the "optimization" used in [4]-1, the difference of optical performance of the lens with respect to a target essential optical performance is grasped through accurate ray tracing calculation in accordance with the direction of the sight line, and surface correction to offset the difference is implemented. By repeating this operation, the difference can be minimized to obtain an optimal solution.

[4]-3: Concave Surface Shape (the Present Invention) Design for an Inner Shift-compliant Design of a Near Portion As a method of the above-described inner shift, in this embodiment, a design technique is adopted in which a principal meridian (M) from a far vision diopter measurement position (F) to a near vision diopter measurement position (N) is displaced toward the nose side, as shown in FIG. 1 and the explanatory view of the optical layout of progressive-power spectacle lens of FIG. 5-1. This design technique is a method in which convergence of an eye is taken into consideration, and the displacement amount of the principal meridian toward the nose side according to a convergence action is set based on the following equation.

Displacement amount (H)≈A×D+B

Here, H is the displacement amount toward the nose side from the far vision diopter measurement position (F) on the principal meridian (M), D is an additional refractive power (addition diopter ADD), A is a proportional constant, and B is a constant (including 0).

Here, a specific value of the displacement amount is different depending on a prescription or an addition diopter of a lens and can be set discretionary, but the following method can be adopted for example.

In FIG. 5-1, when a coordinate system is assumed such that, with the aforementioned point F being the origin, the rightward direction is the coordinate axis H (displacement amount in the horizontal direction), and the downward direction is the coordinate axis V (vertical direction), an H coordinate and a V coordinate of the near vision diopter measurement position are $H_{MAX}$, $V_{MAX}$ respectively, and an addition diopter thereof is $D_{MAX}$. Then, for example, specifically with the addition diopter $D_{MAX}$ set to 3.00, the displacement amount set to 2.5 mm (adopting B=0 in this case), and V set to 12 mm, the displacement amount of each point on the meridian (M) from the far vision diopter measurement position (F) to the near vision diopter measurement position (N) is set on every coordinate of V to thereby achieve the inner shift. (for example, refer to Japanese Patent Publication No. Sho 62-47284) As a matter of course, arrangement of the principal meridian (principal sight line) according to the convergence action of an eye is not limited to the above-described equation, where adjustment of a convergence amount and other factors may be added.

Regarding the processing method of a lens, although the present invention adopts a surface structure being a bi-aspherical surface, it is not always necessary to start processing of both surfaces after acceptance of an order. For example, it is possible to adopt a method to prepare in advance "semi-finished products (also referred to as a semi-finished lens or a semi-lens for short)" of the object side surface meeting the object of the present invention. Then, after acceptance of an order, one of the "semi-finished products of the object side surface" is selected according to a specification such as a prescription diopter or the above-described custom-made product (individual design), which is then processed only on the eyeball side surface to be finished after the acceptance of the order, so that the cost can be reduced and the processing speed can be increased.

In a specific example of this method, it is possible to adopt a method to prepare the object side surface in advance as a bilaterally symmetrical "semi-finished product" in the above-described convex surface shape (the present invention) design in [3]-1. Specifically, here the principal meridian (=principal sight line) is a straight line, and a distribution of astigmatism on a refractive surface is bilaterally symmetrically designed with respect to the principal meridian, which is not a principal meridian in which convergence of an eye is taken into consideration. (Refer to FIG. 41, which will be described later.) Therefore, it is not necessary to prepare semi-lenses separately for left eyes and right eyes, which facilitates processing and inventory control. Then, after individual information such as an inter-pupil distance, object distance in nearsightedness, and addition diopter is inputted, the eyeball side surface of this lens is designed as a bilaterally asymmetrical curved surface (distributions of astigmatism on refractive surfaces of a progressive portion and a near portion are asymmetrical with respect to the principal meridian) meeting the purpose, whereby the inner shift of the near portion in response to the individual information can be performed.

Hereinafter, examples of the bi-aspherical surface progressive-power refractive lens designed by the above-described designing method will be described with reference to the drawings.

FIG. 7 is a view collectively showing in Table 1-1 and Table 1-2 "surface refractive powers" and "results of accurate magnification calculations in a direction of a specific sight line" of Examples 1, 4, 5, and 6 and Prior arts A, B, and C corresponding to the diopters of Examples 1, 4, 5, and 6. FIG. 8 is a view collectively showing in Table 2-1 and Table 2-2 "surface refractive powers" and "results of accurate magnification calculations in a direction of a specific sight line" of Examples 2 and 7 and Prior arts A, B, and C corresponding to the diopters of Examples 2 and 7. FIG. 9 is a view collectively showing in Table 3-1 and Table 3-2 "surface refractive powers" and "results of accurate magnification calculations in a direction of a specific sight line" of Example 3 and Prior arts A, B, and C corresponding to the diopters of the example 3. FIG. 10 is a view showing Graphs 1-1, 1-2, 2-1, and 2-2 representing the surface refractive power distributions of Example 1 and Example 2, FIG. 11 is a view showing Graphs 3-1 and 3-2 representing the surface refractive power distributions of Example 3, FIG. 12 is a view showing Graphs 4-1, 4-2, 5-1, 5-2, 6-1 and 6-2 representing the surface refractive power distributions of Example 4 to Example 6, FIG. 13 is a view showing Graphs 7-1 and 7-2 representing the surface refractive power distributions of Example 7, and FIG. 14 is a view showing Graphs A-1, A-2, B-1, B-2, C-1 and C-2 representing the surface refractive power distributions of Prior art examples A, B, and C.

FIG. 15 shows Graph 1-3-Msv representing the results, obtained by performing accurate magnification calculations, of magnification distributions when lenses of Example 1 and three kinds of Prior art examples A, B, and C corresponding to the diopters of Example 1 are viewed along principal sight lines, FIG. 16 shows Graph 1-3-Msh representing results, obtained by performing accurate magnification calculations, of the magnification distributions when the lenses of Example 1 and the three kinds of Prior art examples A, B, and C corresponding to the diopters of Example 1 are viewed along the principal sight lines, FIG. 17 shows Graph 1-3-Mpv representing results, obtained by performing accurate magnification calculations, of the magnification distributions when the lenses of Example 1 and the three kinds of Prior art examples A, B, and C corresponding to the diopters of Example 1 are viewed along the principal sight lines, FIG. 18 shows Graph 1-3-Mph representing results, obtained by performing accurate magnification calculations, of the magnification distributions when the lenses of Example 1 and the three kinds of Prior art examples A, B, and C corresponding to the diopters of Example 1 are viewed along the principal sight lines, FIG. 19 shows Graph 1-3-Mγv representing results, obtained by performing accurate magnification calculations, of the magnification distributions when the lenses of Example 1 and the three kinds of Prior art examples A, B, and C corresponding to the diopters of Example 1 are viewed along the principal sight lines, FIG. 20 shows Graph 1-3-Mγh representing results, obtained by performing accurate magnification calculations, of the magnification distributions when the lenses of Example 1 and the three kinds of Prior art examples A, B, and C corresponding to the diopters of Example 1 are viewed along the principal sight lines, FIG. 21 shows Graph 1-3-SMv representing results, obtained by performing accurate magnification calculations, of the magnification distributions when the lenses of Example 1 and the three kinds of Prior art examples A, B, and C corresponding to the diopters of Example 1 are viewed along the principal sight lines, and FIG. 22 shows Graph 1-3-SMh representing results, obtained by performing accurate magnification calculations, of the magnification distributions when the lenses of Example 1 and the three kinds of Prior art examples A, B, and C corresponding to the diopters of Example 1 are viewed along the principal sight lines.

FIG. 23 shows Graph 2-3-Msv representing results, obtained by performing accurate magnification calculations, of magnification distributions when lenses of Example 2 and three kinds of Prior art examples A, B, and C corresponding to the diopters of Example 2 are viewed along principal sight lines, FIG. 24 shows Graph 2-3-Msh representing results, obtained by performing accurate magnification calculations, of the magnification distributions when the lenses of Example 2 and the three kinds of Prior art examples A, B, and C corresponding to the diopters of Example 2 are viewed along the principal sight lines, FIG. 25 shows Graph 2-3-Mpv representing results, obtained by performing accurate magnification calculations, of the magnification distributions when the lenses of Example 2 and the three kinds of Prior art examples A, B, and C corresponding to the diopters of Example 2 are viewed along the principal sight lines, FIG. 26 shows Graph 2-3-Mph representing results, obtained by performing accurate magnification calculations, of the magnification distributions when the lenses of Example 2 and the three kinds of Prior art examples A, B, and C corresponding to the diopters of Example 2 are viewed along the principal sight lines, FIG. 27 shows Graph 2-3-Mγv representing results, obtained by performing accurate magnification calculations, of the magnification distributions when the lenses of Example 2 and the three kinds of Prior art examples A, B, and C corresponding to the diopters of Example 2 are viewed along the principal sight lines, FIG. 28 shows Graph 2-3-Mγh representing results, obtained by performing accurate magnification calculations, of the magnification distributions when the lenses of Example 2 and the three kinds of Prior art examples A, B, and C corresponding to the diopters of Example 2 are viewed along the principal sight lines, FIG. 29 shows Graph 2-3-SMv representing results, obtained by performing accurate magnification calculations, of the magnification distributions when the lenses of Example 2 and the three kinds of Prior art examples A, B, and C corresponding to the diopters of Example 2 are viewed along the principal sight lines, and FIG. 30 shows Graph 2-3-SMh representing results, obtained by performing accurate magnification calculations, of the magnification distributions when the lenses of Example 2 and the three kinds of Prior art examples A, B, and C corresponding to the diopters of Example 2 are viewed along the principal sight lines.

FIG. 31 shows Graph 3-3-Msv representing results, obtained by performing accurate magnification calculations, of magnification distributions when lenses of Example 3 and three kinds of Prior art examples A, B, and C corresponding to the diopters of Example 3 are viewed along principal sight lines, FIG. 32 shows Graph 3-3-Msh representing results, obtained by performing accurate magnification calculations, of the magnification distributions when the lenses of Example 3 and the three kinds of Prior art examples A, B, and C corresponding to the diopters of Example 3 are viewed along the principal sight lines, FIG. 33 shows Graph 3-3-Mpv representing results, obtained by performing accurate magnification calculations, of the magnification distributions when the lenses of Example 3 and the three kinds of Prior art examples A, B, and C corresponding to the diopters of Example 3 are viewed along the principal sight lines, FIG. 34 shows Graph 3-3-Mph representing results, obtained by performing accurate magnification calculations, of the magnification distributions when the lenses of Example 3 and the three kinds of Prior art examples A, B, and C corresponding to the diopters of Example 3 are viewed along the principal sight lines, FIG. 35 shows Graph 3-3-Mγv representing results, obtained by performing accurate magnification calculations, of the magnification distributions when the lenses of Example 3 and the three kinds of Prior art examples A, B, and C corresponding to the diopters of Example 3 are viewed along the principal sight lines, FIG. 36 shows Graph 3-3-Mγh representing results, obtained by performing accurate magnification calculations, of the magnification distributions when the lenses of Example 3 and the three kinds of Prior art examples A, B, and C corresponding to the diopters of Example 3 are viewed along the principal sight lines, FIG. 37 shows Graph 3-3-SMv representing results, obtained by performing accurate magnification calculations, of the magnification distributions when the lenses of Example 3 and the three kinds of Prior art examples A, B, and C corresponding to the diopters of Example 3 are viewed along the principal sight lines, and FIG. 38 shows Graph 3-3-SMh representing results, obtained by performing accurate magnification calculations, of the magnification distributions when the lenses of Example 3 and the three kinds of Prior art examples A, B, and C corresponding to the diopters of Example 3 are viewed along the principal sight lines.

EXAMPLE 1

Table 1-1 in FIG. 7 is a list regarding the surface refractive powers of Example 1 according to the present invention. The diopter of a lens of Example 1 corresponds to S being 0.00 and ADD being 3.00, with three kinds of prior art examples having the same diopters being listed together for comparison. It should be noted that Prior art example A, Prior art example B, and Prior art example C correspond to a "convex surface progressive-power lens" in which the object side surface is a progressive surface, a "bi-aspherical progressive-power lens" in which both the object side surface and eyeball side surface are progressive surfaces, and a "concave surface progressive-power lens" in which the eyeball side surface is a progressive surface, respectively. Meanings of items used in Table 1-1 are as follows:

DVf1: surface refractive power in the vertical direction at a far vision diopter measurement position F1 on the object side surface, DHf1: surface refractive power in the horizontal direction at the far vision diopter measurement position F1 on the object side surface, DVn1: surface refractive power in the vertical direction at a near vision diopter measurement position N1 on the object side surface, DHn1: surface refractive power in the horizontal direction at the near vision diopter measurement position N1 on the object side surface, DVf2: surface refractive power in the vertical direction at a far vision diopter measurement position F2 on the eyeball side surface, DHf2: surface refractive power in the horizontal direction at the far vision diopter measurement position F2 on the eyeball side surface, DVn2: surface refractive power in the vertical direction at a near vision diopter measurement position N2 on the eyeball side surface, and DHn2: surface refractive power in the horizontal direction at the near vision diopter measurement position N2 on the eyeball side surface.

Graphs 1-1 and 1-2 in FIG. 10 are graphs showing the surface refractive power distribution along the principal sight line of the lens of Example 1, with the horizontal axis indicating positions (distances) of the lens, the right hand side indicating the lens upper side, the left hand side indicating the lens lower side, and the vertical axis indicating the surface refractive power. Here, Graph 1-1 corresponds to the object side surface of the lens, and Graph 1-2 corresponds to the eyeball side surface of the lens. Besides, the graph shown by a solid line represents the surface refractive power distribution in the vertical direction along the principal sight line of the lens, and the graph shown by a dotted line represents the surface refractive power distribution in the horizontal direction along the principal sight line of the lens.

In Graph 1-1, as shown in the diagram, on a graph CV1 (solid line) showing the surface refractive power distribution in the vertical direction along the principal sight line on the object side surface, its refractive power distribution changes from a progressive zone to a near portion, but there is no change on a graph CH1 (dotted line) showing the surface refractive power distribution in the horizontal direction. Further, between the graph CV1 (solid line) showing the surface refractive power distribution in the vertical direction and the graph CH1 (dotted line) showing the surface refractive power distribution in the horizontal direction, the surface refractive power differs from the progressive zone to the near portion.

In this case, on a ray optically passing through the principal sight line of the object side surface, an astigmatism by an amount of approximately the difference between the surface refractive powers of the vertical direction and the horizontal direction occurs.

On the other hand, in Graph 1-2, as shown in the diagram, on a graph CV2 (solid line) showing the surface refractive power distribution in the vertical direction along the principal sight line on the object side surface, its refractive power distribution does not change from the distance portion to the progressive zone to the near portion. On the other hand, a graph CH2 (dotted line) showing the surface refractive power distribution in the horizontal direction differs in the surface refractive power from the progressive zone to the near portion. Also, the surface refractive power distributions of the graph CV2 (solid line) showing the surface refractive power distribution in the vertical direction and the graph CH2 (dotted line) showing the surface refractive power distribution in the horizontal direction differs from the progressive zone to the near portion, similarly to Graph 1-1. However, the difference in the surface refractive powers, as can be seen from this Graph 1-2, has a distribution corresponding to Graph 1-1 in an inverse tendency, and it can be seen that the difference in the surface refractive powers is provided to offset the astigmatism occurring on the object side surface with respect to the ray passing through the principal sight line on the eyeball side surface.

As a result, it is possible that a combination of the refractive surfaces on the object side surface and the eyeball side surface gives a far vision diopter and an addition diopter based on prescription values.

It should be noted that these graphs are for explaining the basic difference in surface structure, omitting factors such as a case of aspherical processing for eliminating astigmatism in a peripheral portion and a case of addition of a cylindrical component for coping with a cylindrical diopter. (Hereinafter, the same applies to Examples 2 to 7)

Further, for comparison, Graphs A-1 and A-2, Graphs B-1 and B-2, and Graphs C-1 and C-2 are shown in FIG. 14 as graphs showing the surface refractive power distributions along the principal sight lines of the lenses of the three kinds of prior art examples having the same diopters, which are listed in Table 1-1. Note that, meanings of terms in these graphs are as follows:

F1: far vision diopter measurement position on the object side surface,

F2: far vision diopter measurement position on the eyeball side surface,

N1: near vision diopter measurement position on the object side surface,

N2: near vision diopter measurement position on the eyeball side surface,

CV1: graph showing the surface refractive power distribution in the vertical direction along the principal sight line on the object side surface (shown by the solid line), CH1: graph showing the surface refractive power distribution in the horizontal direction along the principal sight line on the object side surface (shown by the dotted line), CV2: graph showing the surface refractive power distribution in the vertical direction along the principal sight line on the eyeball side surface (shown by the solid line), and CH2: graph showing the surface refractive power distribution in the horizontal direction along the principal sight line on the eyeball side surface (shown by the dotted line).

The surface refractive powers at F1, N1, F2, and N2 on these graphs correspond to those in the aforementioned Table 1-1, and meanings of the terms such as DVf1 to DHn2 are also the same as those in the aforementioned Table 1-1. Note that one-dotted chain lines in the horizontal direction at the middle in these graphs show average surface refractive powers on the object side surface (total average values of the vertical and horizontal surface refractive powers at F1 and N1). Any of the average surface refractive powers on the object side surface in Example 1 according to the present invention and the three kinds of prior art examples was uniformly set to 5.50 diopter for comparison.

The next eight kinds of graphs starting with Graph 1-3- shown in FIG. 15 to FIG. 22 are graphs showing results, obtained by performing the above-described accurate magnification calculations, of magnification distributions when the lens of Example 1 according to the present invention is viewed along the principal sight line, with the horizontal axis indicating the lens upper side on the right hand side and the lens left lower side on the left hand side, and the vertical axis indicating the magnification. In the drawing, a thick solid line is for Example 1, a thin chain line is for Prior art example A, a thick chain line is for Prior art example B, and a thin solid line is for Prior art example C. These apply to the following graphs of this kind. Note that the horizontal axis was set to allow comparison for each sight line direction through use of eyeball turning angles, and magnification scales on the vertical axes of the graphs were matched to each other. Symbols appended to "Graph 1-3-" mean, Msv: shape factor in the vertical direction,
Msh: shape factor in the horizontal direction,
Mpv: power factor in the vertical direction,7
Mph: power factor in the horizontal direction,
Mγv: prism factor in the vertical direction,
Mγh: prism factor in the horizontal direction,
SMv: magnification in the vertical direction, and
SMh: magnification in the horizontal direction, and, as described above, the magnification SMv in the vertical direction and the magnification SMh in the horizontal direction are in the relation such that $$SMv = Msv \times Mpv \times M\gamma v$$

$$SMh = Msh \times Mph \times M\gamma h.$$

It should be noted that any lens of Example 1 and the above-described three kinds of prior art examples was made under specifications with the refractive index n=1.699, the center thickness t=3.0 mm, and no prism at the geometrical center GC. The objective power (inverse number of the object distance) was set such that the objective power Px at F1, F2 was set as Px=0.00 diopter (infinite far), the objective power Px at N1, N2 was set as Px=2.50 diopter (40 cm), and the objective powers given in other positions were made by multiplying ratios of the additional refractive powers along the principal sight line by 2.50 diopter. Besides, the distance L from the lens rear vertex to the corneal vertex was set as L=15.0 mm, and the distance from the corneal vertex to the eyeball tuning center CR was set as CR=13.0 mm. The eyeball turning angle θ was indicated, with the eyeball tuning center point C being positioned on the normal line passing through the geometrical center GC on the object side lens surface, the rotating angle when the normal line and the sight line match to each other being regarded as 0 degree, and the upper portion shown with (+) and the lower portion shown with (−). Thereafter, standardization was made such that the eyeball turning angle θ with respect to F1, F2 was +15.0 degrees, and the eyeball turning angle θ with respect to N1, N2 was −30.0 degrees, for allowing comparison on the same condition even the progressive action and the surface refractive power distribution were either on front or rear side.

Table 1-2 in FIG. 7 is a list of results obtained by performing the above-described accurate magnification calculations for a specific sight line direction of Example 1 according to the present invention and the three kinds of lenses of prior art examples prepared for comparison, and corresponds to the above-described Graph 1-3-SMv (total magnification in the vertical direction) in FIG. 21 and Graph 1-3-SMh (total magnification in the horizontal direction) in FIG. 22. Since magnification values are different between the vertical direction and horizontal direction as described above, both magnifications were calculated. Here, meanings represented by symbols in Table 1-2 are as follows:

SMvf: magnification in the vertical direction on a sight line passing through a farsightedness measurement point, SMvn: magnification in the vertical direction on a sight line passing through a nearsightedness measurement point, SMvfn: magnification difference in the vertical direction (SMvn−SMvf), SMhf: magnification in the horizontal direction on a sight line passing through a farsightedness measurement point, SMhn: magnification in the horizontal direction on a sight line passing through a nearsightedness measurement point, and SMhfn: magnification difference in the horizontal direction (SMhn−SMhf).

SMvfn and SMhfn in Table 1-2, that is, the magnification difference in the vertical direction (SMvn−SMvf) and the magnification difference in the horizontal direction (SMhn−SMhf), show that the values of magnification differences of Example 1 according to the present invention are suppressed to as low as 0.1342 and 0.0954, whereas those of the prior art examples are 0.1380 and 0.1015 in A, 0.1360 and 0.0988 in B, and 0.1342 and 0.0961 in C. In other words, the magnification difference between the distance portion and the near portion of Example 1 according to the present invention are made further smaller than those of Prior art 1, which shows that Example 1 is improved more greatly than Prior art 1 also in distortion and sway of an image. Note that the difference between the vertical direction and the horizontal direction in calculating the magnification is not taken into consideration at all in the Patent Document 2 corresponding to the above-described Prior art 1. However, as is immediately apparent from comparison between Graph 1-3-SMv (total magnification in the vertical direction) in FIG. 21 and Graph 1-3-SMh in FIG. 22 (total magnification in the horizontal direction) resulting from accurate magnification calculations, corresponding to Example 1 according to the present invention, magnification distributions of an image in the vertical direction and the horizontal direction are 15 apparently different. Further, it is easily read that this difference is prominent mainly in the near portion and a portion lower than that (at an eyeball turning angle of around −20 degrees and lower).

As expressed in the above-described magnification calculation equations, the magnification in the vertical direction $SMv = Msv \times Mpv \times M\gamma v$, the magnification in the horizontal direction $SMh = Msh \times Mph \times M\gamma h$, Graph 1-3-SMv is obtained by multiplying three elements, that is, values of Graph 1-3-Msv, Graph 1-3-Mpv, and Graph 1-3-Mγv, and similarly Graph 1-3-SMh is obtained by multiplying three elements, that is, values of Graph 1-3-Msh, Graph 1-3-Mph, and Graph 1-3-Mγh. In comparison between the elements in the vertical direction and the horizontal direction here, there is no apparent difference found between Msv and Msh, which are shape factors, whereas there is a difference found between Mpv and Mph in a portion lower than the near portion (at an eyeball turning angle of around −25 degrees and lower). Further, there is an obvious difference between Mγv and Mγh in the near portion and a lower portion than that (at an eyeball turning angle of around −15 degrees and lower). In short, it is shown that the major cause of the difference between Graph 1-3-SMv and Graph 1-3-SMh is the difference between Mγv and Mγh, the secondary cause thereof is the difference between Mpv and Mph, and there is no obvious difference found between Msv and Msh, which are almost irrelevant thereto. Consequently, the reason why there is no difference found between magnifications in the vertical direction and the horizontal direction in the Patent Document 2 corresponding to Prior art 1 is that the prism factors Mγv and Mγh, which are major causes of a magnification difference, are not taken into consideration at all, and because the object distance and the angle between the sight line and lens are neglected, there is no difference found between the power factors Mpv and Mph, which are secondary causes. Further, there is no difference found among the examples in the magnification difference between the distance portion and the near portion, as long as in the scale used in Example 1 of the present invention, in the shape factors Msv and Msh which are regarded as reasons of improvement in Prior art 1.

In Prior art 1 "the distortion and sway of an image can be reduced" by "decreasing the magnification difference between the distance portion and the near portion," and further "decreasing the magnification difference between the vertical direction and the horizontal direction" is also regarded as having an effect of "capable of reducing the distortion and sway of an image" in the present invention. This is intended to prevent a square item from looking flat, or a circular item from looking oval. The improvement in visual sense would be essentially seen as "bringing the ratio closer to 1" rather than "reducing the difference." What is important here is that the sense of a square item looking flat or a circular item looking oval is not due to a "far-near ratio" but due to a "vertical-horizontal ratio." In other words, the present invention can provide, as a further important improvement, an improved effect of "capable of reducing the distortion and sway of an image" not only by "decreasing the magnification difference between the distance portion and the near portion" but also by "decreasing the magnification difference between the vertical direction and the horizontal direction to bring the magnification ratio closer to 1." Note that these tendencies are prominent mainly in a portion lower than the near portion (at an eyeball turning angle of around −25 degrees and lower).

Here, measured results of astigmatism distributions and average diopter distributions of the lens according to Example 1 are shown. It should be noted that the measured results are shown using curved lines connecting equal level points of 0.25 diopter pitch.

All the drawings disclosed in the present specification explain lenses for right eyes with a lens diameter of 50 mm.

FIG. 39 is a view showing an astigmatism distribution in a transmission state of a double surface design lens, and FIG. 40 is a view showing an average diopter distribution of the same.

FIG. 41 is a view showing an astigmatism distribution on the convex surface side (first surface) of the double surface design lens, and FIG. 42 is a view showing an average diopter distribution of the same. Particularly, it can be easily understood that the progressive zone is in a substantially linear shape in the astigmatism distribution and the average diopter distribution. The reason why the progressive zone is not a perfectly straight line is that it includes an aspheric component.

FIG. 43 is a view showing a diopter distribution in the horizontal direction on a refractive surface on the convex surface side (first surface) of the double surface design lens, and FIG. 44 is a view showing a diopter distribution in the vertical direction on the refractive surface of the same.

FIG. 45 is a view showing an astigmatism distribution of the concave surface side of the double surface design lens, and FIG. 46 is a view showing an average diopter distribution of the same.

FIG. 47 is a is a view showing a diopter distribution in the horizontal direction on a refractive surface on the concave surface side (second surface) of the double surface design lens, and FIG. 48 is a view showing a diopter distribution in the vertical direction on the refractive surface of the same.

Further, for comparison, measured results of an astigmatism distribution and an average diopter distribution of a lens according to prior arts are shown.

FIG. 49 is a view showing an astigmatism distribution on the convex surface side (first surface) of the lens according to prior arts, and FIG. 50 is a view showing an average diopter distribution of the same.

FIG. 51 is a view showing a diopter distribution in the horizontal direction on a refractive surface on the convex surface side (first surface) of the lens according to prior arts, and FIG. 52 is a view showing a diopter distribution in the vertical direction on the refractive surface of the same.

It should be noted that in the case of the lens according to prior arts, the concave side surface (second surface) is a spherical surface or a cylindrical surface, and it is not possible to draw curved lines connecting equal level points of 0.25 diopter pitch, so that the curved lines are omitted.

EXAMPLE 2

Table 2-1 in FIG. 8 is a list regarding the surface refractive powers of Example 2 according to the present invention. The diopter of a lens of Example 2 correspond to S being +6.00 and ADD being 3.00, with three kinds of prior art examples having the same diopters being listed together for comparison. It should be noted that the manner of description, terms, and so on of these prior art examples are the same as those in Example 1. (The same applies to the following explanations of examples.)

Further, Graphs A-1 and A-2, Graphs B-1 and B-2, and Graphs C-1 and C-2 which are used in the above-described Example 1 are used again as graphs showing the surface refractive power distributions along the principal sight lines of the three kinds of prior art examples having the same diopters, which are listed in Table 2-1 for comparison. Therefore, meaning of terms in these graphs are the same as those in the above-described Example 1. The surface refractive powers at F1, N1, F2, and N2 should correspond to those in Table 2-1, and any of the average surface refractive powers on the object side surfaces shown by one-dotted chain lines in the horizontal direction at the middle should have a deep curve of 10.50 diopter on the ground of correspondence to Table 2-1.

In Graph 2-1 and Graph 2-2 in FIG. 10, the modes of changes from a distance portion to a progressive zone to a near portion in a graph CV1 (solid line) showing the surface refractive power distribution in the vertical direction and a graph CH1 (dotted line) showing the surface refractive power distribution in the horizontal direction along the principal sight line on the object side surface, and a graph CV2 (solid line) showing the surface refractive power distribution in the vertical direction and a graph CH2 (dotted line) showing the surface refractive power distribution in the horizontal direction along the principal sight line on the eyeball side surface show tendencies similar to Example 1. From this fact, it can be seen that the difference in the surface refractive powers is provided to offset the astigmatism occurring on the object side surface with respect to a ray passing through the principal sight line on the eyeball side surface.

As a result, also in Example 2, it is possible that a combination of the refractive surfaces on the object side surface and the eyeball side surface gives a far vision diopter and an addition diopter based on prescription values, similarly to Example 1.

The next eight kinds of graphs starting with "Graph 2-3-" shown in FIG. 23 to FIG. 30 are graphs showing results, obtained by performing the above-described accurate magnification calculations, of magnification distributions when the lens of Example 2 according to the present invention is viewed along the principal sight line. Meanings of terms and symbols appended to "Graph 2-3-" are the same as those in the above-described Example 1 other than that thick solid lines in the drawings are for Example 2. Although any of the refractive indexes, objective powers, and eyeball turning angles used in Example 2 and the above-described three kinds of prior art examples was the same as that in the above-described Example 1, only the center thickness t was set at 6.0 mm close to an actual product because Example 2 and the above-described three kinds of prior art examples have diopters of S being +6.00 and ADD being 3.00.

Table 2-2 in FIG. 8 is a list of results obtained by performing accurate magnification calculations for a specific sight line direction of Example 2 according to the present invention and three kinds of prior art examples prepared for comparison, and corresponds to the above-described Graph 2-3-SMv (total magnification in the vertical direction) and Graph 2-3-SMh (total magnification in the horizontal direction). Here, meanings represented by symbols in Table 2-2 are the same as those in the above-described Table 1-2.

SMvfn and SMhfn in Table 2-2, that is, the magnification difference in the vertical direction (SMvn−SMvf) and the magnification difference in the horizontal direction (SMhn−SMhf), show that the values of magnification differences of Example 2 according to the present invention are suppressed to as low as 0.2151 and 0.1199, whereas those of the prior art examples are 0.2275 and 0.1325 in A, 0.2277 and 0.1268 in B, and 0.2280 and 0.1210 in C. In other words, the magnification difference between the distance portion and the near portion of Example 2 according to the present invention are made further smaller than those of Prior art 1, which shows that Example 2 is improved more greatly than Prior art 1 also in distortion and sway of an image. As is immediately apparent, as in Example 1, from comparison between Graph 2-3-SMv (total magnification in the vertical direction) and Graph 2-3-SMh (total magnification in the horizontal direction) resulting from accurate magnification calculations, corresponding to Example 2 according to the present invention, magnification distributions of an image in the vertical direction and the horizontal direction are apparently different.

Further, it is easily read that this difference is prominent mainly in a portion lower than the middle portion (at an eyeball turning angle of around −10 degrees and lower). As in Example 1, Graph 2-3-SMv is obtained also in Example 2 by multiplying three elements, that is, values of Graph 2-3-Msv, Graph 2-3-Mpv, and Graph 2-3-Mγv, and similarly Graph 2-3-SMh is obtained by multiplying three elements, that is, values of Graph 2-3-Msh, Graph 2-3-Mph, and Graph 2-3-Mγh. Here, in comparison between the elements in the vertical direction and the horizontal direction, there is no apparent difference found between Msv and Msh, which are shape factors, whereas there is a difference found between Mpv and Mph in a portion lower than the near portion (at an eyeball turning angle of around −20 degrees and lower). Further, there is an obvious difference between Mγv and Mγh in a portion lower than the middle portion (at an eyeball turning angle of around −10 degrees and lower). There is also a difference found in an upper portion of the distance portion (at an eyeball turning angle of around +20 degrees and upper), which is negligible because a difference existing between the examples in a quite upper portion of the distance portion (at an eyeball turning angle of around +30 degrees and upper) with less frequent use.

In short, it is shown also in Example 2, as in the above-described Example 1, that the major cause of the difference between Graph 2-3-SMv in FIG. 29 and Graph 2-3-SMh in FIG. 30 is the difference between Mγv and Mγh, the secondary cause thereof is the difference between Mpv and Mph, and there is no obvious difference found between Msv and Msh, which are almost irrelevant thereto. Further, there is no difference found among the examples in the magnification difference between the distance and near portions, as long as in the scale used in Example 2 of the present invention, in the shape factors Msv and Msh, which are regarded as reasons of improvement in Prior art 1. Note that, as in Example 1, the present invention can provide as a further important improvement, also in Example 2, an improved effect of "capable of reducing the distortion and sway of an image" not only by "decreasing the magnification difference between the distance portion and the near portion" but also by "decreasing the magnification difference between the vertical direction and the horizontal direction to bring the magnification ratio closer to 1." These tendencies are prominent mainly in a portion lower than the near portion (at an eyeball turning angle of around −25 degrees and lower).

EXAMPLE 3

Table 3-1 in FIG. 9 is a list regarding the surface refractive powers of Example 3 according to the present invention. The diopters of Example 3 correspond to S being −6.00 and ADD being 3.00, with three kinds of prior art examples having the same diopters being listed together for comparison.

Graphs 3-1 and 3-2 in FIG. 11 are graphs showing the surface refractive power distributions along the principal sight lines of Example 3 according to the present invention. Here, Graph 3-1 corresponds to the object side surface, and Graph 3-2 corresponds to the eyeball side surface.

Further, Graphs A-1 and A-2, Graphs B-1 and B-2, and Graphs C-1 and C-2 which are used in the above-described Examples 1 and 2 are used again as graphs showing the surface refractive power distributions along the principal sight lines of the three kinds of prior art examples having the same diopters, which are listed in Table 3-1 in FIG. 9 for comparison. The surface refractive powers at F1, N1, F2, and N2 should correspond to those in the aforementioned Table 3-1, and any of the average surface refractive powers on the object side surface shown by one-dotted chain lines in the horizontal direction at the middle should have a shallow curve with 2.50 diopter for the ground of correspondence to Table 3-1.

In Graph 3-1 and Graph 3-2 in FIG. 12, the modes of changes from a distance portion to a progressive zone to a near portion in a graph CV1 (solid line) showing the surface refractive power distribution in the vertical direction and a graph CH1 (dotted line) showing the surface refractive power distribution in the horizontal direction along the principal sight line on the object side surface, and a graph CV2 (solid line) showing the surface refractive power distribution in the vertical direction and a graph CH2 (dotted line) showing the surface refractive power distribution in the horizontal direction along the principal sight line on the eyeball side surface show tendencies similar to Example 1 and Example 2, and it can be seen that the difference in the surface refractive powers is provided to offset the astigmatism occurring on the object side surface with respect to a ray passing through the principal sight line on the eyeball side surface. As a result, it is possible that a combination of the refractive surfaces on the object side surface and the eyeball side surface gives a far vision diopter and an addition diopter based on prescription values, similarly to Example 1 and Example 2.

The next eight kinds of graphs starting with Graph 3-3- shown in FIG. 31 to FIG. 38 are graphs showing results, obtained by performing the above-described accurate magnification calculations, of magnification distributions when the lens of Example 3 is viewed along the principal sight line. Although any of the refractive indexes, objective powers, and eyeball turning angles used in Example 3 and the above-described three kinds of prior art examples was the same as that in the above-described Examples 1 and 2, only the center thickness t was set to 1.0 mm close to an actual product because Example 3 and the above-described three kinds of prior art examples had diopters of S being −6.00 and ADD being 3.00.

Table 3-2 in FIG. 9 is a list of results obtained by performing accurate magnification calculations for a specific sight line direction of Example 3 according to the present invention and three kinds of prior art examples prepared for comparison, and corresponds to the above-described Graph 3-3-SMv (total magnification in the vertical direction) and Graph 3-3-SMh (total magnification in the horizontal direction). Here, meanings represented by symbols in Table 3-2 are the same as those the meanings in the above-described Table 1-2 and Table 2-2.

SMvff and SMhfn in Table 3-2, that is, the magnification difference in the vertical direction (SMvn−SMvf) and the magnification difference in the horizontal direction (SMhn−SMhf), show that the values of magnification differences of Example 3 according to the present invention are at 0.0512 and 0.0726, whereas those of the prior art examples are 0.0475 and 0.0774 in A, 0.0418 and 0.0750 in B, and 0.0363 and 0.0727 in C, showing that in Example 3 the magnification difference in the vertical direction increases, whereas the magnification difference in the horizontal direction decreases. However, considering the magnification difference in the vertical direction having a low value, which is 1/3 to 1/5 that of the above-described Examples 1 and Example 2, with a slight decrease in the magnification difference in the horizontal direction, it can be said that there is not so great magnification difference between the distance portion and the near portion of Example 3 as compared to those of Prior art 1. Meanwhile, a study of Graph 3-3-SMv (total magnification in the vertical direction) and Graph 3-3-SMh (total magnification in the horizontal direction) obtained by performing accurate magnification calculations corresponding to Example 3 according to the present invention, shows that Example 3, as compared to the prior art examples, has the least "tendency of the magnification in the vertical direction to be smaller than 1" especially in a portion lower than the near portion (at an eyeball turning angle of around −20 degrees and lower), which results in the least "magnification difference between the vertical direction and the horizontal direction" so that distortion and sway of an image are improved further than in the prior art examples.

It should be noted that in Graph 3-3-SMv (total magnification in the vertical direction) in FIG. 37, there occurs a significant difference in magnification distribution of an image between the vertical direction and the horizontal direction mainly in a portion lower than the middle portion (at an eyeball turning angle of around −10 degrees and lower) and in an upper portion of the distance portion (at an eyeball turning angle of around +10 degrees and upper), whereas there occurs a difference among the examples in a portion lower than the near portion (at an eyeball turning angle of around −20 degrees and lower) and in a slightly upper portion of the distance portion (at an eyeball turning angle of around +25 degrees and upper). Of them, the difference in the slightly upper portion of the distance portion is negligible because it is infrequently used, while that in the portion lower than the near portion is nonnegligible because it is frequently used. As a result, in Example 3 according to the present invention, as compared to the prior art examples, the magnification in the vertical direction is closest to 1 especially in the portion lower than the near portion (at an eyeball turning angle of around −20 degrees and lower), which results in the least "magnification difference between the vertical direction and the horizontal direction" so that distortion and sway of an image are improved further than in the prior art examples. Note that these tendencies are prominent mainly in the portion lower than the near portion (at an eyeball turning angle of around −25 degrees and lower). Further, there is no difference, as in Example 1 and Example 2 of the present invention, found among the examples in the magnification difference between the distance and near portions even in the scale used in Example 3, in the shape factors Msv and Msh which are regarded as reasons of improvement in Prior art 1.

EXAMPLES 4 TO 7

As examples of the present invention, there are various possible combinations of distributions of surface refractive powers within the scope described in claims other than the above-described Examples 1 to 3. Examples 4 to 6 are shown here as application examples having the same diopters as Example 1, and Example 7 as an application example having the same diopters as Example 2. Lists and graphs of the surface refractive powers and results obtained by performing accurate magnification calculations for a specific sight line direction of these examples are shown in Table 1-1 and Table 1-2 in FIG. 7 and Graphs 4-1 and 4-2 to Graphs 7-1 and 7-2 in FIG. 12 to FIG. 14.

MODIFICATION EXAMPLES

Further, in the present invention, it is also possible to meet the demand for custom-made product (individual design) by incorporating, into the lens design as input information, not only usual prescription values but also, for example, the distance from the corneal vertex to the lens rear vertex, the distance from the eyeball rotating center to the lens rear vertex, the degree of aniseiconia between right and left eyes, the difference in height between right and left eyes, the object distance in nearsightedness most frequently used, the forward tilt angle (in an up-down direction) and horizontal tilt angle (in a right-left direction) of a frame, the bevel position in the edge thickness of the lens, and so on, as individual factors of spectacle wearers which have been rarely grasped by lens manufactures.

Modification Example 1

Two kinds of bi-aspherical type progressive-power lenses according to Modification Example 1 will be explained.

A first bi-aspherical type progressive-power lens according to Modification Example 1 is a bi-aspherical type progressive-power lens with a progressive refractive power action dividedly allotted to a first refractive surface being an object side surface and a second refractive surface being an eyeball side surface, in which when on the first refractive surface, a surface refractive power in a horizontal direction and a surface refractive power in a vertical direction, at a far vision diopter measurement position F1, are DHf and DVf respectively, and on the first refractive surface, a surface refractive power in a horizontal direction and a surface refractive power in a vertical direction, at a near vision diopter measurement position N1, are DHn and DVn respectively, the relation of DVn and DVf is expressed by $DVn-DVf>ADD/2$, surface astigmatism components at F1 and N1 of the first refractive surface are offset by the second refractive surface, and a combination of the first and second refractive surfaces gives an addition diopter (ADD) based on prescription values, and on the sectional curve in the vertical direction passing through F1, at an arbitrary position in a rectangle surrounded by two horizontal lines located at ±4 mm in the vertical direction, with a position providing 50% of a change of a sectional diopter in the vertical direction ranging from F1 to the same height as N1 being the center, and two vertical lines located at ±15 mm in the horizontal direction from a straight line in the vertical direction passing through F1, a surface sectional diopter in the vertical direction on the first refractive surface has differential values such that the absolute value of a differential value in the vertical direction is larger than the absolute value of a differential value in the horizontal direction.

A second bi-aspherical type progressive-power lens according to Modification Example 1 is a bi-aspherical type progressive-power lens with a progressive refractive power action dividedly allotted to a first refractive surface being an object side surface and a second refractive surface being an eyeball side surface, in which when on the first refractive surface, a surface refractive power in a horizontal direction and a surface refractive power in a vertical direction, at a far vision diopter measurement position F1, are DHf and DVf respectively, and on the first refractive surface, a surface refractive power in a horizontal direction and a surface refractive power in a vertical direction, at a near vision diopter measurement position N1, are DHn and DVn respectively, a relational equation, $DVn-DVf>ADD/2$ is satisfied, and surface astigmatism components at F1 and N1 of the first refractive surface are offset by the second refractive surface, and a combination of the first and second refractive surfaces gives an addition diopter (ADD) based on prescription values, and on a sectional curve in the vertical direction passing through F1, at an arbitrary position in a rectangle surrounded by two horizontal lines located at ±4 mm in the vertical direction, with a position providing 50% of a change of a sectional diopter in the vertical direction ranging from F1 to the same height as N1 being the center, and two vertical lines located at ±15 mm in the horizontal direction from a straight line in the vertical direction passing through F1, a surface astigmatism amount on the first refractive surface has differential values such that the absolute value of a differential value in the vertical direction is larger than the absolute value of a differential value in the horizontal direction, and at any position in the rectangle, a surface average diopter on the first refractive surface has differential values such that the absolute value of a differential value in the vertical direction is larger than the absolute value of a differential value in the horizontal direction.

When designing these lenses, first, a sectional curve in the vertical direction passing through F1 on the object side surface is determined. This sectional curve can be determined by means of a technique used when determining a diopter distribution in the vertical direction of a principal meridian on a conventional progressive-power lens. (For example, refer to a design technique in Japanese Patent Publication No. 2549738 by the inventors of the present invention.)

Next, a rotation surface with the curved line being a generatrix is defined. The rotation axis of the rotation surface is a straight line perpendicular to the normal line of the generatrix at the geometric center of a lens within a plane (cross section) including the generatrix, and when a radius of curvature in the vertical direction at F1 is R1, and the angle between the normal line of a generatrix at F1 and the normal line of the generatrix at the geometric center is Θ, the rotation axis is located away from F1 to the eyeball side by a distance R defined by $R=R1*COS\,\Theta$. By rotating the previously defined generatrix with this rotation axis, the object side surface whose diopter in the vertical direction and diopter in the horizontal direction at F1 match to each other can be defined.

In the above explanation, although the object side surface of the lens is the rotation surface, it is possible to implement the present invention on a sweep surface using a similar generatrix. The sweep surface means a surface 15 on which a generatrix is swept along a three-dimensional curved line (hereinafter referred to as sweep line).

An example of a general sweep surface is shown in FIG. 57.

A solid line in the vertical direction passing through F1 in FIG. 57 is a meridian.

FIG. 58 is a view of the meridian in FIG. 57 when viewed from the side of a lens, with O1 showing a center of curvature of the meridian at F1 and the length of an arrow from O1 to F1 showing a radius of curvature of the meridian at F1. Arrows have lengths which get shorter from the upper side to the lower side, showing that the radius of curvature progressively changes along the meridian.

A dotted line in the horizontal direction passing through F1 in FIG. 57 is the sweep line.

FIG. 59 is a view of the sweep line in FIG. 57 when viewed from the upper side of the lens, with O1 showing a center of curvature of the sweep line at F1 and the length of an arrow from O1 to F1 showing a radius of curvature of the sweep line at F1.

The three arrows have the same length, showing that the sweep line is a circle with O1 being the center.

FIG. 60 to FIG. 62 show examples of various sweep lines.

FIG. 60 shows an example of a sweep line having a radius of curvature which gets smaller as it gets away from F1, FIG. 61 shows an example of a sweep line having a radius of curvature which gets larger as it gets away from F1, and FIG. 62 shows an example of a sweep line having a radius of curvature which changes differently depending on a direction of getting away from F1.

Among general sweep surfaces, the sweep surface including the rotation surface used in Modification Example 1 is one having particularly the following characteristics, which will be described with reference to FIG. 53 to FIG. 55.

Here, FIG. 53 is a view showing a diopter distribution (first surface) in the vertical direction on the object side surface of the lenses according to Modification Example 1, FIG. 54 is a view showing a surface astigmatism distribution on the object side surface of the lenses according to Modification Example 1, and FIG. 55 is a view showing a surface average diopter distribution on the object side surface of the lenses according to Modification Example 1. Each view shows by a dotted line a rectangle surrounded by two horizontal lines located on a sectional curve in the vertical direction passing through F1 at ±4 mm in the vertical direction, with a position providing 50% of a change of a sectional diopter in the vertical direction ranging from F1 to the same height as N1 being the center, and two vertical lines located at ±15 mm in the horizontal direction from a straight line in the vertical direction passing through F1.

FIG. 56 is a graph showing a diopter change on the sectional curve in the vertical direction passing through F1. The vertical direction shows a distance, and the horizontal direction shows the percentage of a diopter variation with respect to the diopter at F1, with the change of the diopter ranging from F1 to the same height as an near vision diopter measurement position N1 being 100%. The center position of the rectangle in the vertical direction is a portion corresponding to 50% as shown in FIG. 56.

This rectangular region is a region which most prominently shows characteristics of a progressive action on the progressive-power lens.

As is clear from the drawings, on the sweep surface including the rotation surface used in the present invention, a diopter in the vertical direction does not change with respect to movement in the horizontal direction. Therefore, when contour lines of a sectional diopter distribution in the vertical direction shown in FIG. 53 is viewed, they are in a form of horizontal line inside the rectangle. Further, on the rotation surface, contour lines of the surface astigmatism distribution shown in FIG. 54 and contour lines of the surface average diopter distribution shown in FIG. 55 are in a form of horizontal line in the rectangle, similarly to the contour lines of the sectional diopter distribution in the vertical direction.

The lenses according to Modification Example 1 includes not only an accurate sweep surface but also a sweep surface to which a slight aspherical correction is added. Therefore, the lens has a characteristic such that although each distribution is not perfectly horizontal, at any position in the rectangle on a surface based on the sweep surface, a surface sectional diopter in the vertical direction has differential values such that the absolute value of a differential value in the vertical direction is larger than the absolute value of a differential value in the horizontal direction. Also, the lens has a characteristic such that, at any position in the rectangle on a surface based on the rotation surface, a surface astigmatism amount and a surface average diopter have differential values such that the absolute value of a differential value in the vertical direction is larger than the absolute value of a differential value in the horizontal direction.

Absolute values of respective differential values at the center of the above-described rectangle on the rotation surface, namely, at the position providing 50% of a change of the sectional diopter in the vertical direction ranging from F1 to the same height as N1 on the sectional curve in the vertical direction passing through F1 will be shown below.

The absolute value of a differential value of the sectional diopter in the vertical direction (unit: diopter/mm [refractive index: 1.699])

Horizontal direction: 0.0, vertical direction: 0.24

The absolute value of a differential value of the surface astigmatism amount (unit: diopter/mm [refractive index: 1.699])

Horizontal direction: 0.0, vertical direction: 0.23

The absolute value of a differential value of the surface average diopter (unit: diopter/mm [refractive index: 1.699])

Horizontal direction: 0.0, vertical direction: 0.12

In the above example, since the rotation surface is used for simplification of explanation, the differential values in the horizontal direction are all zero. Further, it is preferable to add an aspherical correction, which is "correction action" for eliminating or reducing occurrence of astigmatism and change in diopter primarily caused by impossibility of a sight line intersecting at right angles with a lens surface, to one or both of the object side surface and the eyeball side surface. However, when the aspherical correction is added, differential values in the horizontal direction also have some value. However, the characteristic such that the absolute value of a differential value in the vertical direction is larger than the absolute value of a differential value in the horizontal direction should be kept.

It should be noted that this Modification Example 1 uses the design values of Example 1 of the present invention from which the aspherical elements are removed.

Next, the eyeball side surface is designed. The eyeball side surface is generally a curved surface in a complicated form, so that a spline curved surface is used. With a spherical surface being an initial form, parameters of the curved surface are changed so as to realize a desired transmission aberration distribution, prescription diopter, progressive zone length, and inner shift while evaluating the transmission aberration distribution by ray tracing calculation, thereby defining the eyeball side surface.

Thus, the object side surface and the eyeball side surface are designed.

Modification Example 2

A bi-aspherical type progressive-power lens according to Modification Example 2 will be described.

The bi-aspherical type progressive-power lens according to Modification Example 2 is a bi-aspherical type progressive-power lens with a progressive refractive power action dividedly allotted to a first refractive surface being an object side surface and a second refractive surface being an eyeball side surface, the bi-aspherical type progressive-power lens having a structure in which when on the first refractive surface, a surface refractive power in a horizontal direction and a surface refractive power in a vertical direction, at a near vision diopter measurement position N1, are DHn and DVn respectively, a relational equation, $DVn-DHn>ADD/2$ is satisfied, and a surface astigmatism component at N1 of the first refractive surface is offset by the second refractive surface, and a combination of the first and second refractive surfaces gives a near vision diopter (Dn) based on prescription values.

Further, the bi-aspherical type progressive-power lens according to Modification Example 2 has a structure, in addition to the above-described structure, in which when on the first refractive surface, a surface refractive power in a horizontal direction and a surface refractive power in a vertical direction, at a far vision diopter measurement position F1, are DHf and DVf respectively, and on the first refractive surface, a surface refractive power in a horizontal direction and a surface refractive power in a vertical direction, at a near vision diopter measurement position N1, are DHn and DVn respectively, relational equations, $DHf+DHn<DVf+DVn$, and $DVn-DVf>ADD/2$, and $DHn-DHf<ADD/2$ are satisfied, and surface astigmatism components at F1 and N1 of the first refractive surface are offset by the second refractive surface, and a combination of the first and second refractive surfaces gives a far vision diopter (Df) and an addition diopter (ADD) based on prescription values.

Further, the bi-aspherical type progressive-power lens according to Modification Example 2 has a structure, in addition to either one of the above-described two structures, in which the first refractive surface is bilaterally symmetrical with respect to one meridian passing through the far vision diopter measurement position F1, the second refractive surface is bilaterally asymmetrical with respect to one meridian passing through a far vision diopter measurement position F2 of the second refractive surface, and a position of a near vision diopter measurement position N2 on the second refractive surface is shifted inward to a nose by a predetermined distance to respond to a convergence action of an eye in nearsightedness.

Further, the bi-aspherical type progressive-power lens according to Modification Example 2 has a structure, in addition to any one of the above-described three structures, in which the first refractive surface is a rotation surface with as a generatrix one meridian passing through the far vision diopter measurement position F1, the second refractive surface is bilaterally asymmetrical with respect to one meridian passing through a far vision diopter measurement position F2 on the second refractive surface, and a position of a near vision diopter measurement position N2 on the second refractive surface is shifted inward to a nose by a predetermined distance to respond to a convergence action of an eye in nearsightedness.

Further, the bi-aspherical type progressive-power lens according to Modification Example 2 has a structure, in addition to any one of the above-described four structures, in which on the first refractive surface, a sectional curve in the horizontal direction passing through the far vision diopter measurement position F1 is not a perfect circle but has a predetermined refractive power change, and a sectional curve of a cross section in the vertical direction including a normal line at any position on the sectional curve in the horizontal direction is substantially the same as a meridian passing through the far vision diopter measurement position F1.

Further, the bi-aspherical type progressive-power lens according to Modification Example 2 has a structure, in addition to any one of the above-described five structures, in which in a structure of a combination of the first and second refractive surfaces giving the far vision diopter (Df) and the addition diopter (ADD) based on the prescription values and providing as necessary a prism refractive power (Pf), any or all of occurrence of astigmatism and a diopter error and occurrence of distortion of an image in a peripheral visual field caused by impossibility of a sight line intersecting at right angles with a lens surface in a wearing state are reduced.

It should be noted that a design technique to provide the prism refractive power (Pf) as necessary is publicly known from, for example, Japanese Patent Application Laid-open No. Hei 2003-121801, and such a design technique can be used in combination.

The bi-aspherical type progressive-power lens according to Modification Example 2 having the above-described structures will be described with reference to the drawings.

FIG. 57 shows a first refractive surface which is the object side surface of the bi-aspherical type progressive-power lens according to Modification Example 2. In this explanation, a sectional curve (solid line) in the vertical direction passing through the far vision diopter measurement position F1 shown by a white circle in FIG. 57 is called a meridian, which means the "meridian passing through the far vision diopter measurement position F1" described in third to fifth structures described in "Means for Solving the Problems." Besides, dotted lines show horizontal sectional curves.

FIG. 58 is a view of the meridian shown by the solid line in FIG. 57 when viewed from the side of the lens. FIG. 58 shows that the lens has a section in which a radius of curvature decreases gradually from the upper side to the lower side of the lens and provides a so-called progressive surface refractive power change. It should be noted that O1 shows the center of curvature and a one-dotted chain line shows a rotation axis passing through O1.

FIG. 59 is a view of a horizontal sectional curve shown by a dotted line in FIG. 57 when viewed from the upper side of the lens, and O1 shows the center of curvature of this horizontal sectional curve. In other words, the horizontal sectional curve shown by a dotted line in FIG. 59 is an arc. Here, the first refractive surface drawn in FIG. 57 can be obtained by rotating the meridian shown in FIG. 58 about the rotation axis passing through O1.

Moreover, the horizontal sectional curve of the first refractive surface according to this Example 2 should not necessarily be in the form of FIG. 59, and it can take forms shown in FIG. 60 to FIG. 62, which will be described below. Here, FIG.

60 is a first modification example of the horizontal sectional curve shown in FIG. 59 when viewed from the upper side of the lens, FIG. 61 is a second modification example of the horizontal sectional curve shown in FIG. 59 when viewed from the upper side of the lens, and FIG. 62 is a third modification example of the horizontal sectional curve shown in FIG. 59 when viewed from the upper side of the lens.

FIG. 60 shows an example of a horizontal sectional curve having a radius of curvature which gets smaller as it gets away from F1 to the side.

FIG. 61 shows an example of a horizontal sectional curve having a radius of curvature which gets larger, inversely to FIG. 60, as it gets away from F1 to the side.

FIG. 62 shows an example of a horizontal sectional curve in which both the examples of FIG. 60 and FIG. 61 coexist.

Further, when taking the forms shown in FIG. 60 to FIG. 62, it is possible to add to the second refractive surface an action to offset the influence of a change in refractive power due to a change in radius of curvature of these horizontal sectional curves.

The purpose of this is to use change in shape magnification of an image viewed through the lens, and thereby a shape magnification of an image along the horizontal sectional curve can be controlled to be preferable for a wearer. Particularly, taking the form of FIG. 62 enables control of a shape magnification on the nose side and the ear side while wearing.

It should be noted that as the forms shown in FIG. 60 to FIG. 62, only examples that the radius of curvature decreases or increases monotonously as it gets away from F1 to the side for simplification of explanation are shown, but various modification examples are conceivable such as decreasing the radius of curvature once and increasing thereafter, having a section in which the radius of curvature does not change, combining forms of inverse change of them, and the like.

Modification Example 3

Here, an example of a bi-aspherical type progressive-power lens having no sweep surface, which is different from the above-described structures, will be described with reference to the drawings.

FIG. 63 and FIG. 64 are views showing a surface astigmatism distribution and a surface average diopter distribution on the object side surface (first surface) of a lens according to Modification Example 3 of the embodiment. The manner of drawing the views are the same as those in the views showing the surface astigmatism distribution and the surface average diopter distribution of the lenses, such as the above-described FIG. 41 and FIG. 42. The lens surface has characteristics such that when a surface refractive power in the horizontal direction and a surface refractive power in the vertical direction at a far vision diopter measurement position F1 are DHf and DVf respectively, and a surface refractive power in the horizontal direction and a surface refractive power in the vertical direction at a near vision diopter measurement position N1 are DHn and DVn respectively, DHf=DVf=4.87, DHn=6.12, and DVn=7.87. It should be noted that the lens is a top flat lens having a far vision diopter of 0.00 and an addition diopter (ADD) of +3.00. The fact that the object side surface (first surface) of the lens is not a sweep surface is also clear from DHf<<DHn. Besides, a value, DVn−DHn=7.87−6.12=1.75, is smaller than the addition diopter but exceeds 50% of the addition diopter, so that the effect of the present invention can be obtained.

As above, the purpose of making DHn to be a deeper curve than DHf is to prevent that the eyeball side surface (second surface) of the lens becomes a convex surface shape and thus the entire lens does not become a meniscus shape when producing a strong positive far vision diopter using the object side surface (first surface) of the lens.

FIG. 65 and FIG. 66 are views showing a surface astigmatism distribution and a surface average diopter distribution on the eyeball side surface (second surface) of the lens according to Modification Example 3 of the above-described embodiment. The manner of drawing the views are the same as in the views showing the surface astigmatism distribution and the surface average diopter distribution of a lens, such as the above-described FIG. 45 and FIG. 46.

As in FIG. 6, other than the case that a definition of "predetermined addition diopter" in the present invention is a difference in refractive power measured by placing an opening portion of a lens meter on the far vision diopter measurement position F1 and the near vision diopter measurement position N1 on the object side surface, there are a case that the definition is a difference in refractive power measured by placing an opening portion of a lens meter on the far vision diopter measurement position F2 and the near vision diopter measurement position N2 on the eyeball side surface, a case that the definition is a difference between a refractive power measured by placing an opening portion of a lens meter on the far vision diopter measurement position F2 on the object side surface and a refractive power measured at N3 by turning an opening portion of a lens meter toward the near vision diopter measurement position N2 about the eyeball rotating center position, a case that, as respective refractive powers, particularly only the refractive power component in the horizontal direction is used, and the like, and any definition among them can be adopted.

BRIEF DESCRIPTION OF DRAWINGS

FIG. 3-1 is an explanatory view on a magnification Mγ of a prism, being an explanatory view on a difference between a plus lens and a minus lens and on a difference in magnification in viewing mainly using a near portion which is a lower portion of a lens;

FIG. 3-2 is an explanatory view on a magnification Mγ of a prism, being an explanatory view on a difference between a plus lens and a minus lens and on a difference in magnification in viewing mainly using a near portion which is a lower portion of a lens;

FIG. 3-3 is an explanatory view on a magnification Mγ of a prism, being an explanatory view on a difference between a plus lens and a minus lens and on a difference in magnification in viewing mainly using a near portion which is a lower portion of a lens;

FIG. 4-1 is an explanatory view on a magnification Mγ of a prism, being an explanatory view on a difference between a plus lens and a minus lens and on a difference in magnifications in viewing mainly using a near portion which is a lower portion of a lens;

FIG. 4-2 is an explanatory view on a magnification Mγ of a prism, being an explanatory view on a difference between a plus lens and a minus lens and on a difference in magnifications in viewing mainly using a near portion which is a lower portion of a lens;

FIG. 4-3 is an explanatory view on a magnification Mγ of a prism, being an explanatory view on a difference between a plus lens and a minus lens and on a difference in magnifications in viewing mainly using a near portion which is a lower portion of a lens;

FIG. 5-1 is an explanatory view of an optical layout of a progressive-power lens, being a front view of the progressive-power lens when viewed from an object side surface;

FIG. 5-2 is an explanatory view of the optical layout of the progressive-power lens, being a side view illustrating a cross section in the vertical direction;

FIG. 5-3 is an explanatory view of the optical layout of the progressive-power lens, being an elevational view illustrating a cross section in the transverse direction;

FIG. 7 is a view collectively showing in Table 1-1 and Table 1-2 "surface refractive powers" and "results of accurate magnification calculations in a direction of a specific sight line" of Examples 1, 4, 5, and 6 and Prior arts A, B, and C corresponding to the diopters of Examples 1, 4, 5, and 6;

FIG. 8 is a view collectively showing in Table 2-1 and Table 2-2 "surface refractive powers" and "results of accurate magnification calculations in a direction of a specific sight line" of Examples 2 and 7 and Prior arts A, B, and C corresponding to the diopters of Examples 2 and 7;

FIG. 9 is a view collectively showing in Table 3-1 and Table 3-2 "surface refractive powers" and "results of accurate magnification calculations in a direction of a specific sight line" of Example 3 and Prior arts A, B, and C corresponding to the diopters of the example 3;

FIG. 11 is a view showing Graphs 3-1 and 3-2 representing the surface refractive power distributions of Example 3;

FIG. 13 is a view showing Graphs 7-1 and 7-2 representing the surface refractive power distributions of Example 7;

Figure 1:
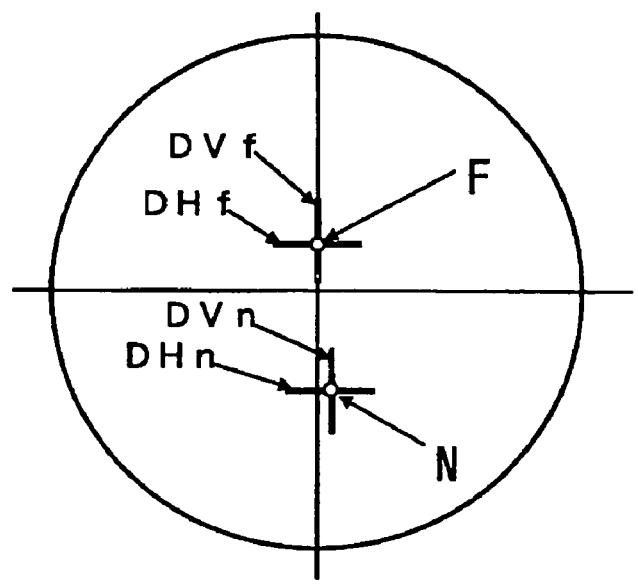
FIG. 1 is an explanatory view of various surface refractive powers at positions on a spectacle lens.
Figure 2:
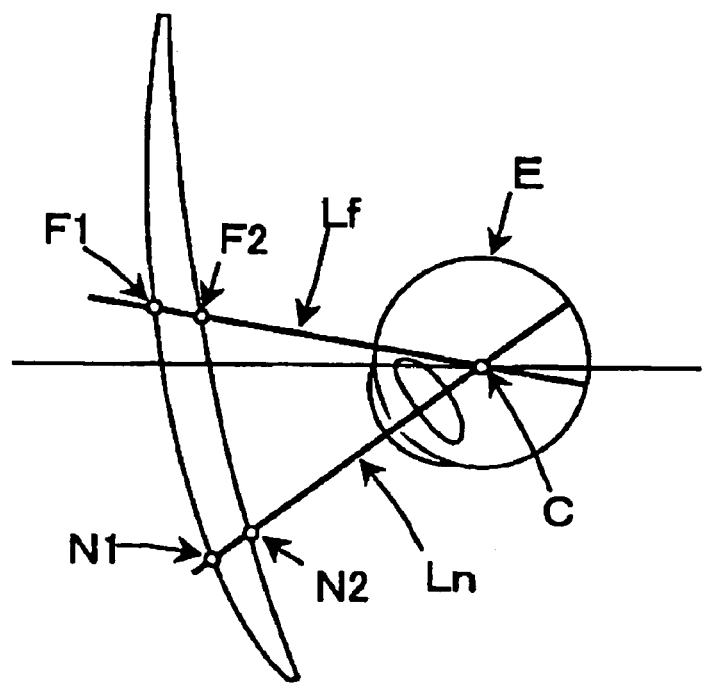
FIG. 2 is an explanatory view of a positional relation among an eyeball, sight lines, and a lens surface.
Figures 1, 3:
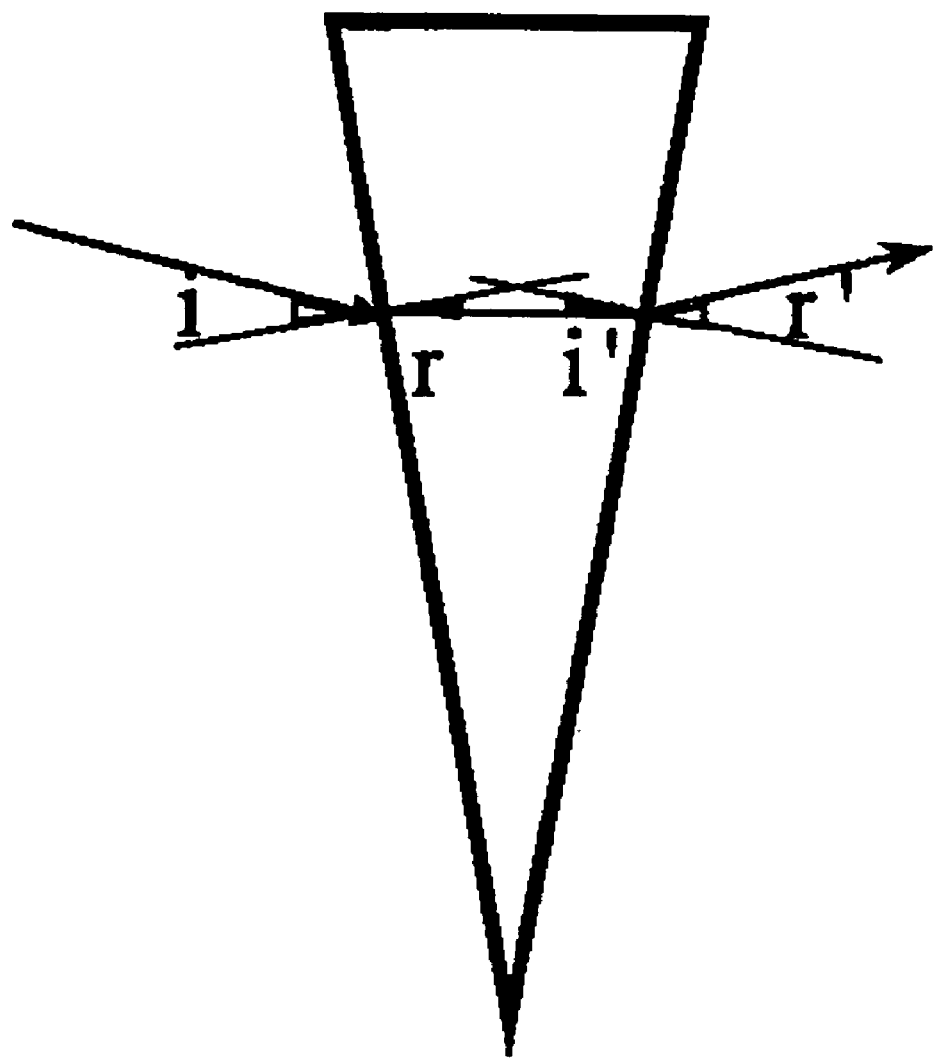
Figures 2, 3:
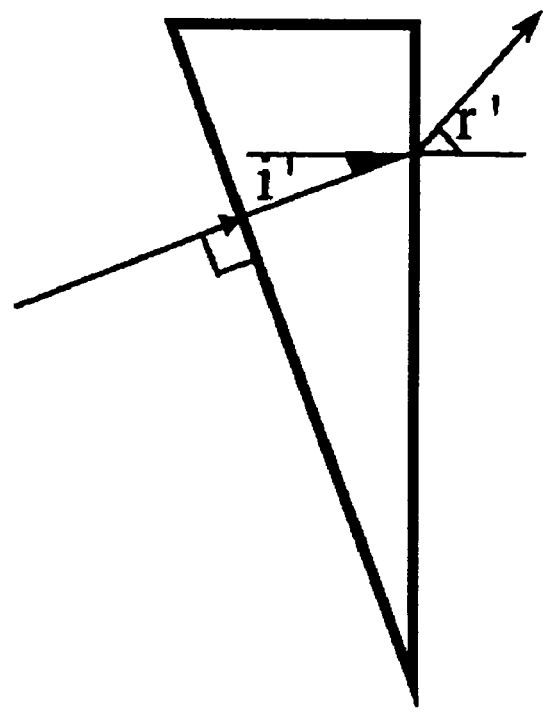
Figure 3:
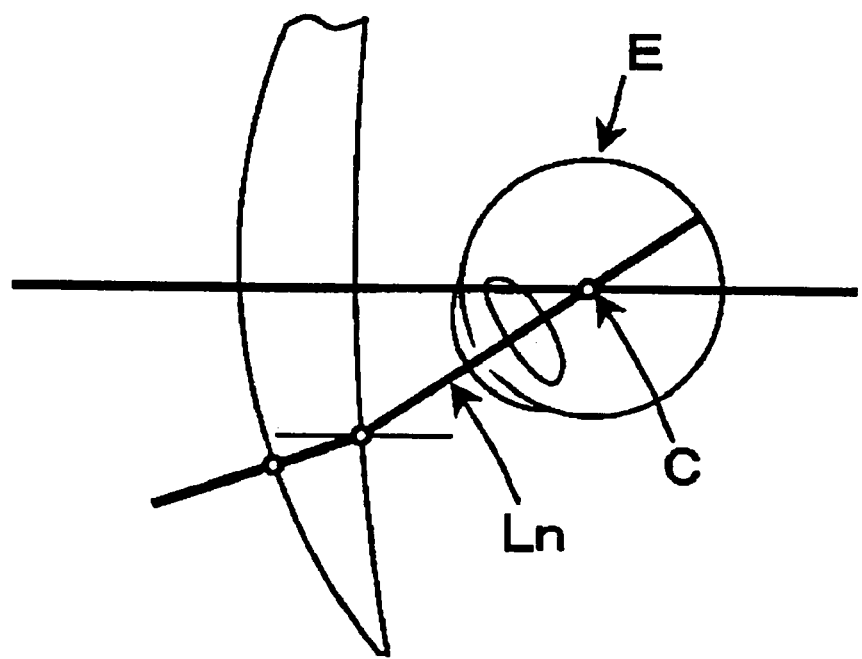
Figures 1, 4:
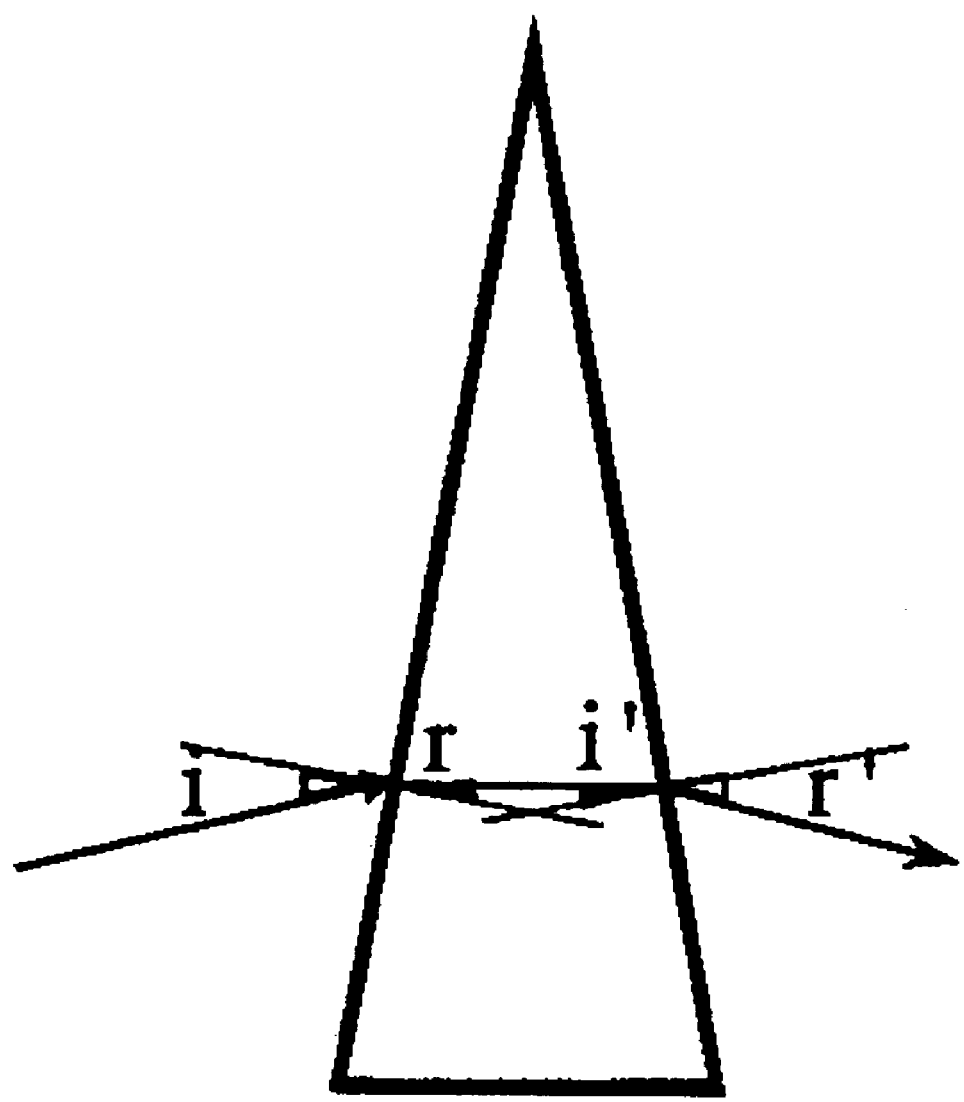
Figures 2, 4:
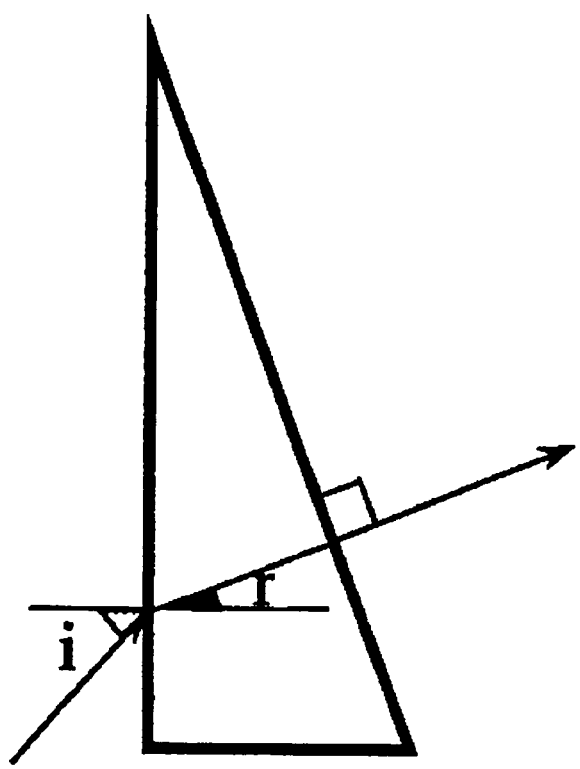
Figures 3, 4:
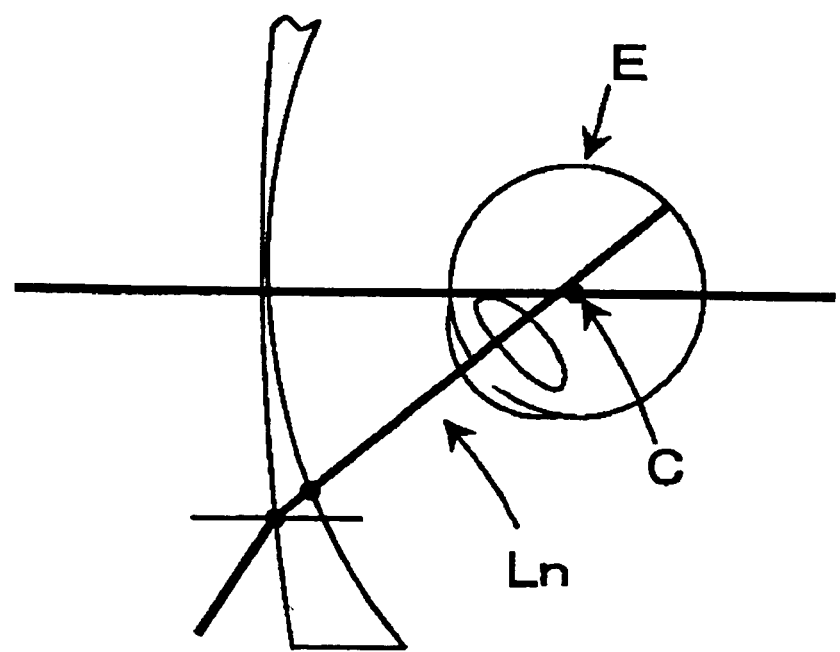
Figures 1, 5:
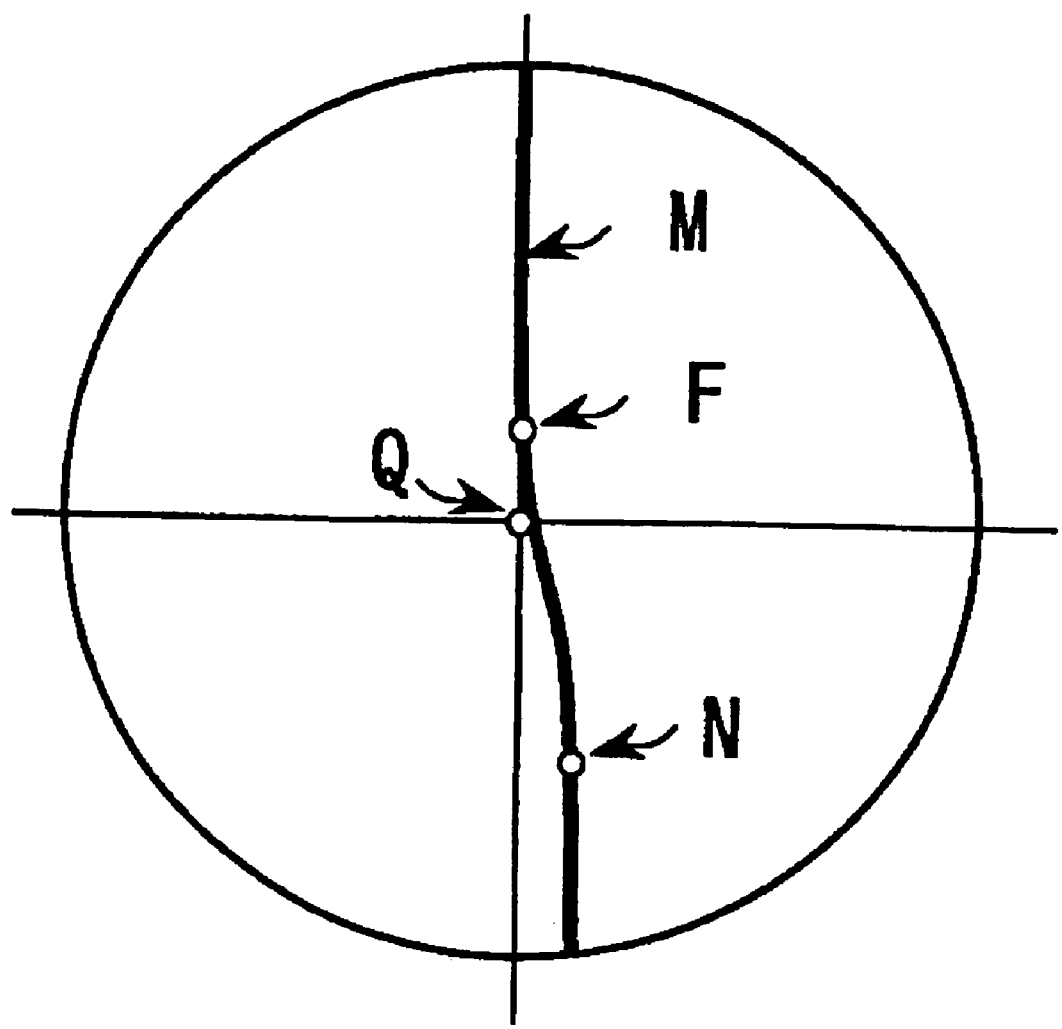
Figures 2, 5:
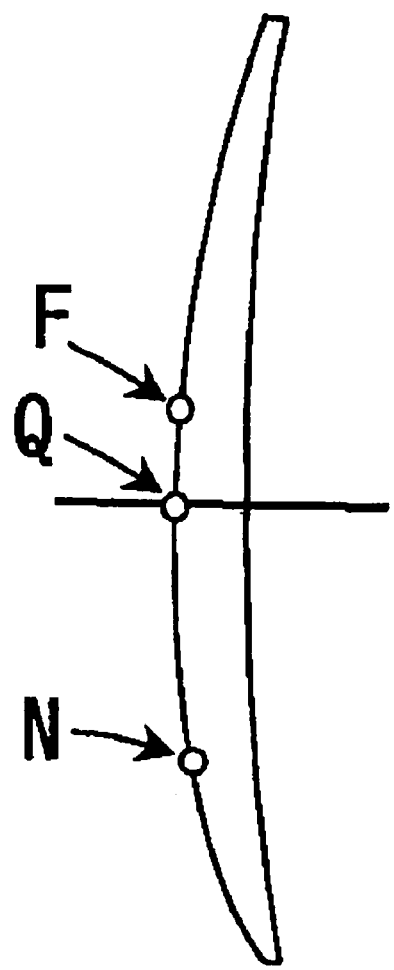
Figures 3, 5:
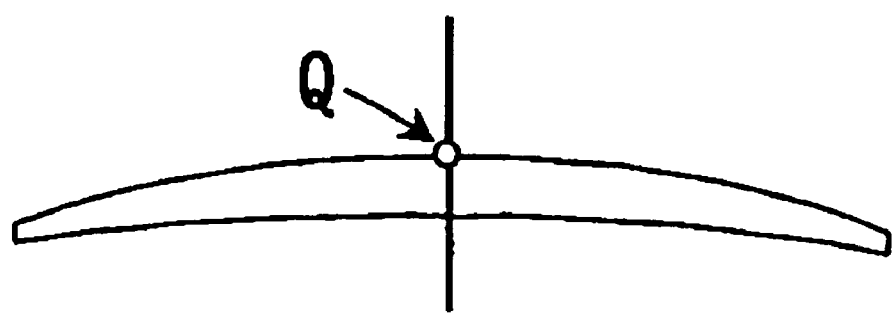
Figure 6:
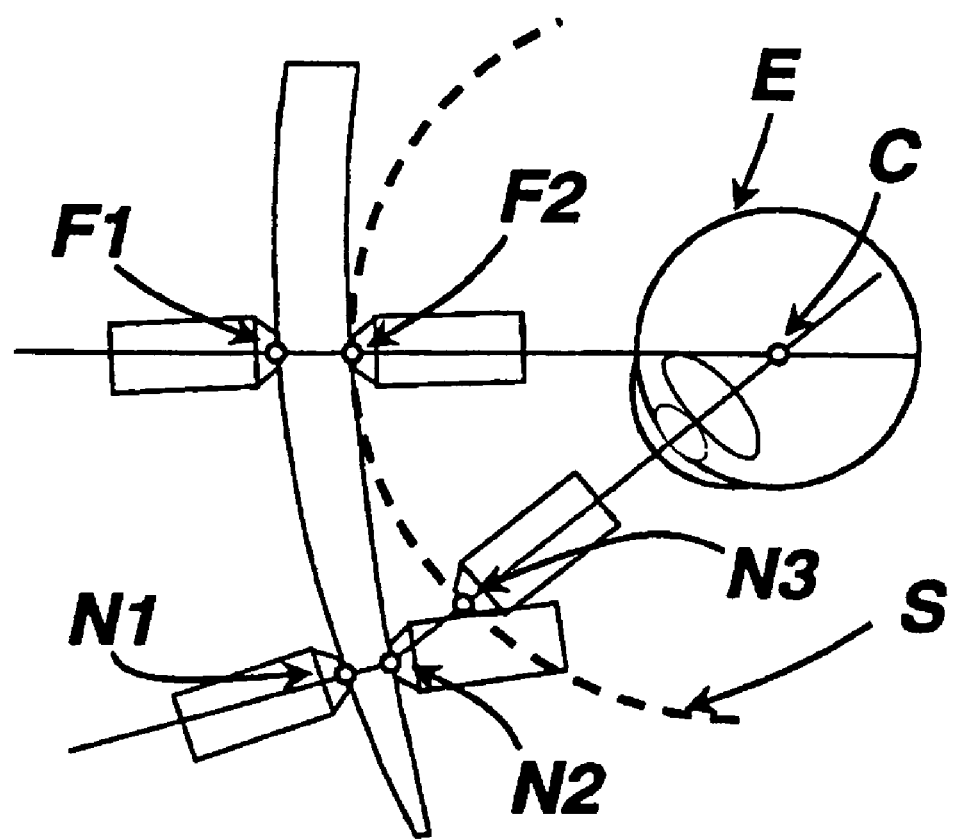
FIG. 6 is an explanatory view illustrating the difference of definition on "addition diopter"
Figure 10:
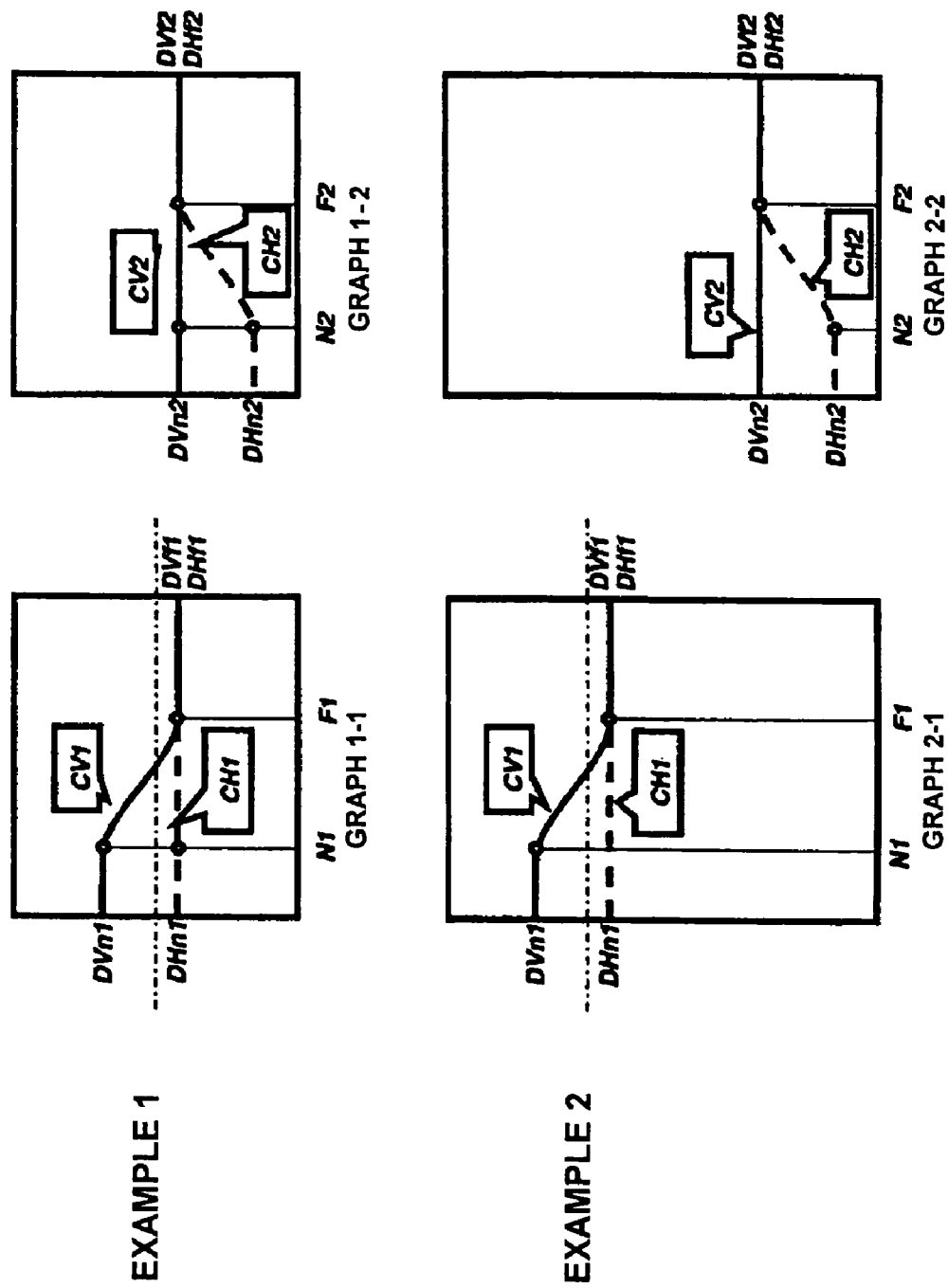
FIG. 10 is a view showing Graphs 1-1, 1-2, 2-1, and 2-2 representing the surface refractive power distributions of Example 1 and Example 2.
Figure 12:
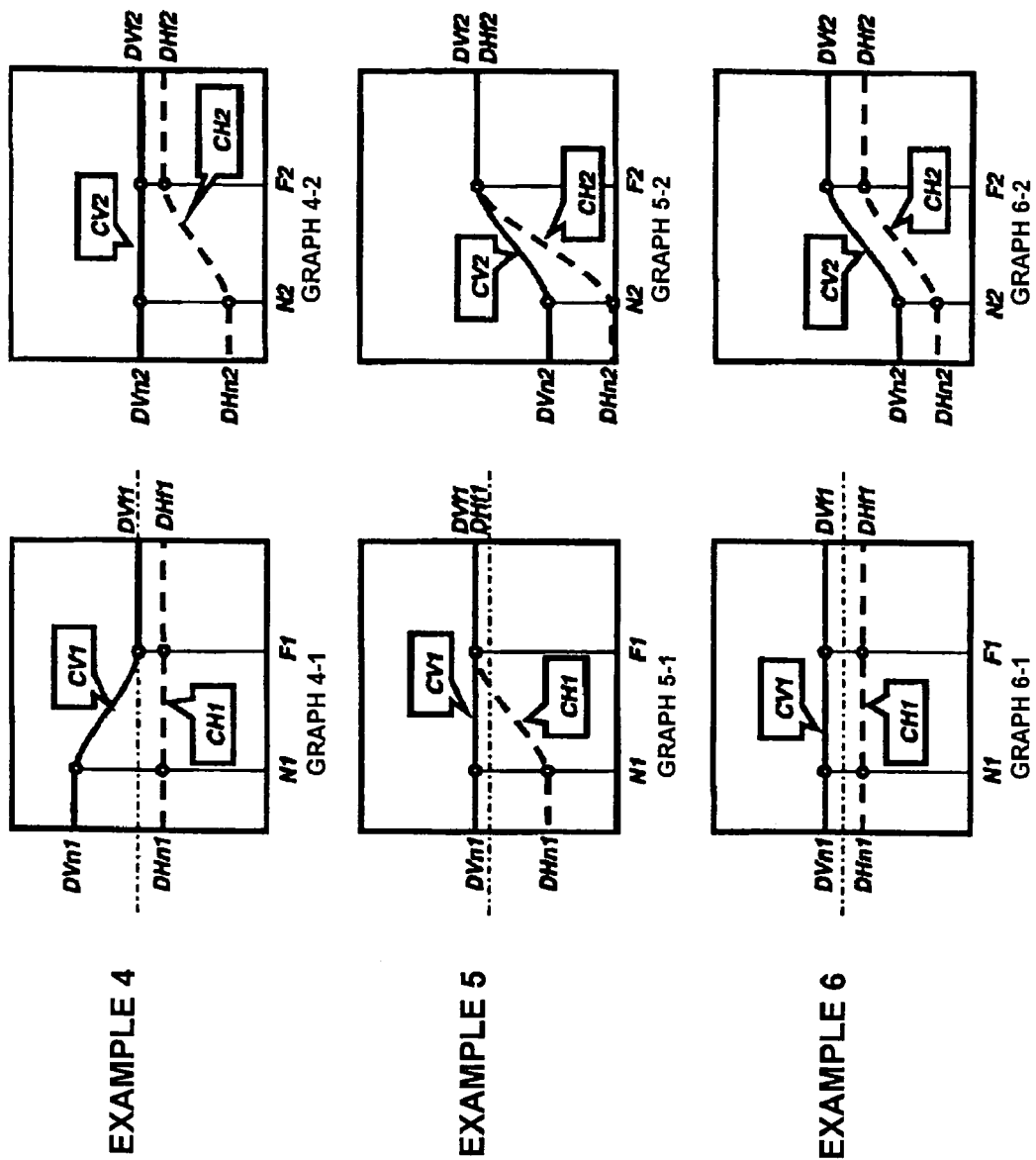
FIG. 12 is a view showing Graphs 4-1, 4-2, 5-1, 5-2, 6-1 and 6-2 representing the surface refractive power distributions of Example 4 to Example 6.
Figure 14:
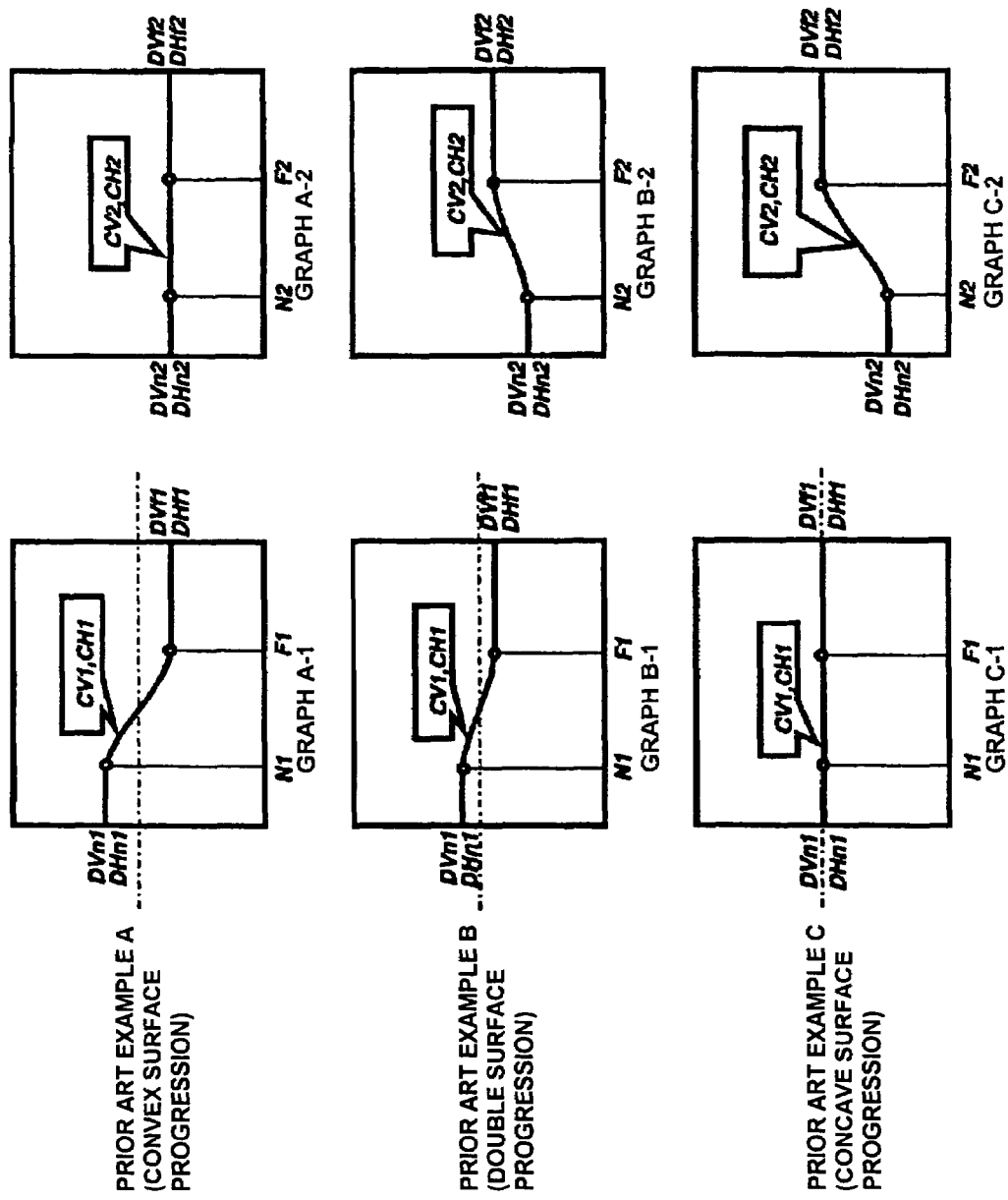
FIG. 14 is a view showing Graphs A-1, A-2, B-1, B-2, C-1 and C-2 representing the surface refractive power distributions of Prior art examples A, B, and C.
Figure 15:
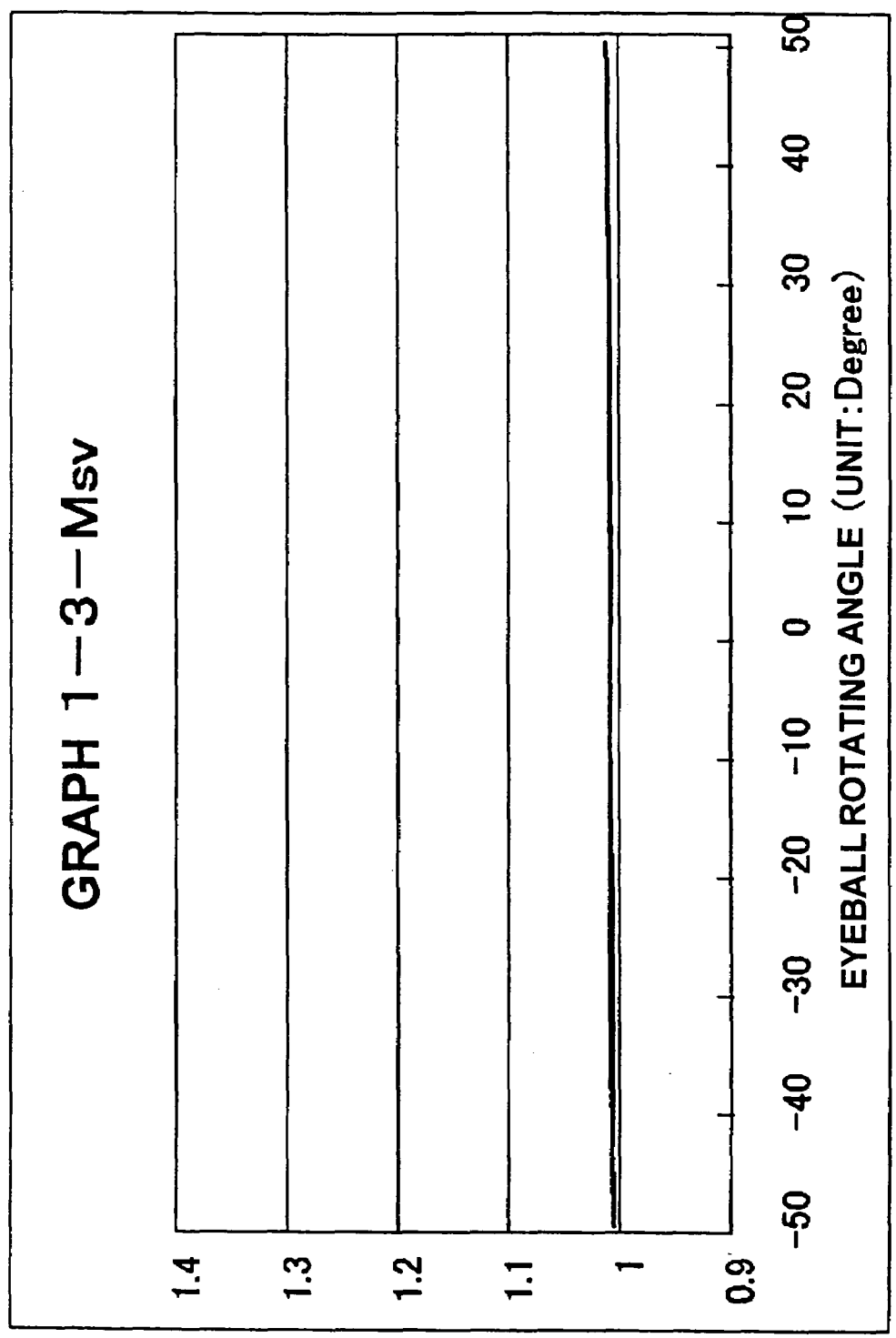
FIG. 15 is a view showing Graph 1-3-Msv representing results, obtained by performing accurate magnification calculations, of magnification distributions when lenses of Example 1 and three kinds of Prior art examples A, B, and C corresponding to the diopters of Example 1 are viewed along principal sight lines.
Figure 16:
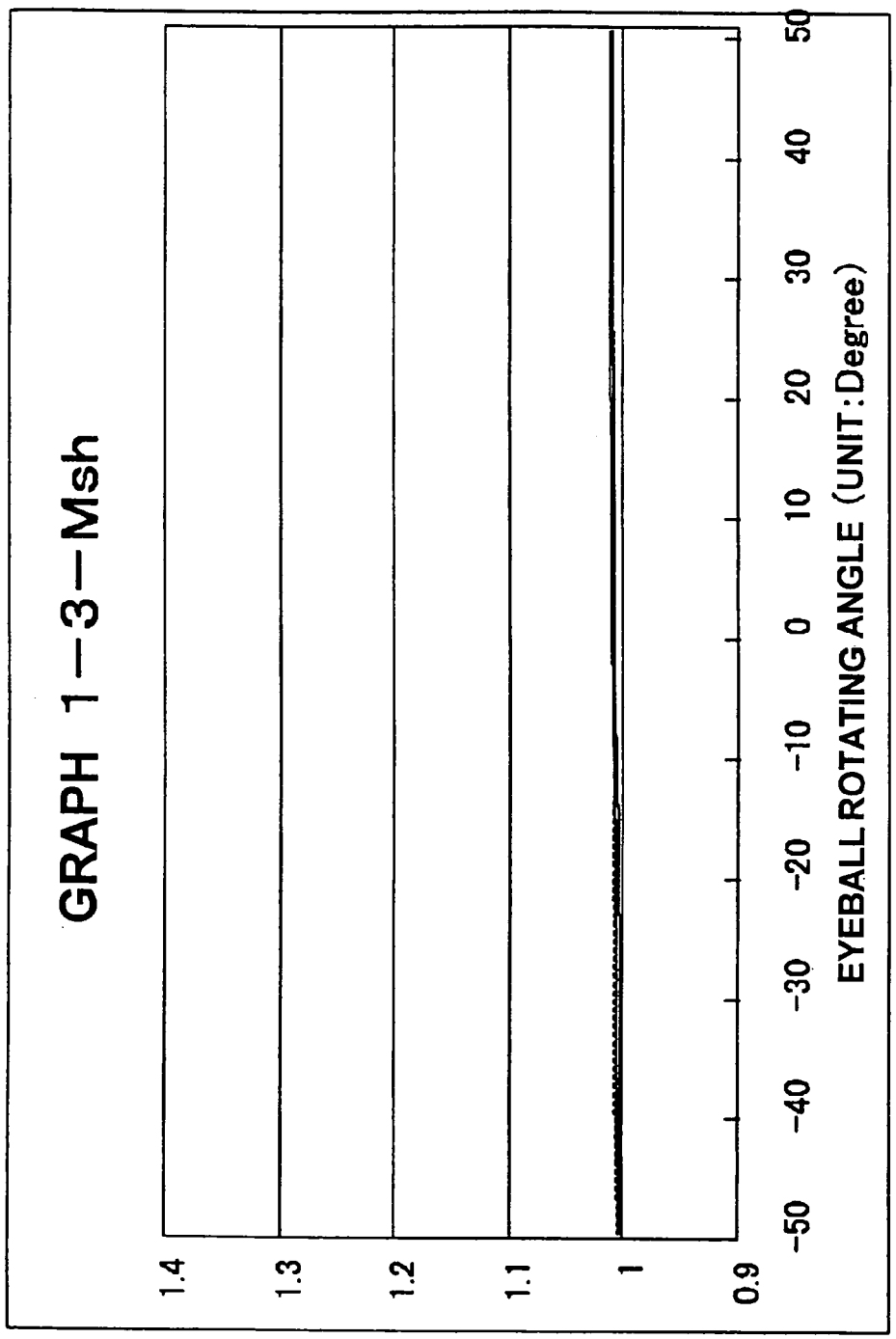
FIG. 16 is a view showing Graph 1-3-Msh representing results, obtained by performing accurate magnification calculations, of the magnification distributions when the lenses of Example 1 and the three kinds of Prior art examples A, B, and C corresponding to the diopters of Example 1 are viewed along the principal sight lines.
Figure 17:
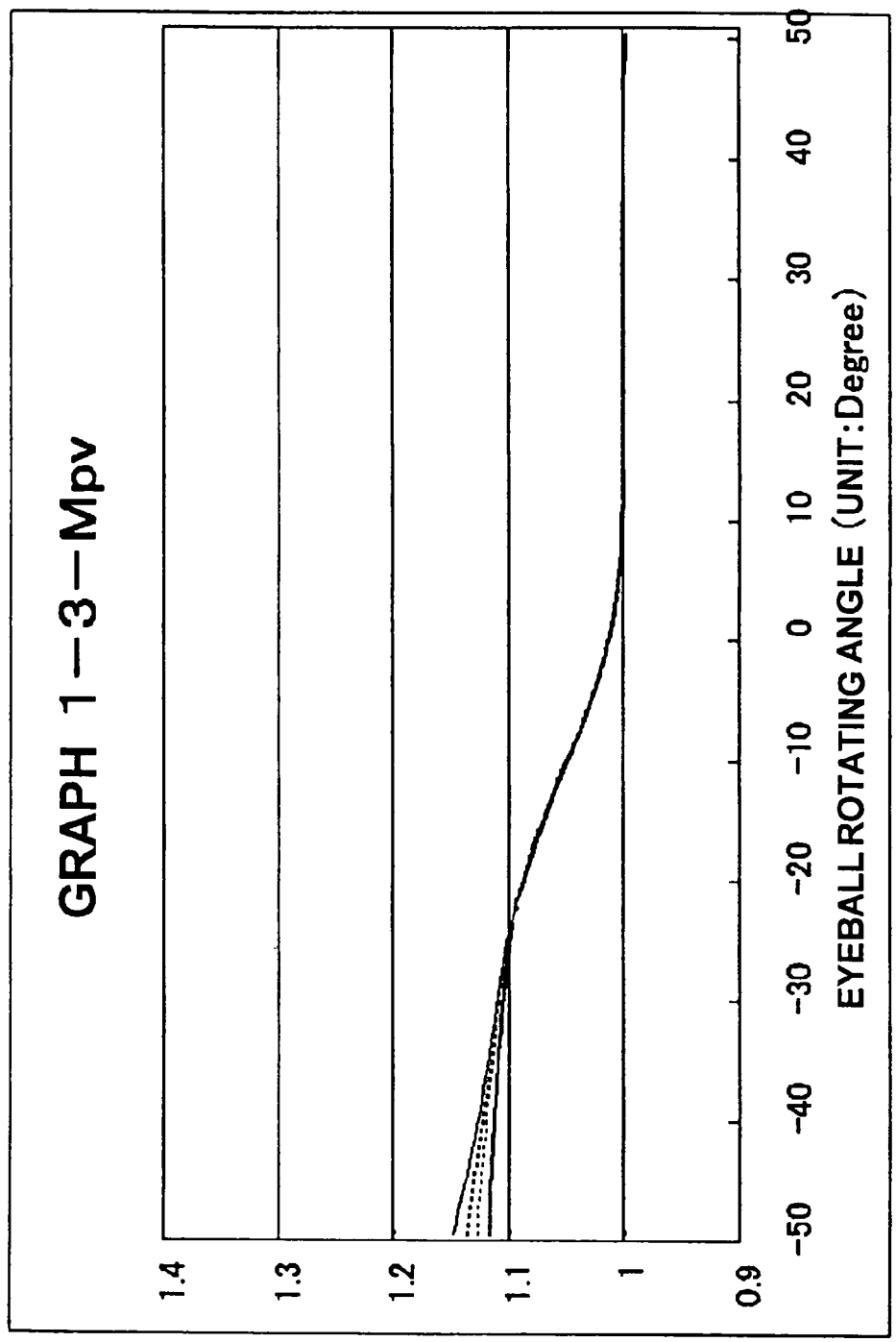
FIG. 17 is a view showing Graph 1-3-Mpv representing results, obtained by performing accurate magnification calculations, of the magnification distributions when the lenses of Example 1 and the three kinds of Prior art examples A, B, and C corresponding to the diopters of Example 1 are viewed along the principal sight lines.
Figure 18:
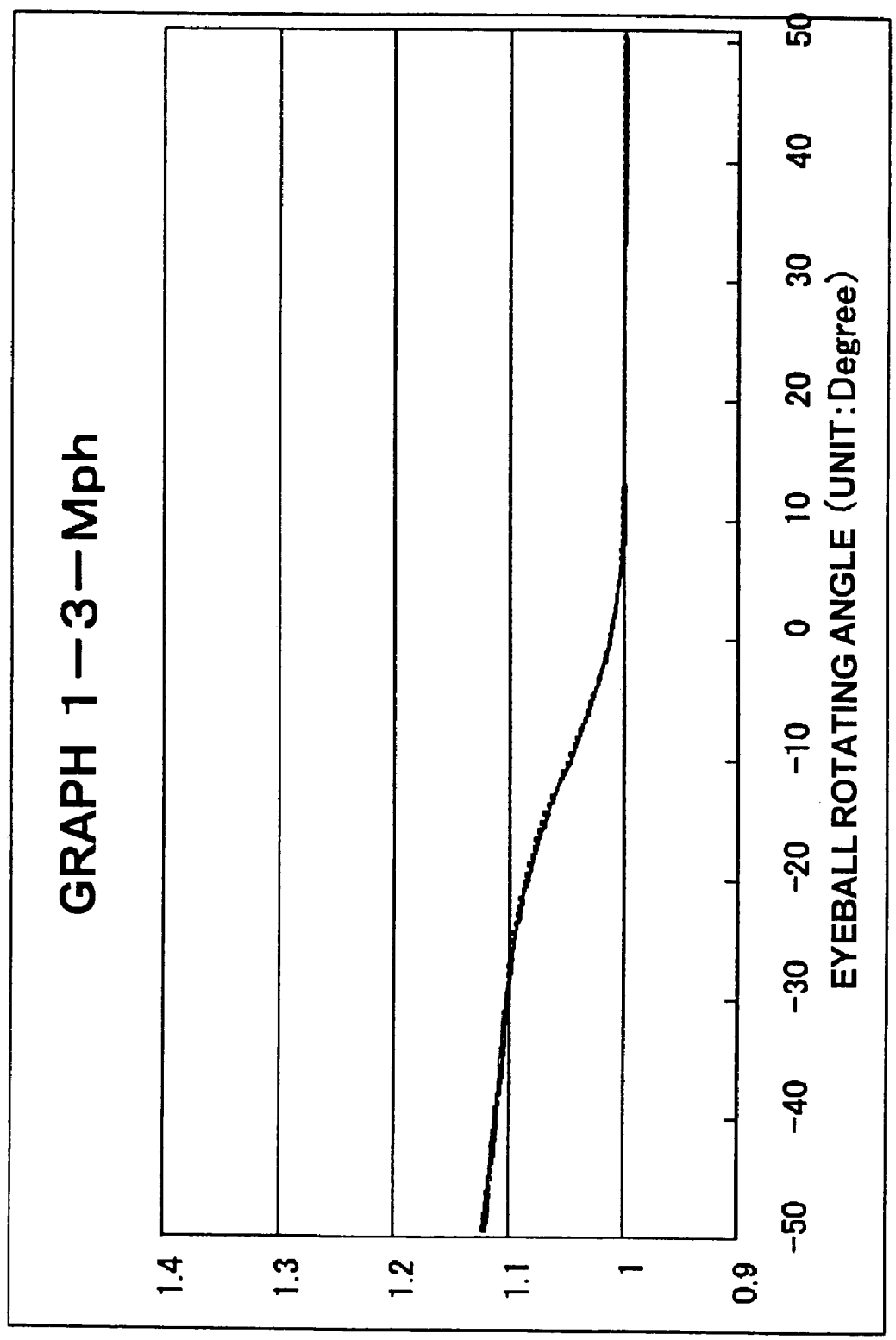
FIG. 18 is a view showing Graph 1-3-Mph representing results, obtained by performing accurate magnification calculations, of the magnification distributions when the lenses of Example 1 and the three kinds of Prior art examples A, B, and C corresponding to the diopters of Example 1 are viewed along the principal sight lines.
Figure 19:
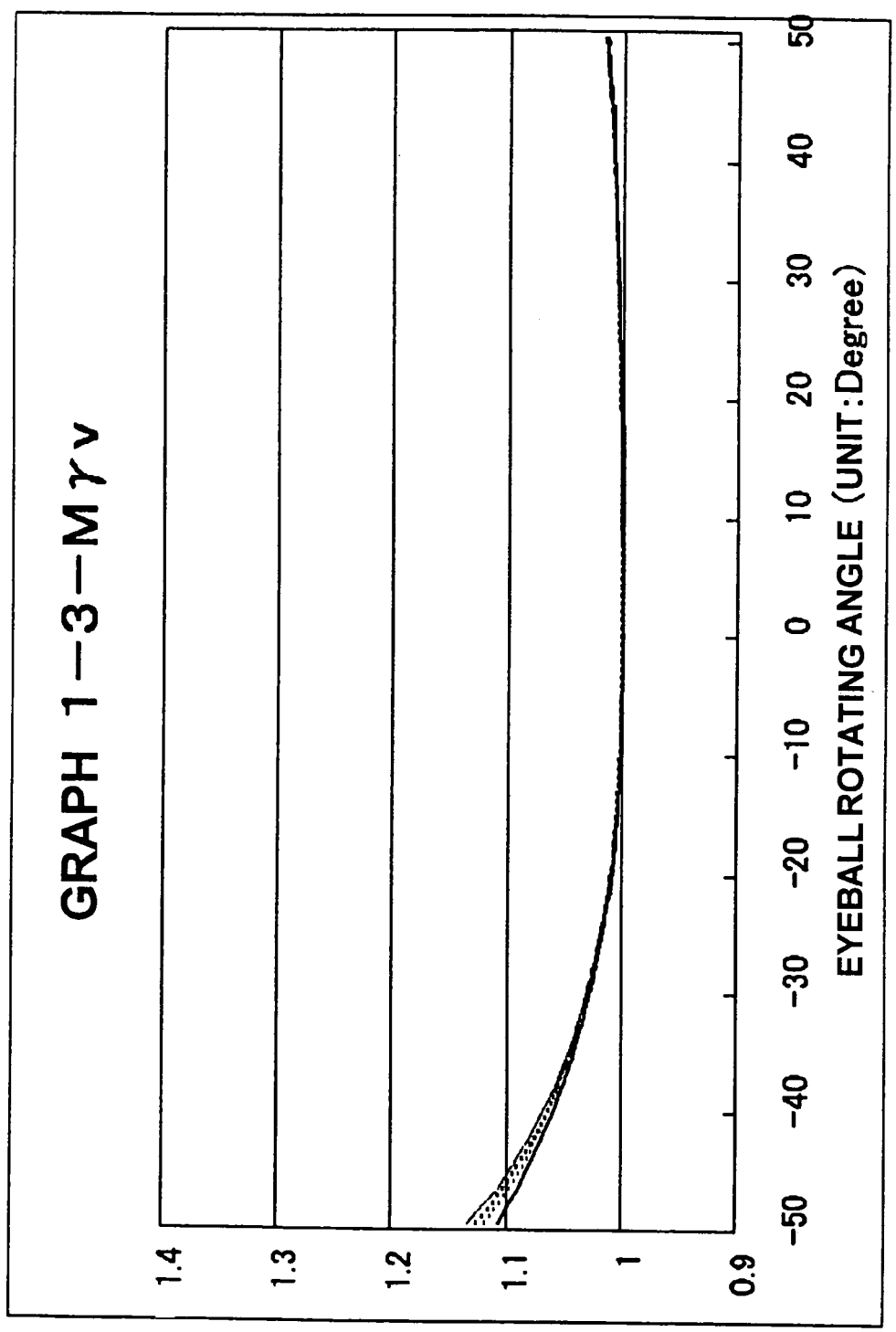
FIG. 19 is a view showing Graph 1-3-Mγv representing results, obtained by performing accurate magnification calculations, of the magnification distributions when the lenses of Example 1 and the three kinds of Prior art examples A, B, and C corresponding to the diopter of Example 1 are viewed along the principal sight lines.
Figure 20:
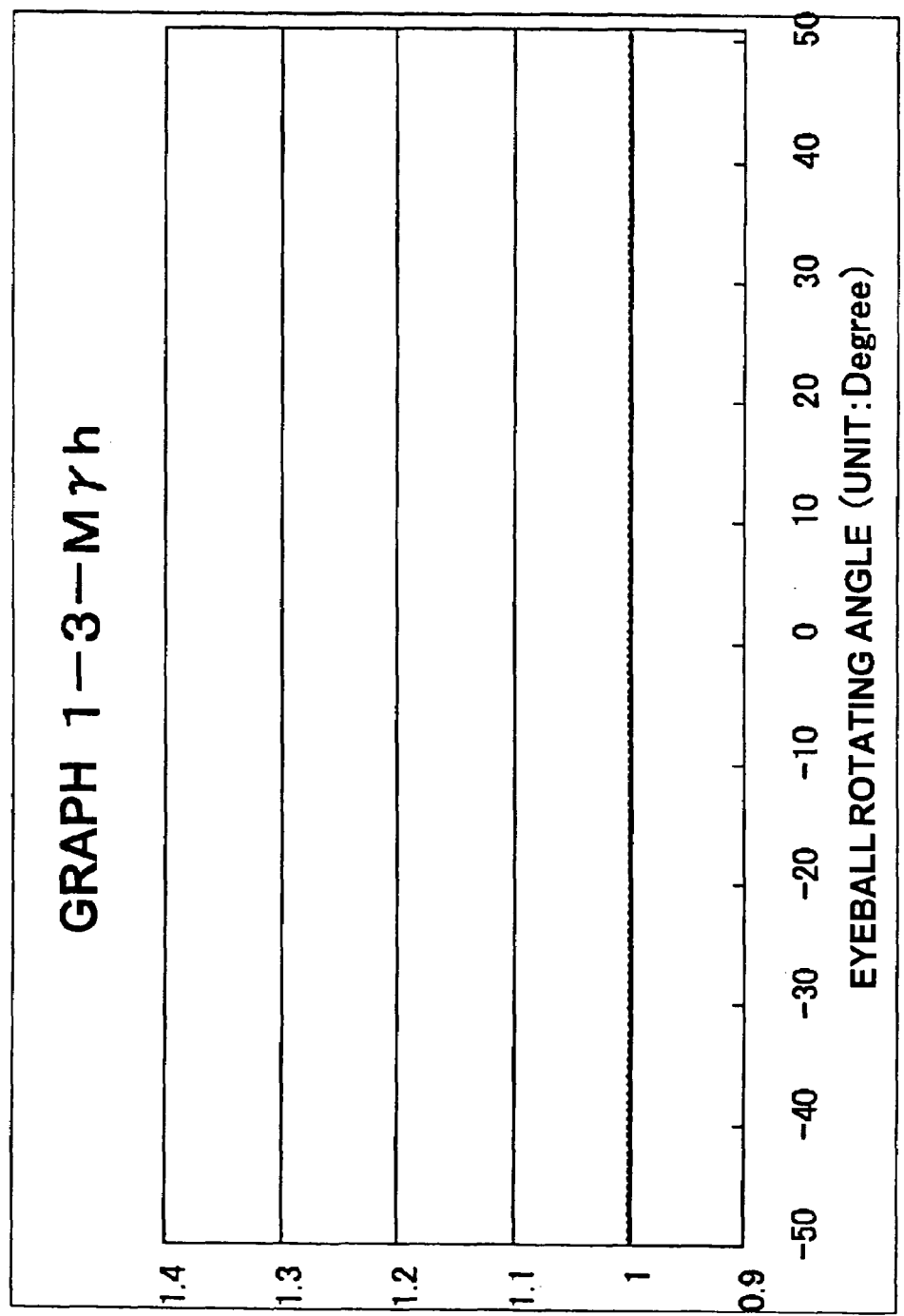
FIG. 20 is a view showing Graph 1-3-Mγh representing results, obtained by performing accurate magnification calculations, of the magnification distributions when the lenses of Example 1 and the three kinds of Prior art examples A, B, and C corresponding to the diopters of Example 1 are viewed along the principal sight lines.
Figure 21:
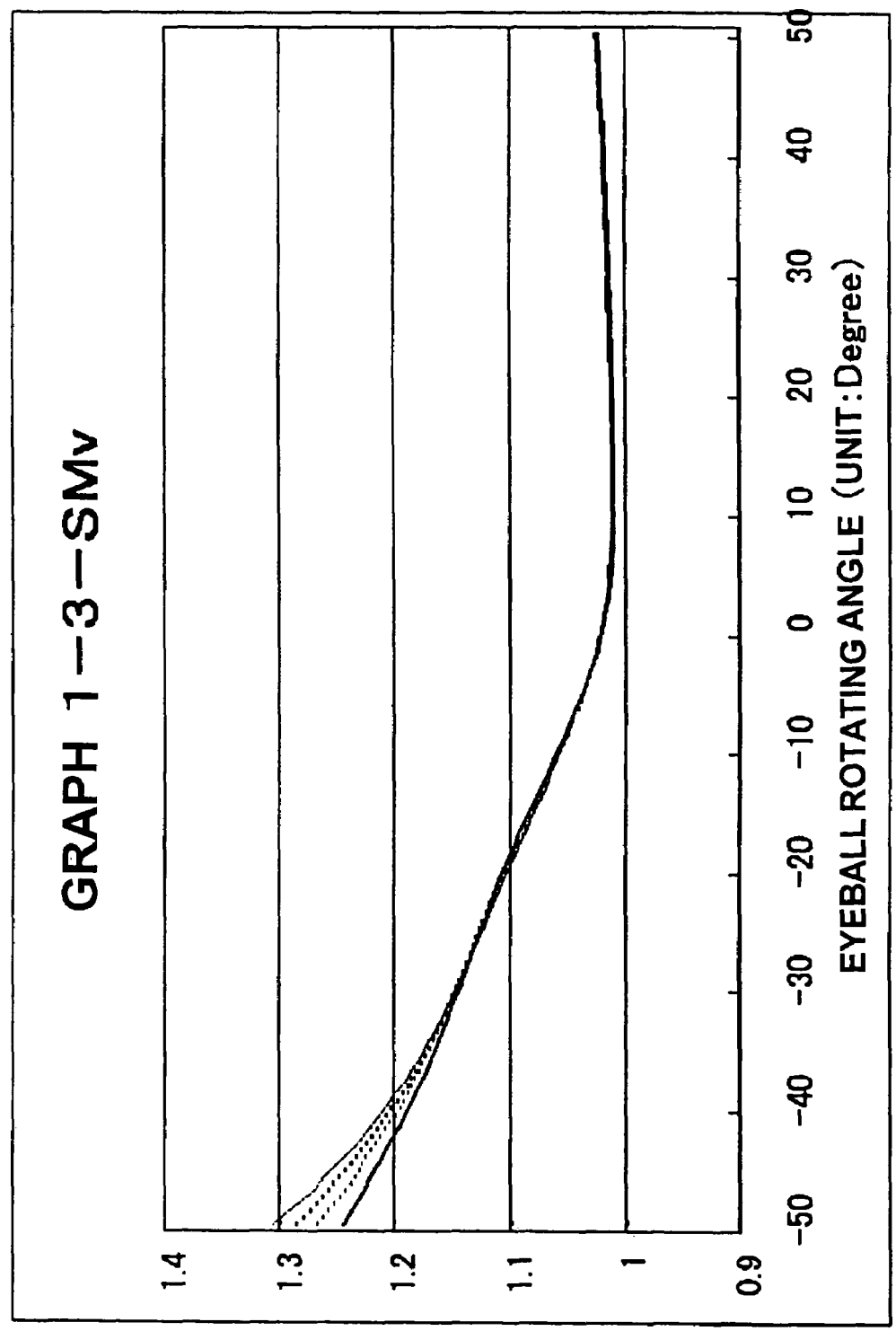
FIG. 21 is a view showing Graph 1-3-SMv representing results, obtained by performing accurate magnification calculations, of the magnification distributions when the lenses of Example 1 and the three kinds of Prior art examples A, B, and C corresponding to the diopters of Example 1 are viewed along the principal sight lines.
Figure 22:
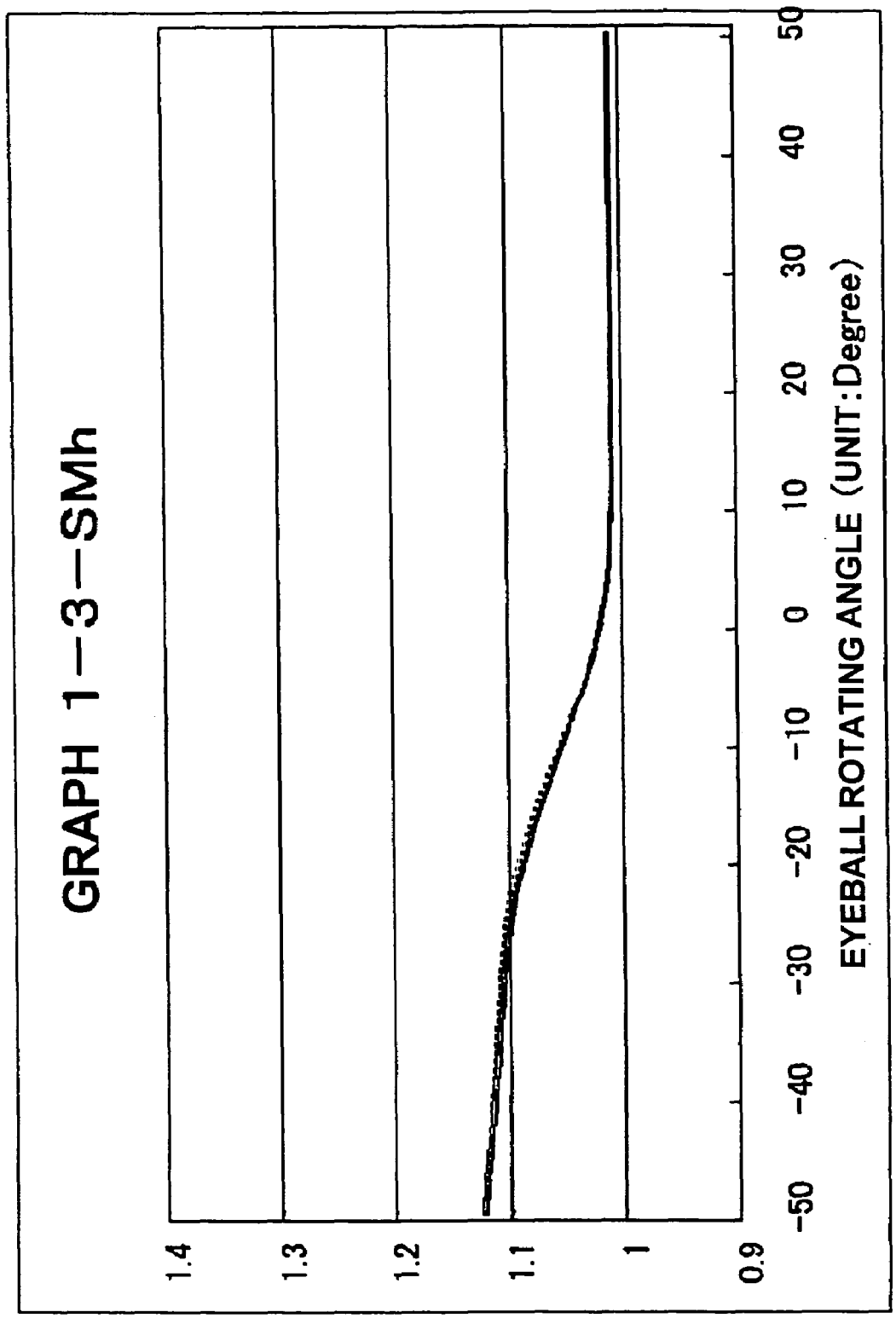
FIG. 22 is a view showing Graph 1-3-SMh representing results, obtained by performing accurate magnification calculations, of the magnification distributions when the lenses of Example 1 and the three kinds of Prior art examples A, B, and C corresponding to the diopters of Example 1 are viewed along the principal sight lines.
Figure 23:
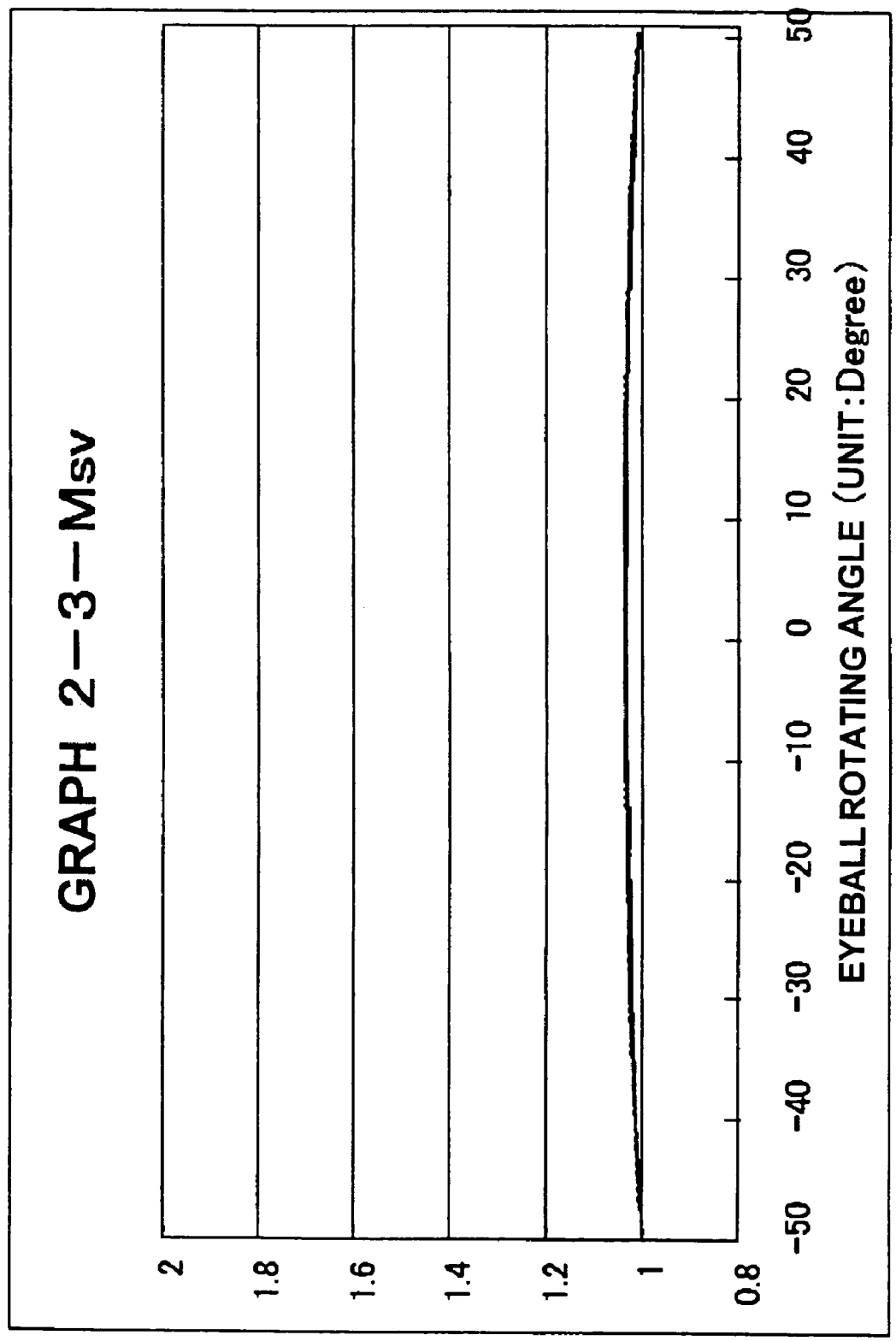
FIG. 23 is a view showing Graph 2-3-Msv representing results, obtained by performing accurate magnification calculations, of magnification distributions when lenses of Example 2 and three kinds of Prior art examples A, B, and C corresponding to the diopters of Example 2 are viewed along principal sight lines.
Figure 24:
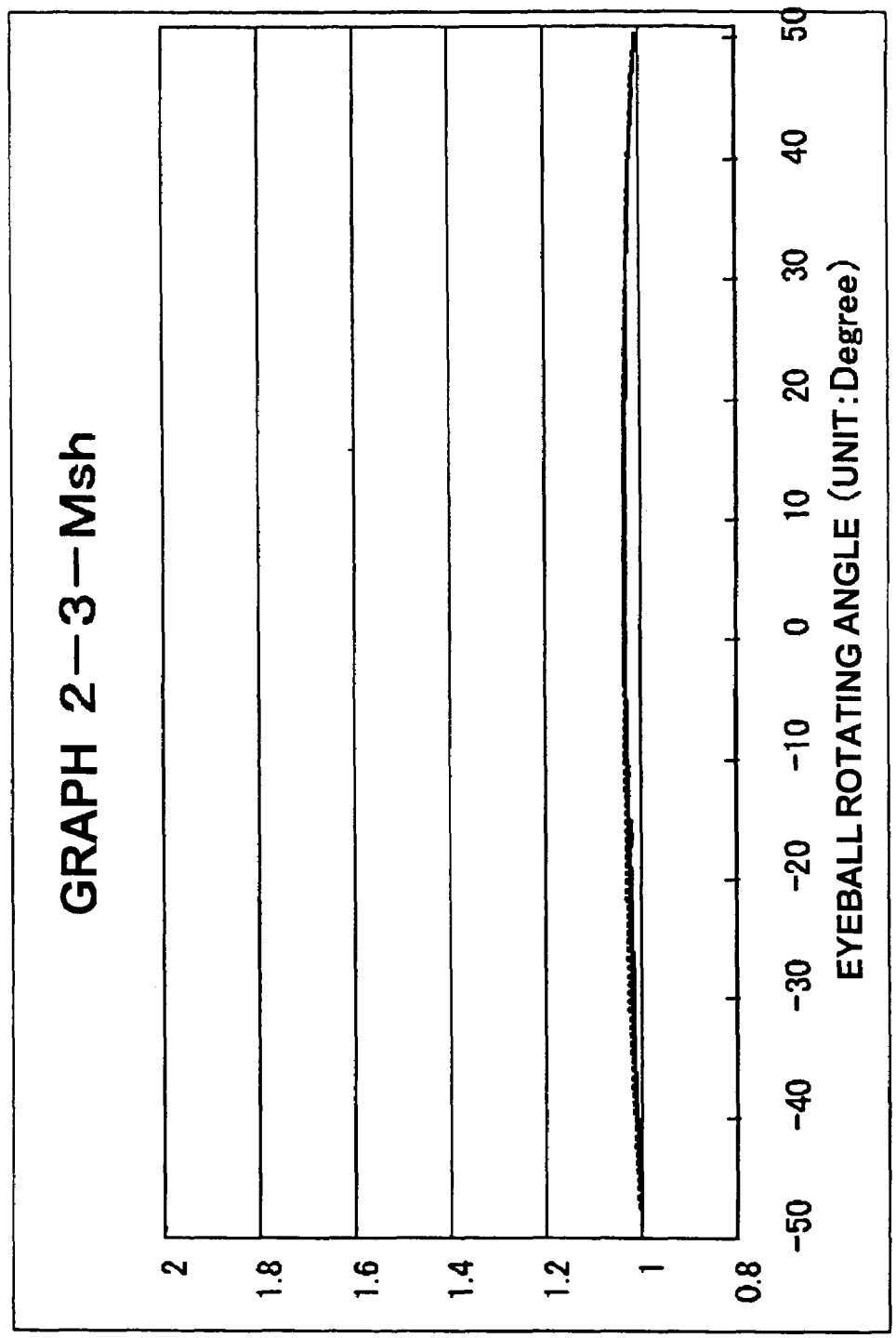
FIG. 24 is a view showing Graph 2-3-Msh representing results, obtained by performing accurate magnification calculations, of the magnification distributions when the lenses of Example 2 and the three kinds of Prior art examples A, B, and C corresponding to the diopters of Example 2 are viewed along the principal sight lines.
Figure 25:
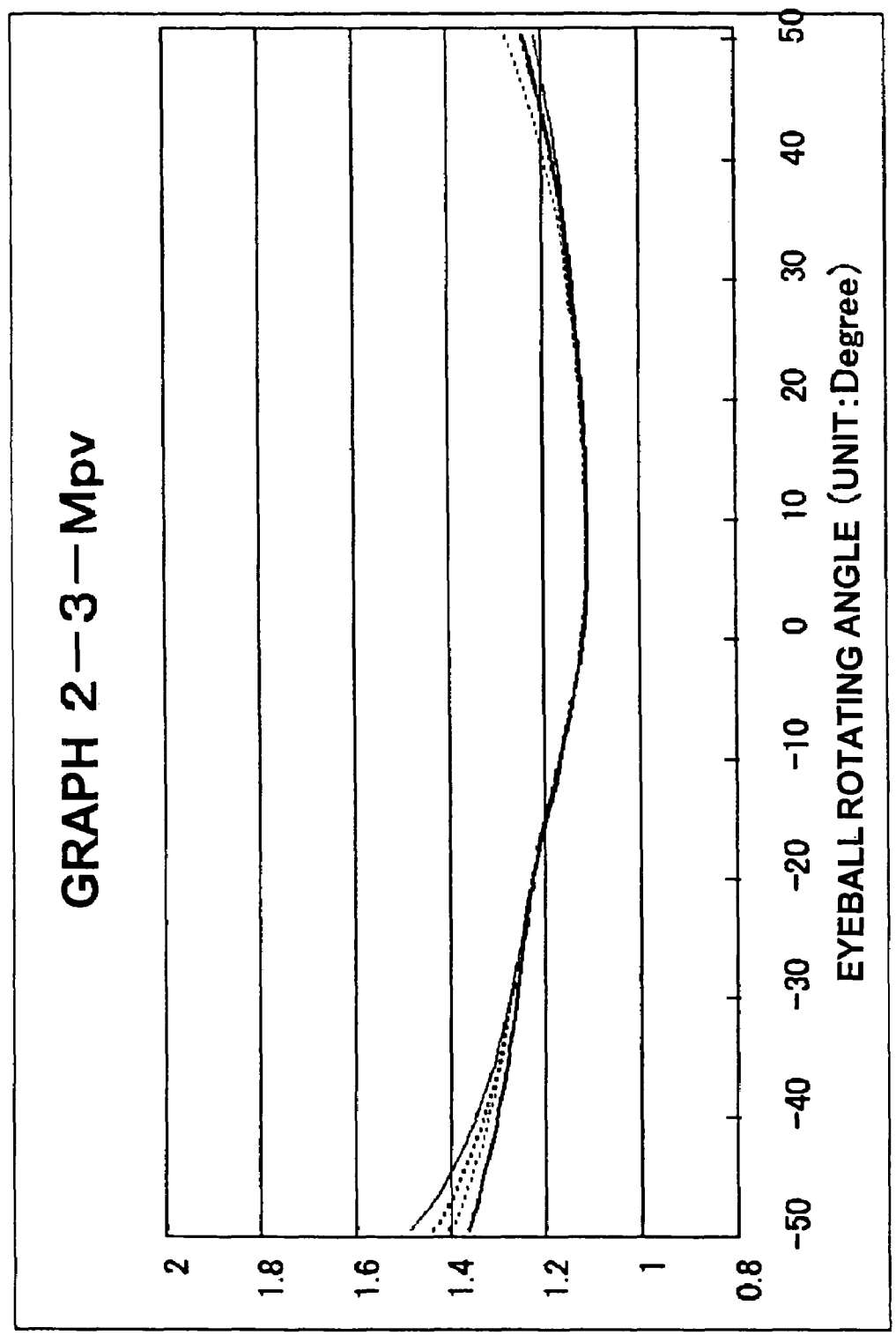
FIG. 25 is a view showing Graph 2-3-Mpv representing results, obtained by performing accurate magnification calculations, of the magnification distributions when the lenses of Example 2 and the three kinds of Prior art examples A, B, and C corresponding to the diopters of Example 2 are viewed along the principal sight lines.
Figure 26:
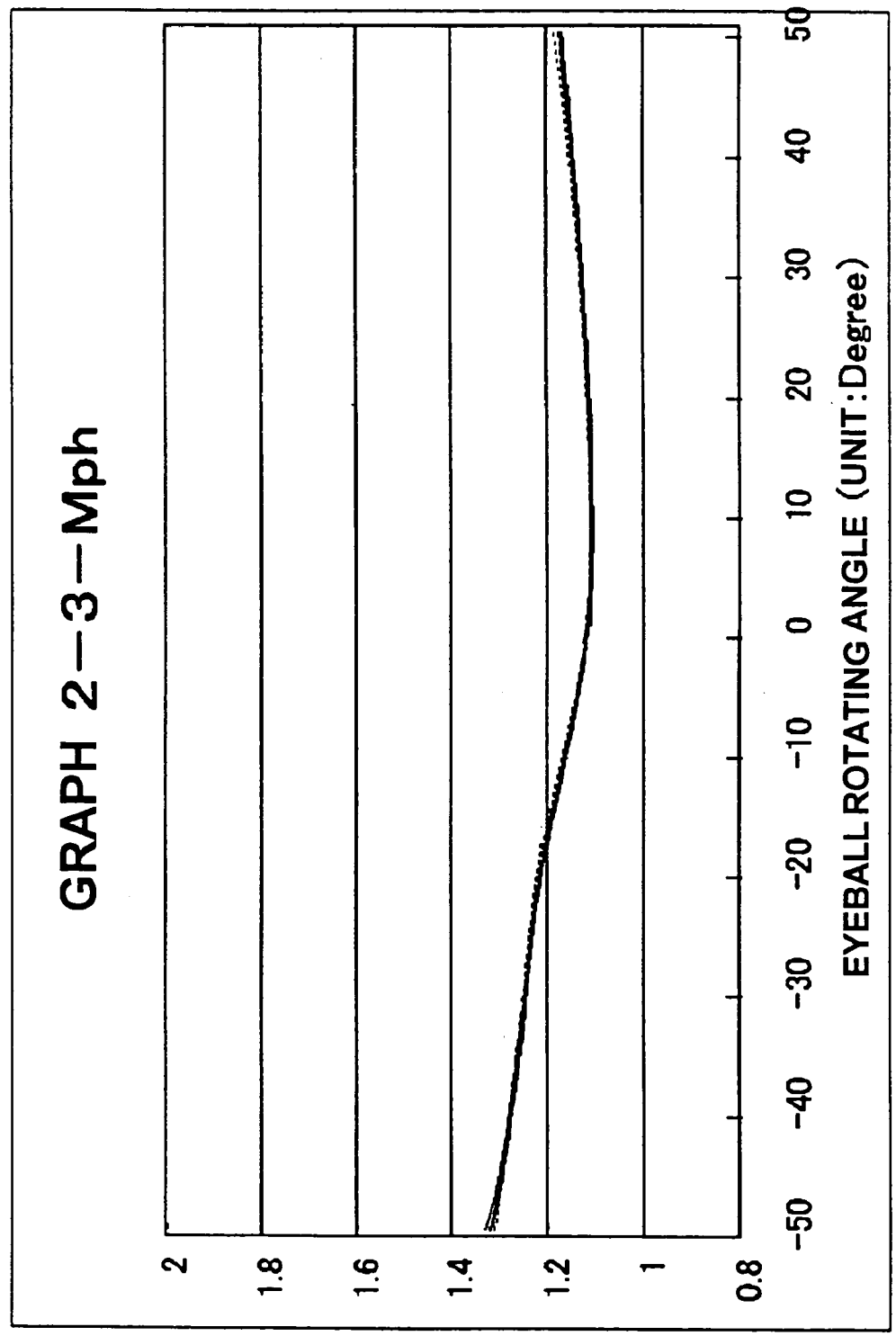
FIG. 26 is a view showing Graph 2-3-Mph representing results, obtained by performing accurate magnification calculations, of the magnification distributions when the lenses of Example 2 and the three kinds of Prior art examples A, B, and C corresponding to the diopters of Example 2 are viewed along the principal sight lines.
Figure 27:
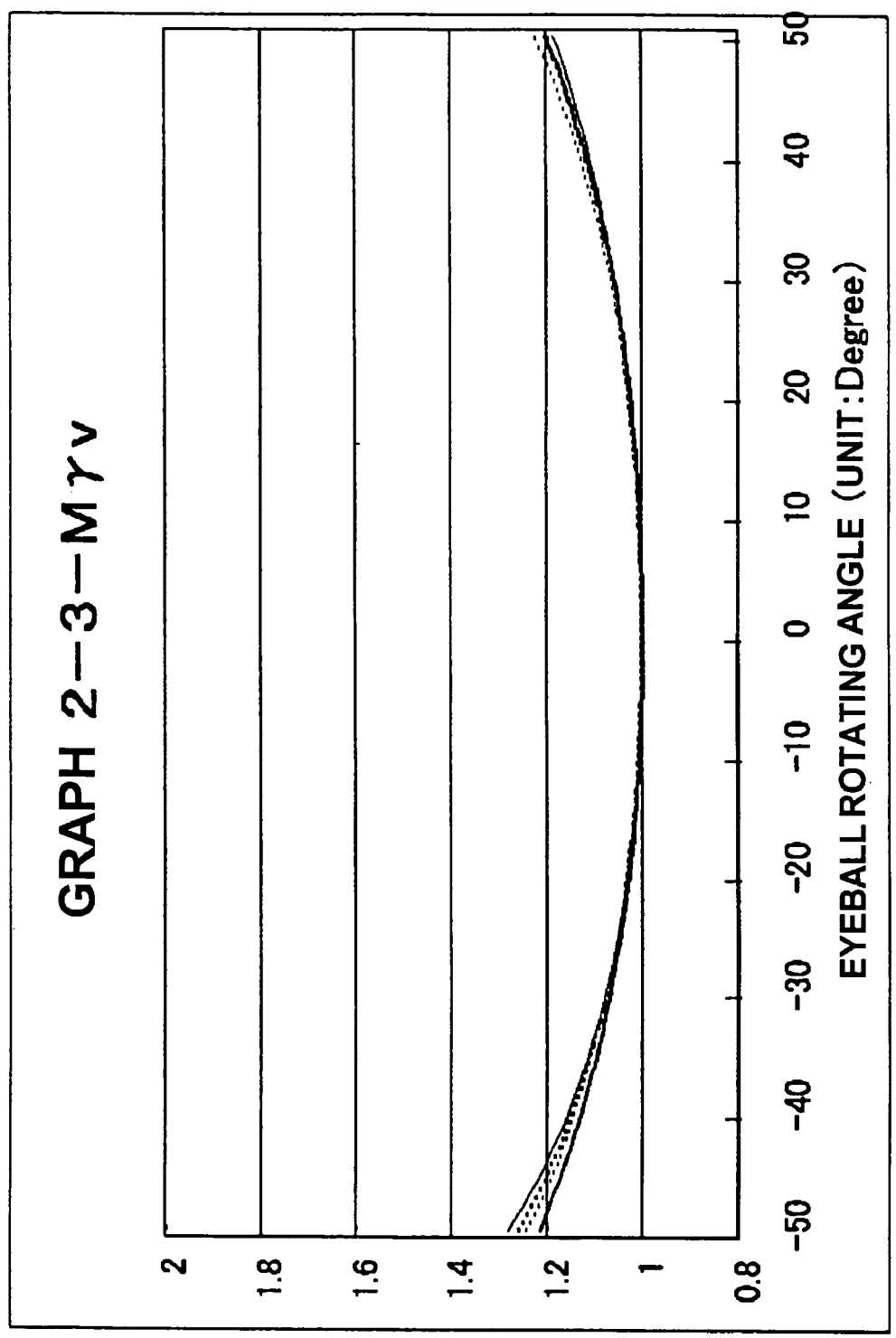
FIG. 27 is a view showing Graph 2-3-Mγv representing results, obtained by performing accurate magnification calculations, of the magnification distributions when the lenses of Example 2 and the three kinds of Prior art examples A, B, and C corresponding to the diopters of Example 2 are viewed along the principal sight lines.
Figure 28:
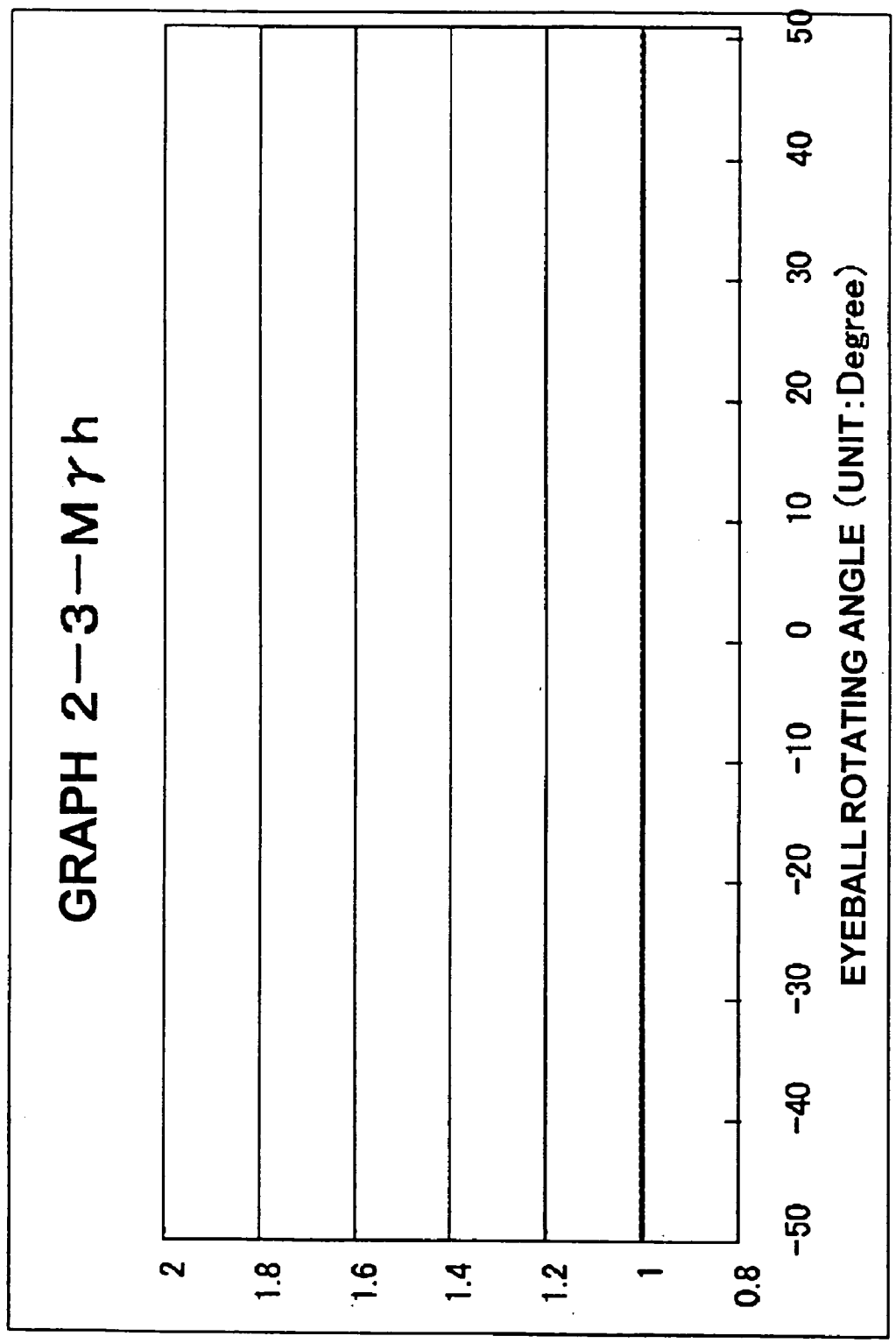
FIG. 28 is a view showing Graph 2-3-Mγh representing results, obtained by performing accurate magnification calculations, of the magnification distributions when the lenses of Example 2 and the three kinds of Prior art examples A, B, and C corresponding to the diopters of Example 2 are viewed along the principal sight lines.
Figure 29:
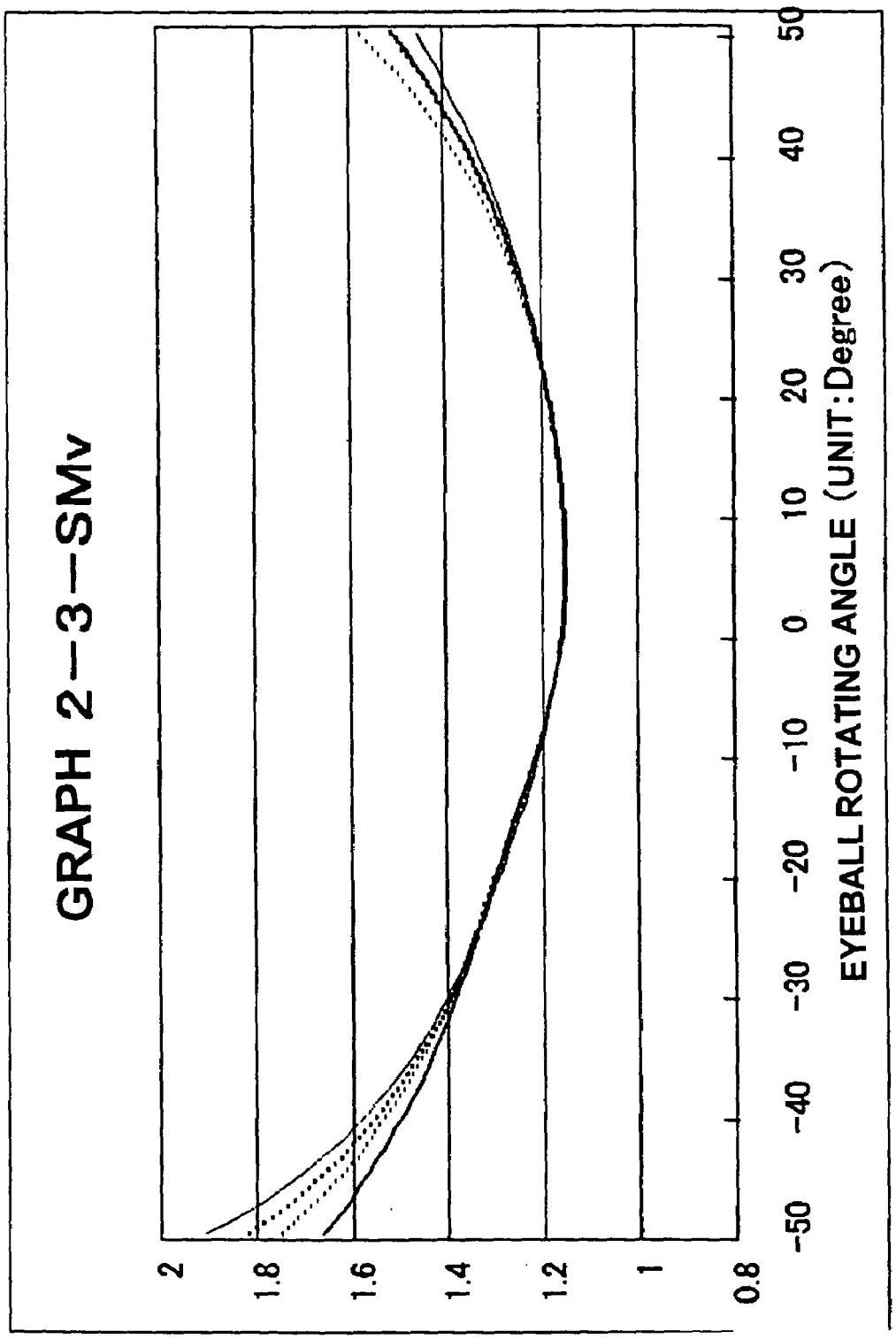
FIG. 29 is a view showing Graph 2-3-SMv representing results, obtained by performing accurate magnification calculations, of the magnification distributions when the lenses of Example 2 and the three kinds of Prior art examples A, B, and C corresponding to the diopters of Example 2 are viewed along the principal sight lines.
Figure 30:
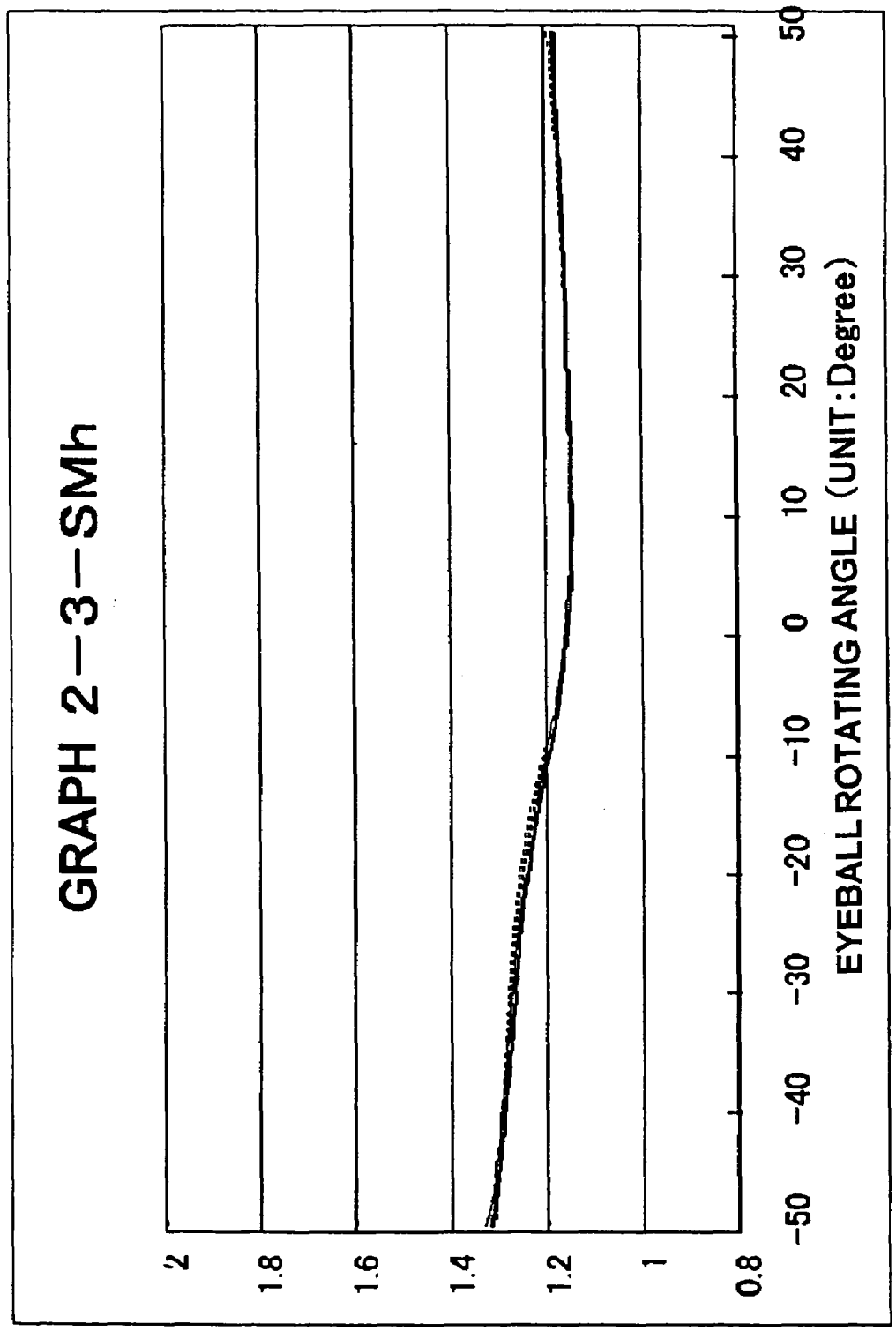
FIG. 30 is a view showing Graph 2-3-SMh representing results, obtained by performing accurate magnification calculations, of the magnification distributions when the lenses of Example 2 and the three kinds of Prior art examples A, B, and C corresponding to the diopters of Example 2 are viewed along the principal sight lines.
Figure 31:
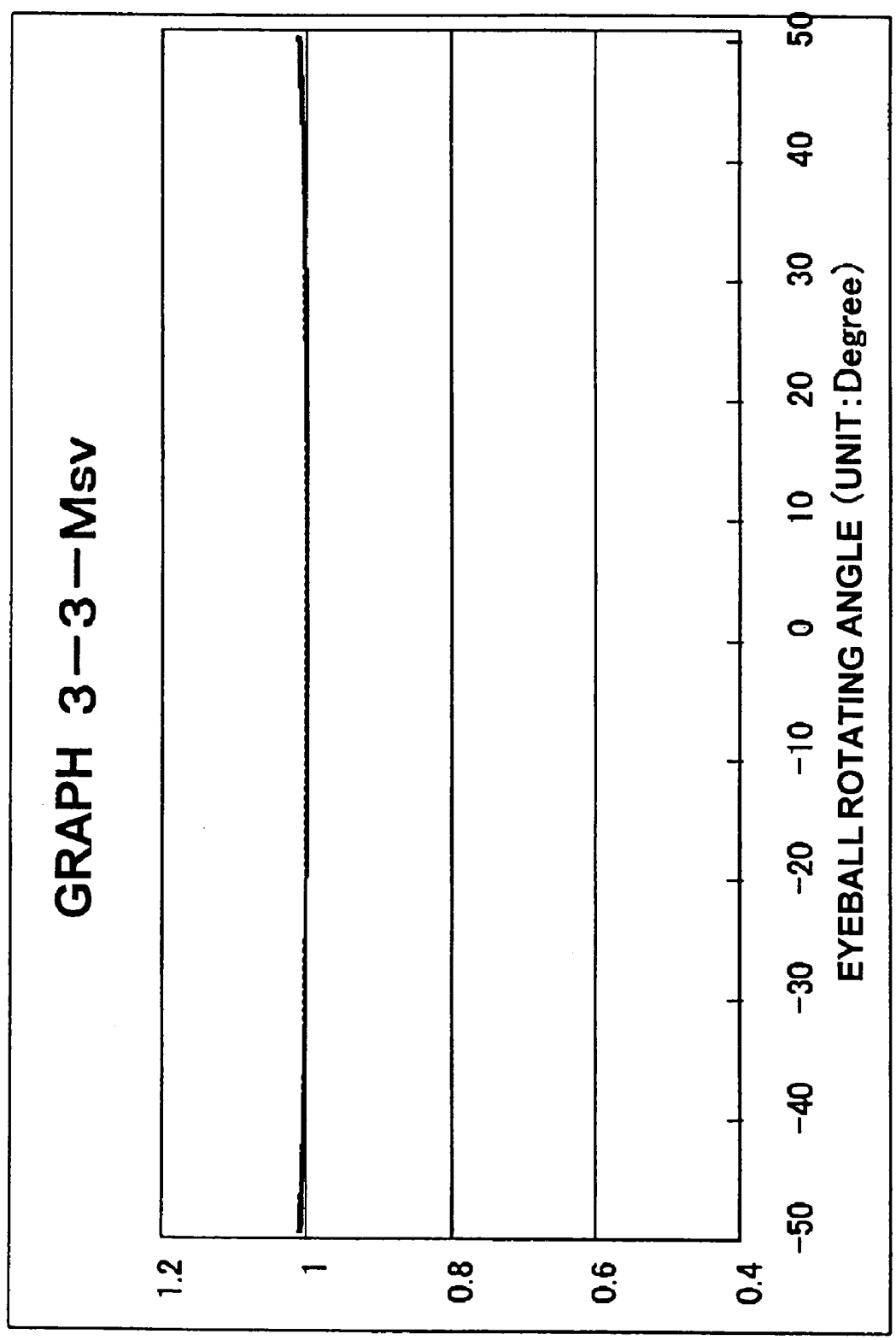
FIG. 31 is a view showing Graph 3-3-Msv representing results, obtained by performing accurate magnification calculations, of magnification distributions when lenses of Example 3 and three kinds of Prior art examples A, B, and C corresponding to the diopters of Example 3 are viewed along principal sight lines.
Figure 32:
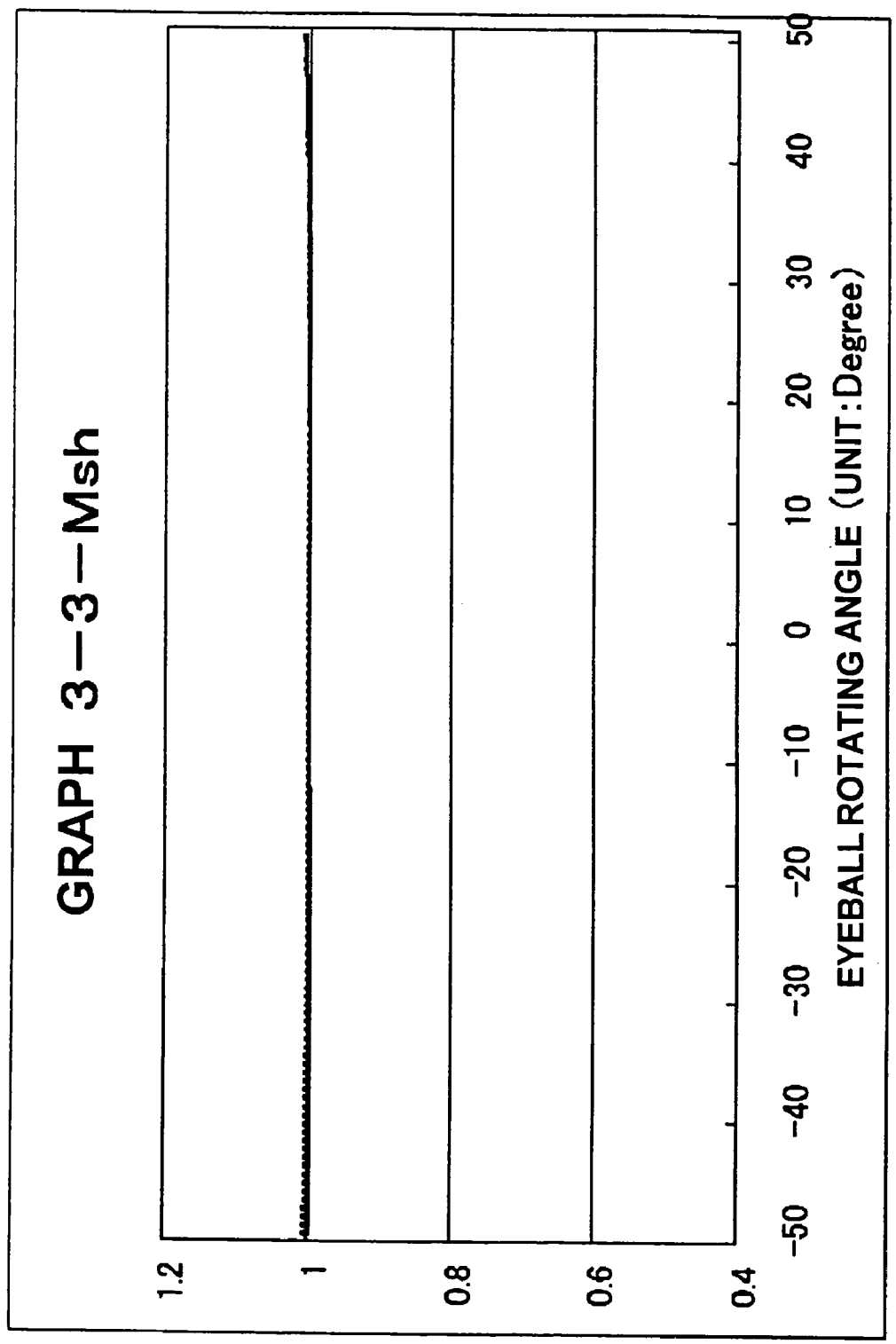
FIG. 32 is a view showing Graph 3-3-Msh representing results, obtained by performing accurate magnification calculations, of the magnification distributions when the lenses of Example 3 and the three kinds of Prior art examples A, B, and C corresponding to the diopters of Example 3 are viewed along the principal sight lines.
Figure 33:
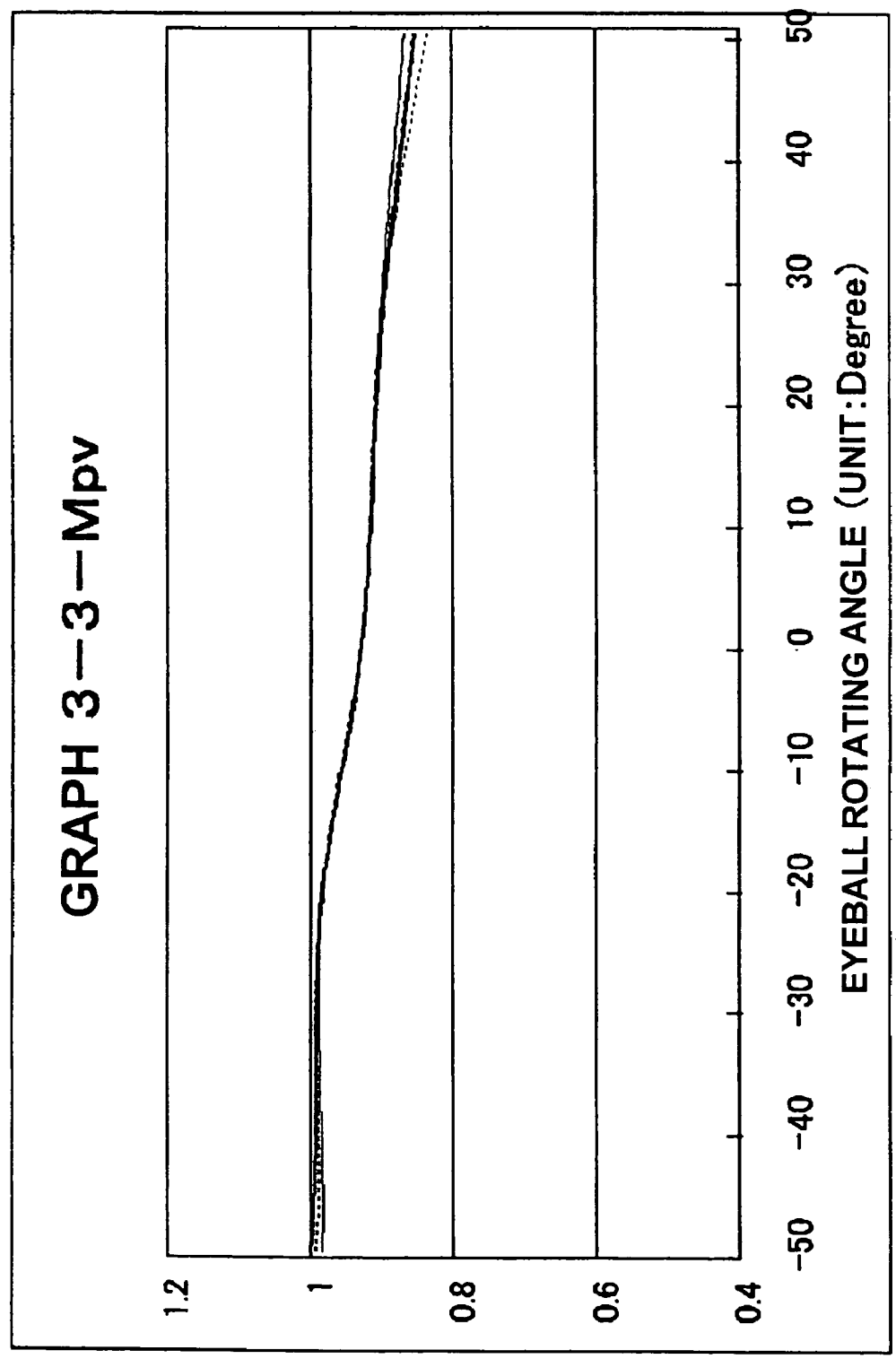
FIG. 33 is a view showing Graph 3-3-Mpv representing results, obtained by performing accurate magnification calculations, of the magnification distributions when the lenses of Example 3 and the three kinds of Prior art examples A, B, and C corresponding to the diopters of Example 3 are viewed along the principal sight lines.
Figure 34:
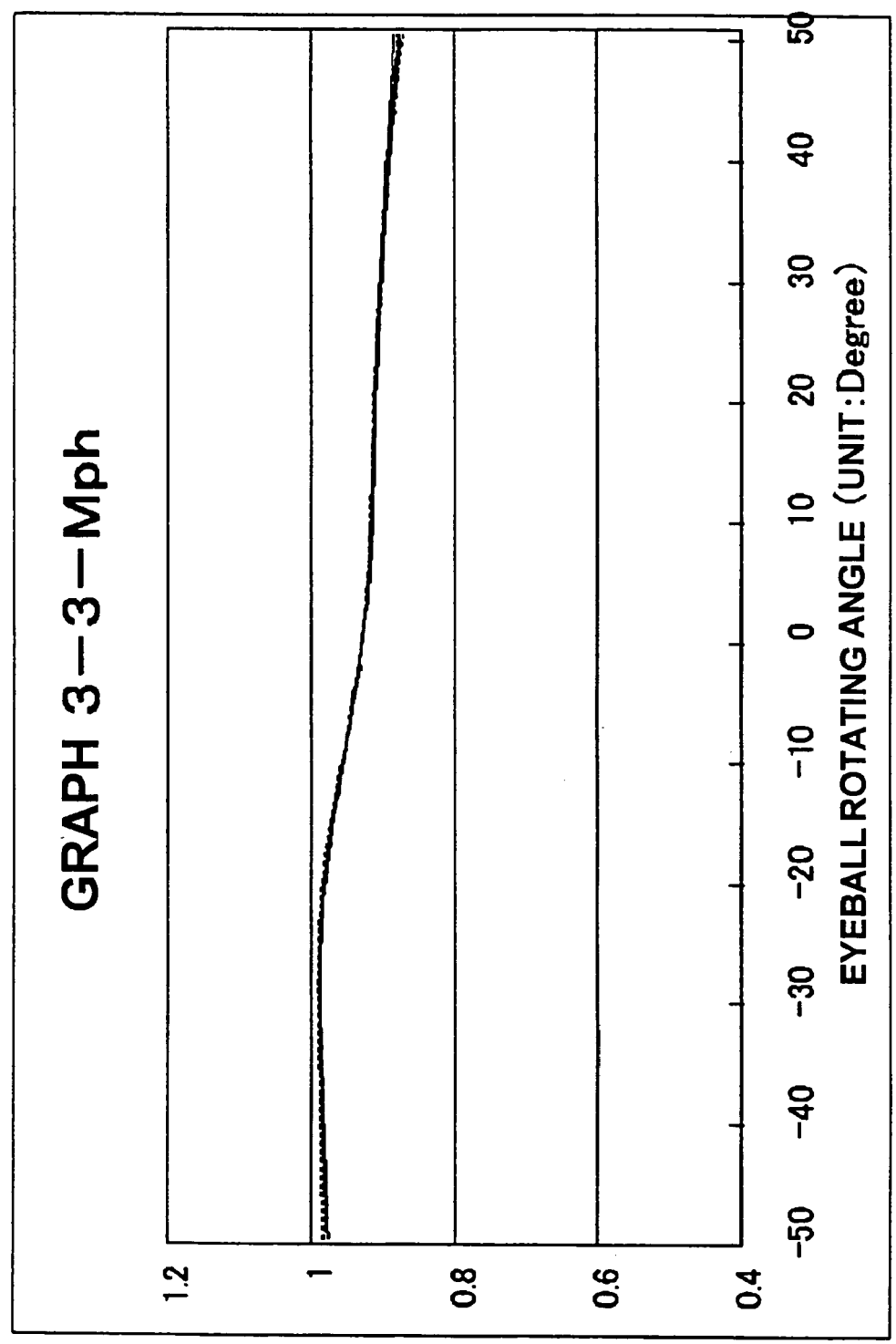
FIG. 34 is a view showing Graph 3-3-Mph representing results, obtained by performing accurate magnification calculations, of the magnification distributions when the lenses of Example 3 and the three kinds of Prior art examples A, B, and C corresponding to the diopters of Example 3 are viewed along the principal sight lines.
Figure 35:
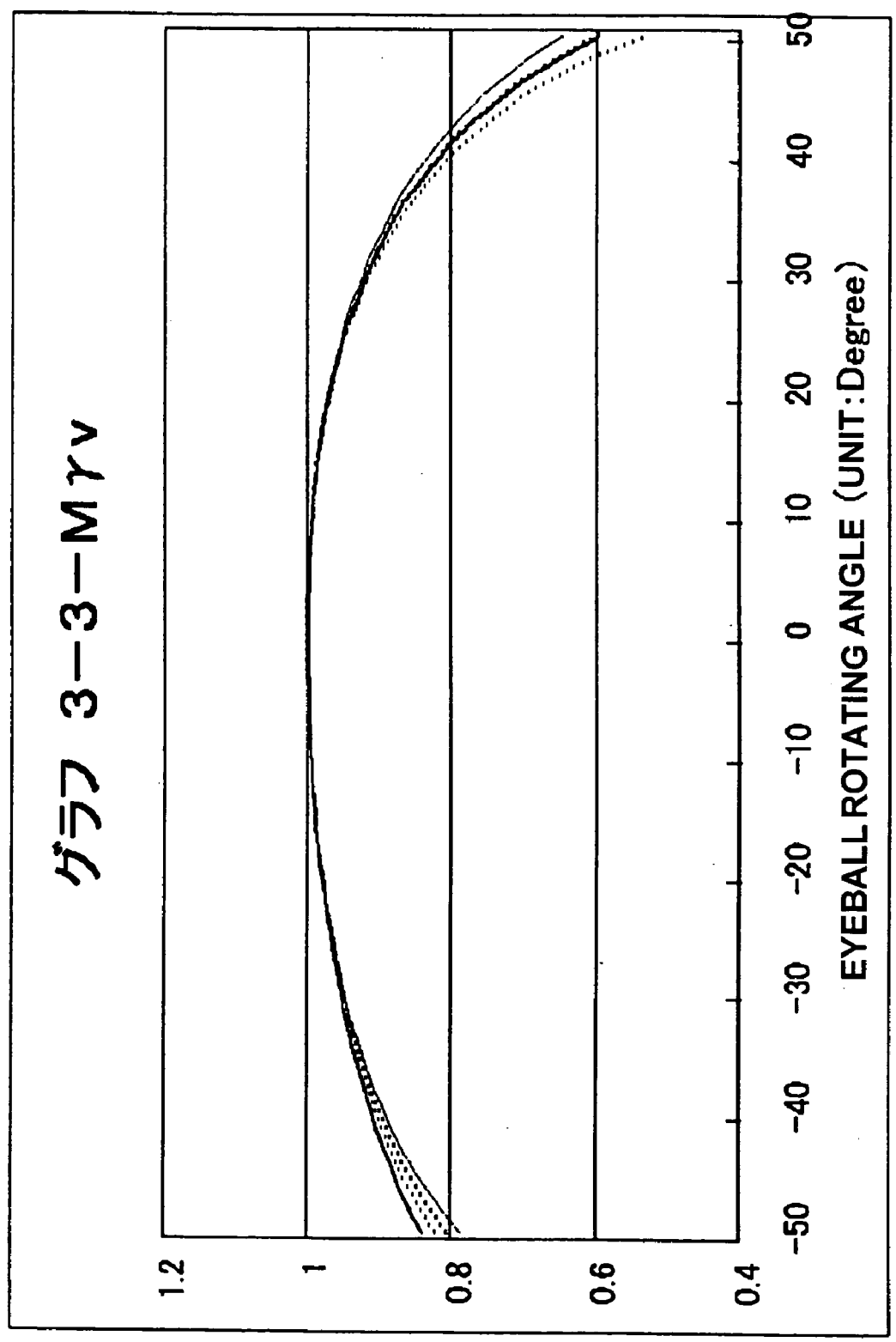
FIG. 35 is a view showing Graph 3-3-Mγv representing results, obtained by performing accurate magnification calculations, of the magnification distributions when the lenses of Example 3 and the three kinds of Prior art examples A, B, and C corresponding to the diopters of Example 3 are viewed along the principal sight lines.
Figure 36:
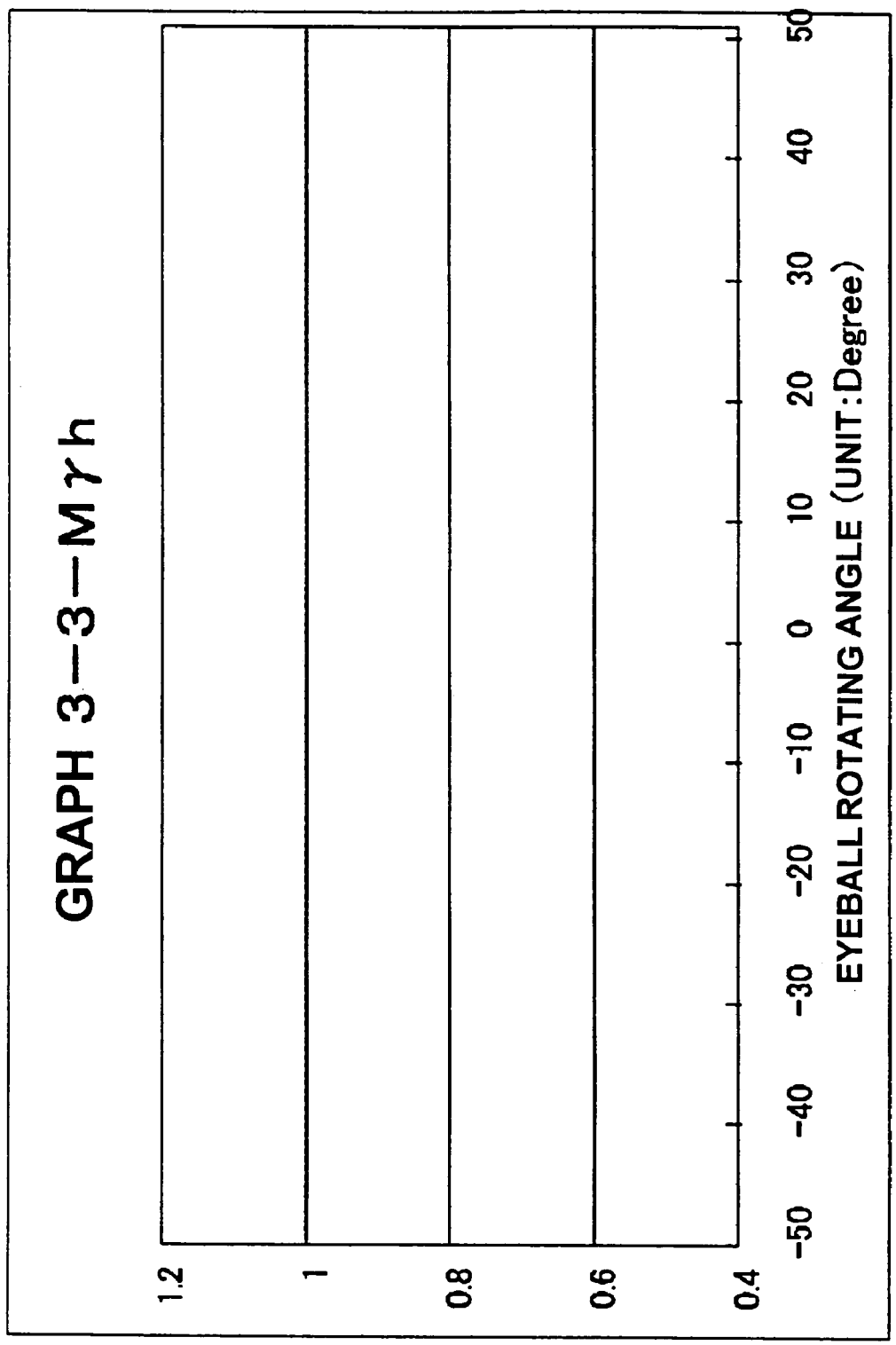
FIG. 36 is a view showing Graph 3-3-Mγh representing results, obtained by performing accurate magnification calculations, of the magnification distributions when the lenses of Example 3 and the three kinds of Prior art examples A, B, and C corresponding to the diopters of Example 3 are viewed along the principal sight lines.
Figure 37:
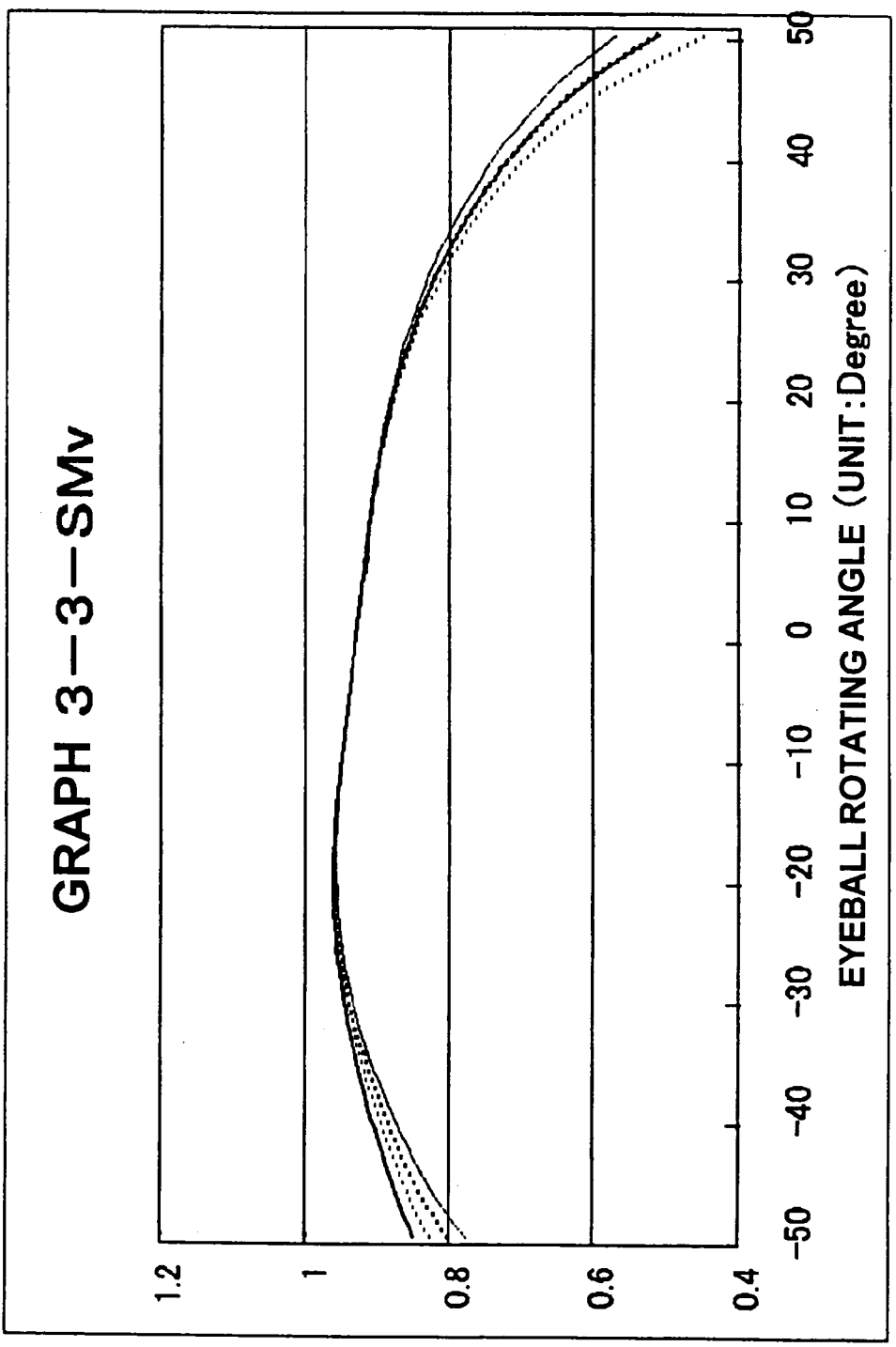
FIG. 37 is a view showing Graph 3-3-SMv representing results, obtained by performing accurate magnification calculations, of the magnification distributions when the lenses of Example 3 and the three kinds of Prior art examples A, B, and C corresponding to the diopters of Example 3 are viewed along the principal sight lines.
Figure 38:
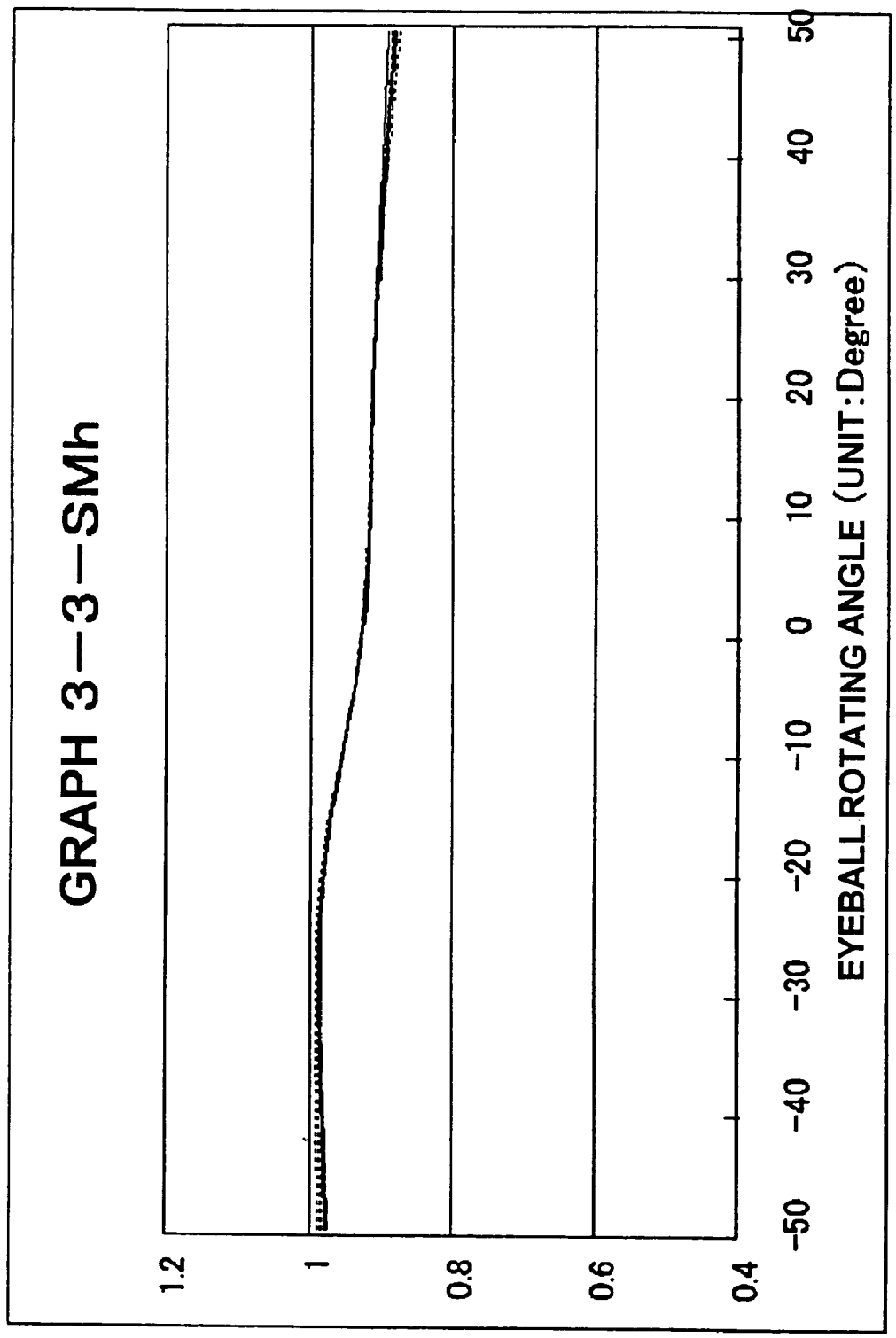
FIG. 38 is a view showing Graph 3-3-SMh representing results, obtained by performing accurate magnification calculations, of the magnification distributions when the lenses of Example 3 and the three kinds of Prior art examples A, B, and C corresponding to the diopters of Example 3 are viewed along the principal sight lines.
Figure 39:
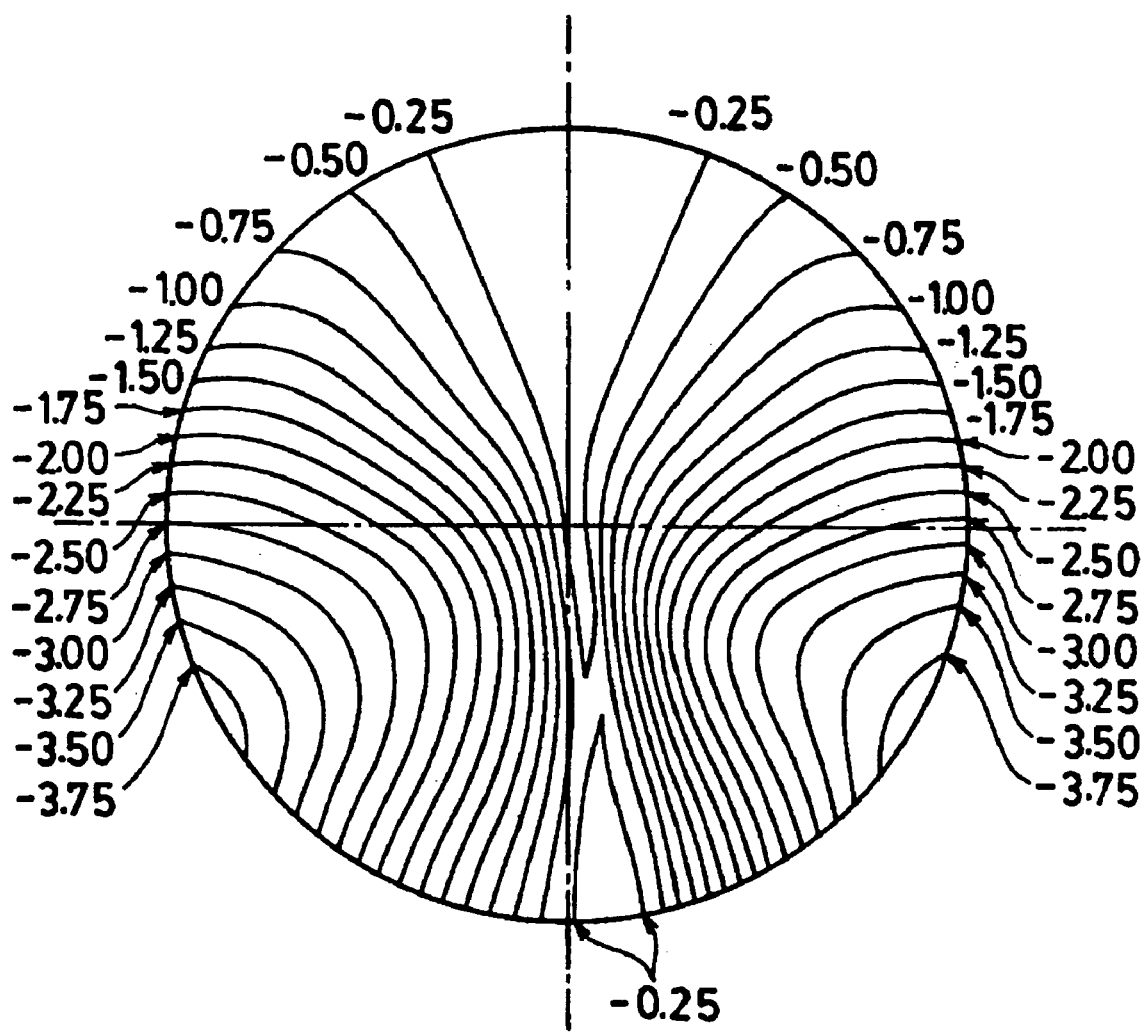
FIG. 39 is a view showing an astigmatism distribution in a transmission state of the lens according to Example 1.
Figure 40:
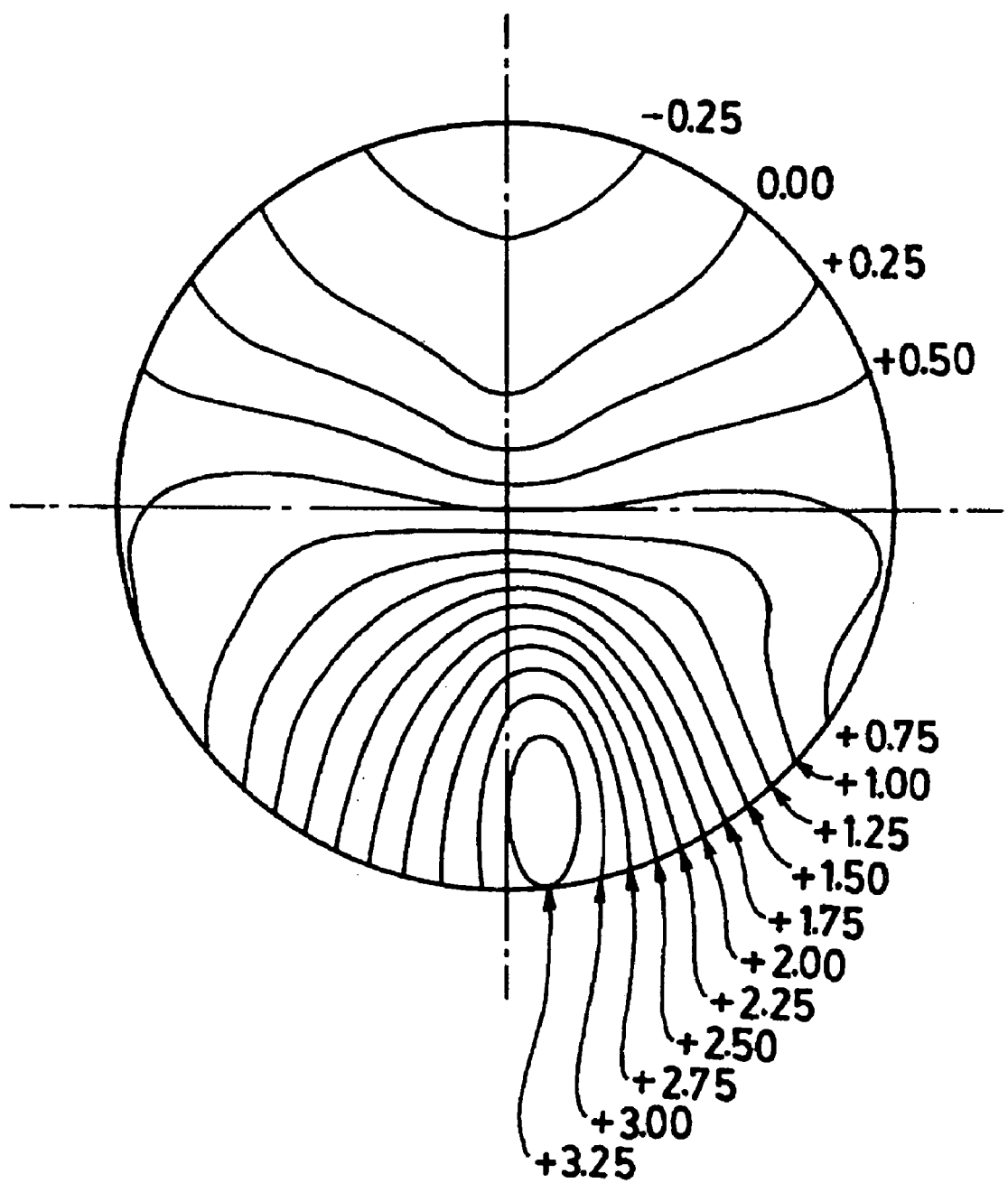
FIG. 40 is a view showing an average diopter distribution in the transmission state of the lens according to Example 1.
Figure 41:
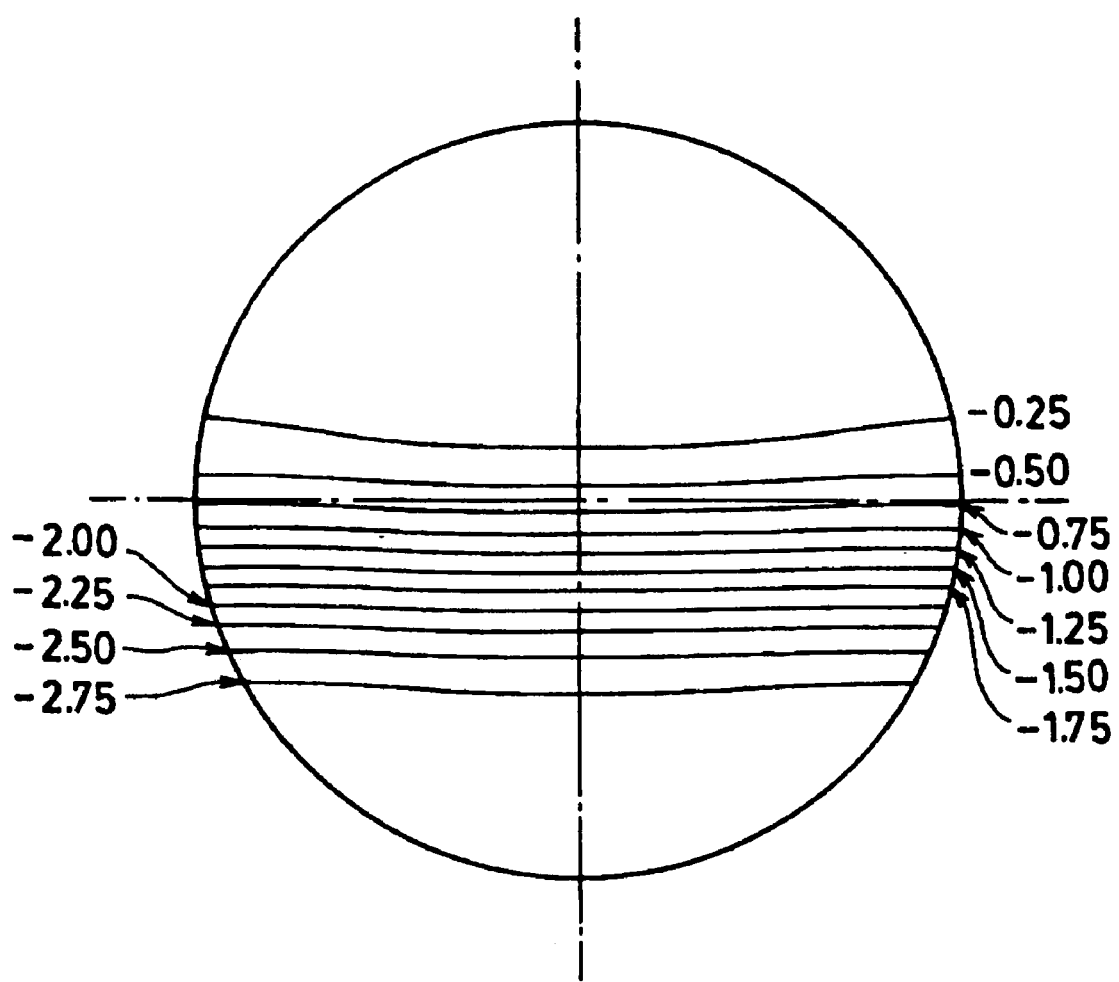
FIG. 41 is a view showing an astigmatism distribution on a refractive surface on the convex surface side of the lens according to Example 1.
Figure 42:
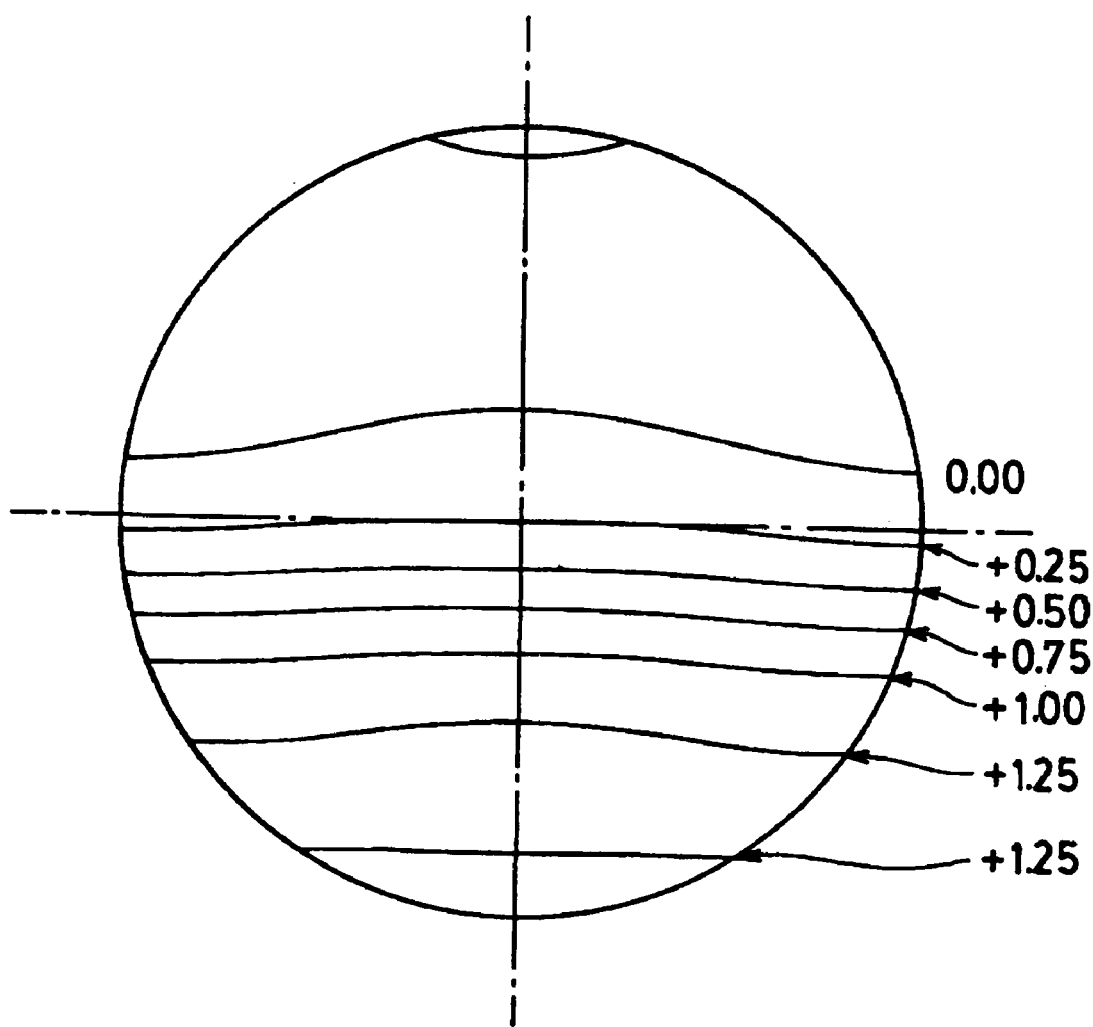
FIG. 42 is a view showing an average diopter distribution on the refractive surface on the convex surface side of the lens according to Example 1.
Figure 43:
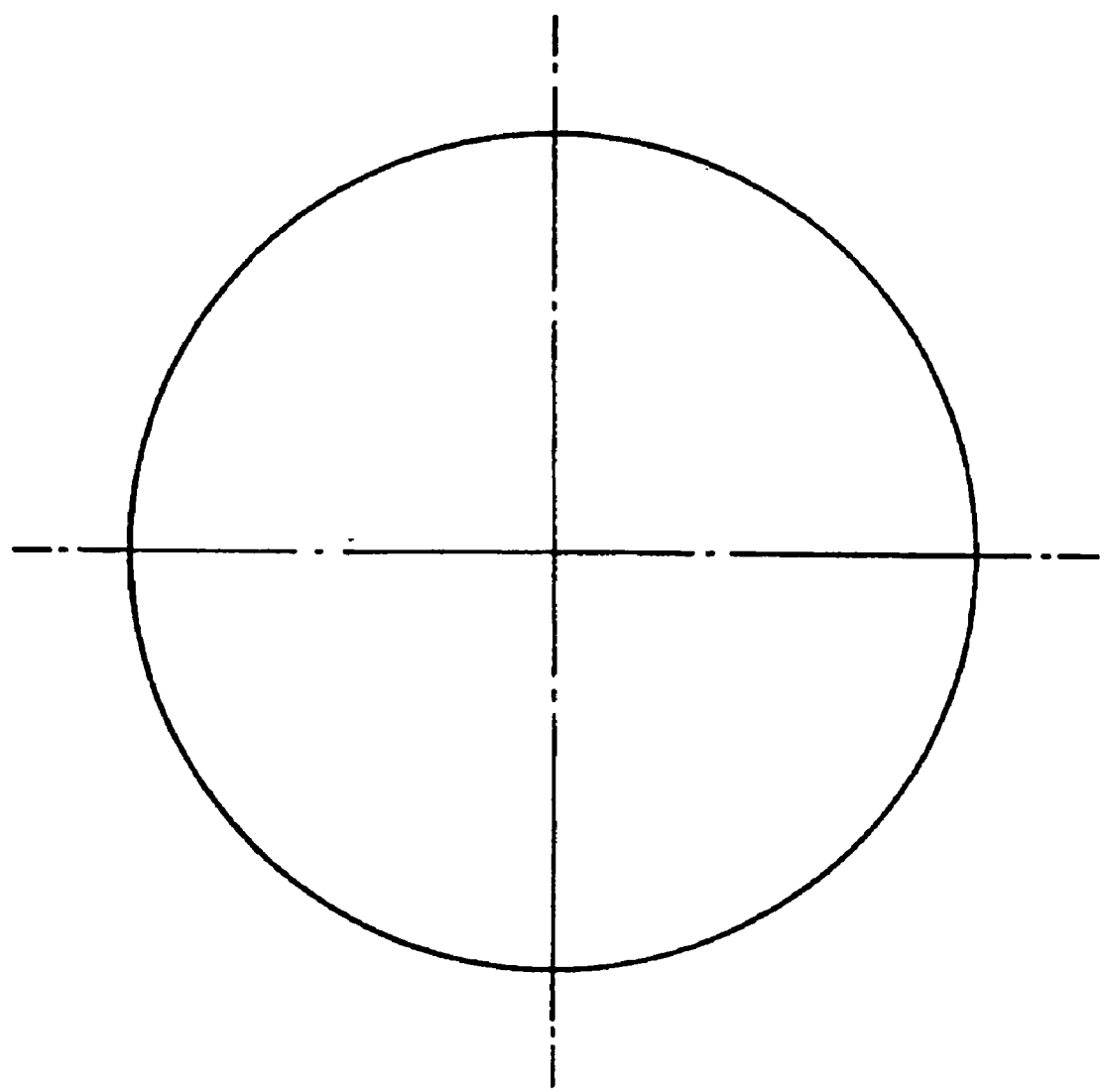
FIG. 43 is a view showing a diopter distribution in the horizontal direction on a refractive surface on the convex surface side of the lens according to Example 1.
Figure 44:
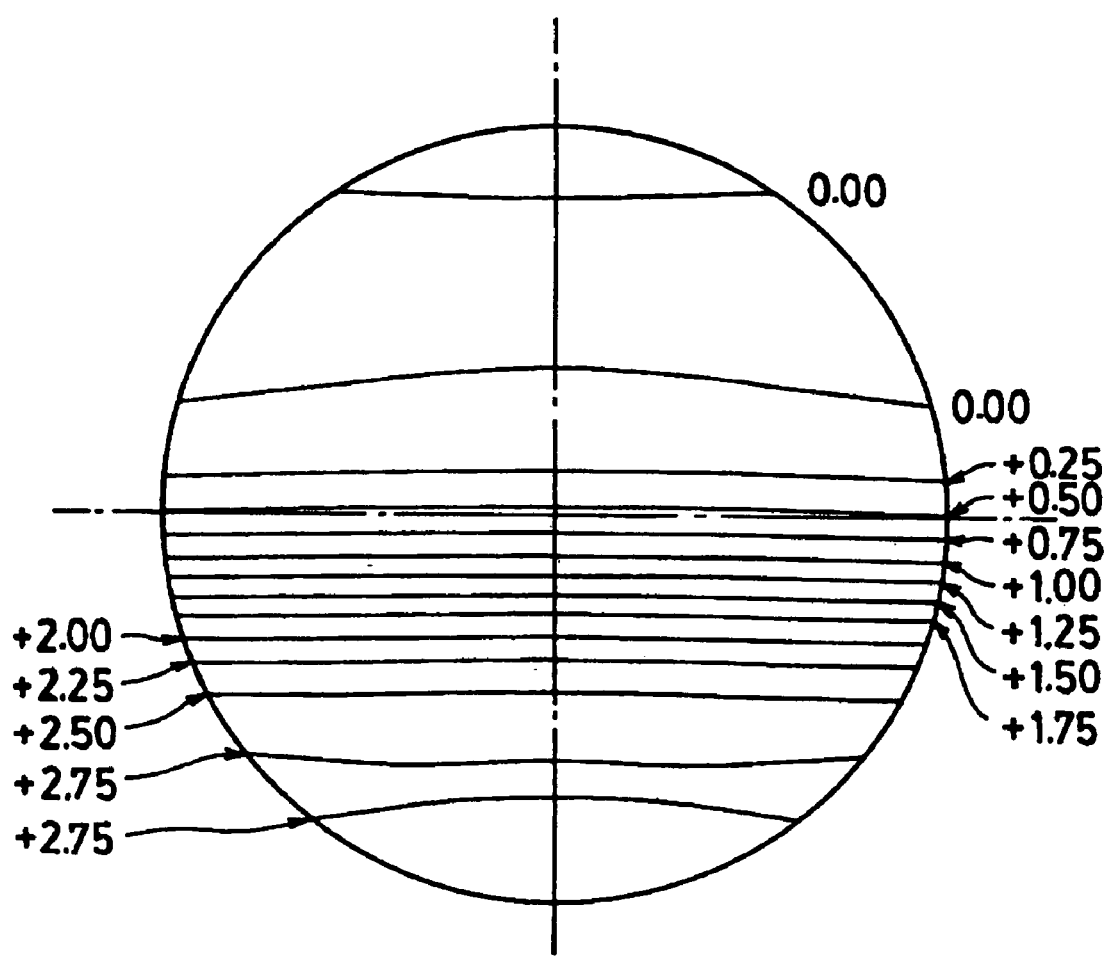
FIG. 44 is a view showing a diopter distribution in the vertical direction on the refractive surface on the convex surface side of the lens according to Example 1.
Figure 45:
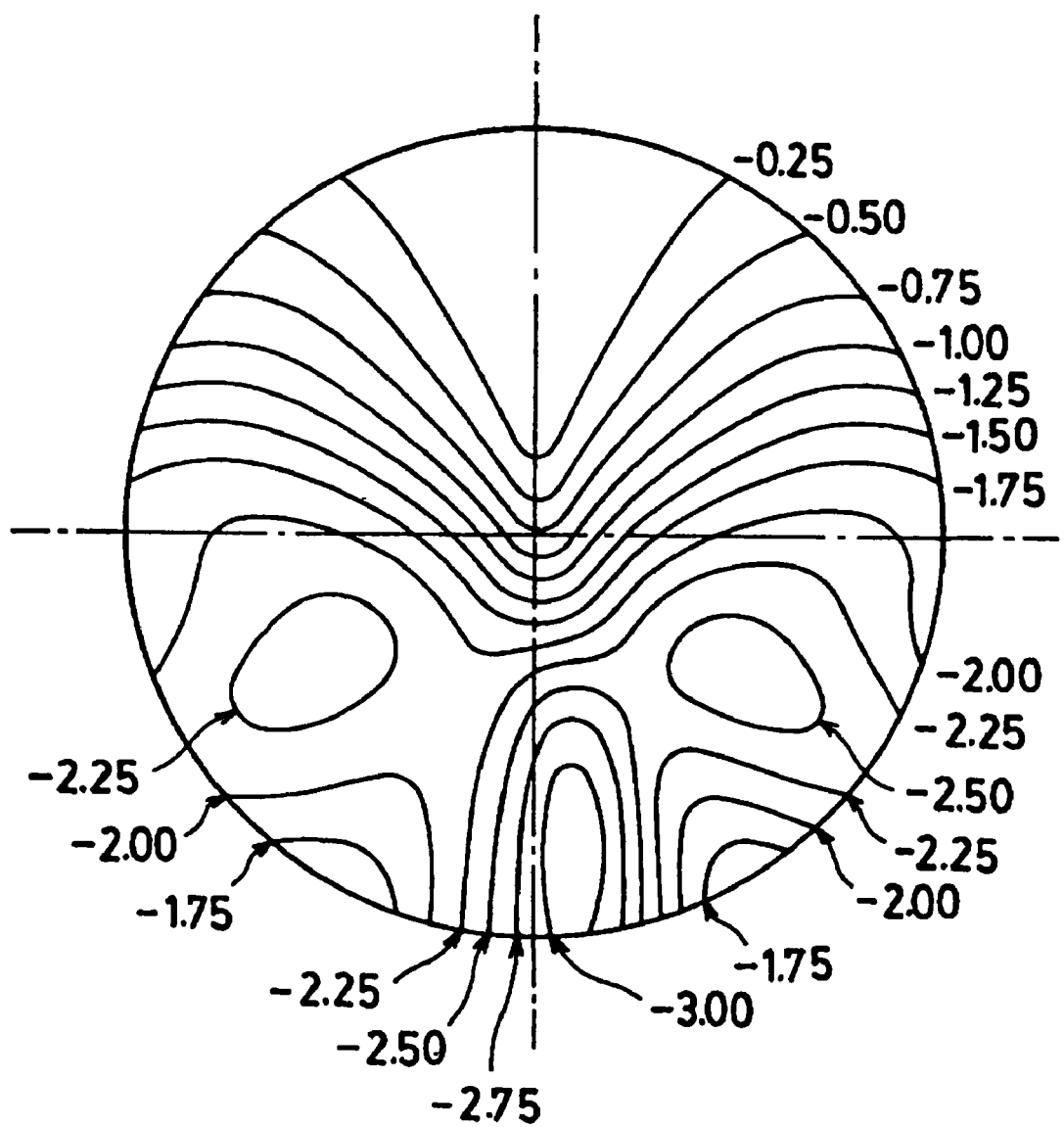
FIG. 45 is a view showing an astigmatism distribution on a refractive surface on the concave surface side of the lens according to Example 1.
Figure 46:
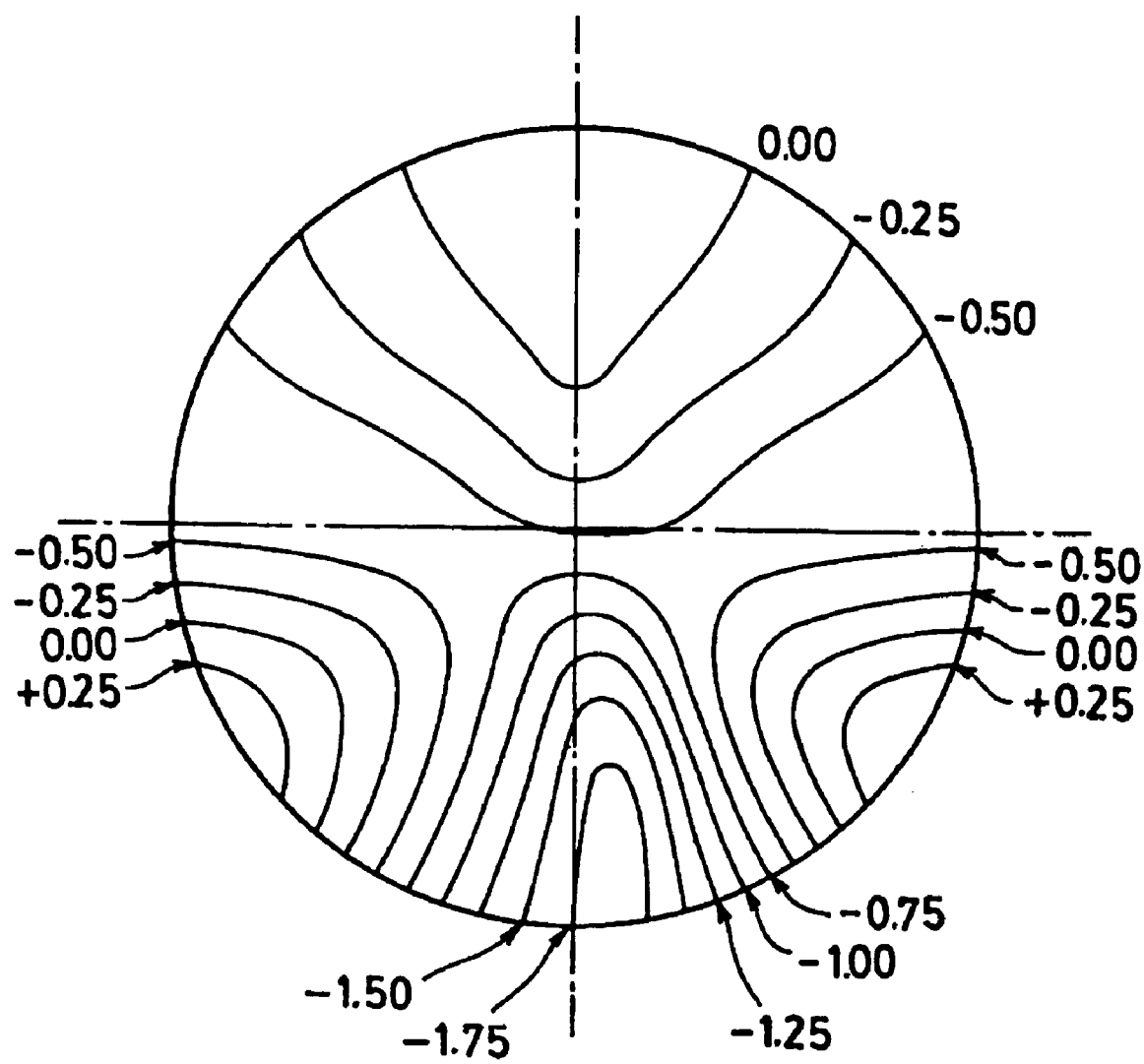
FIG. 46 is a view showing an average diopter distribution on the refractive surface on the concave surface side of the lens according to Example 1.
Figure 47:
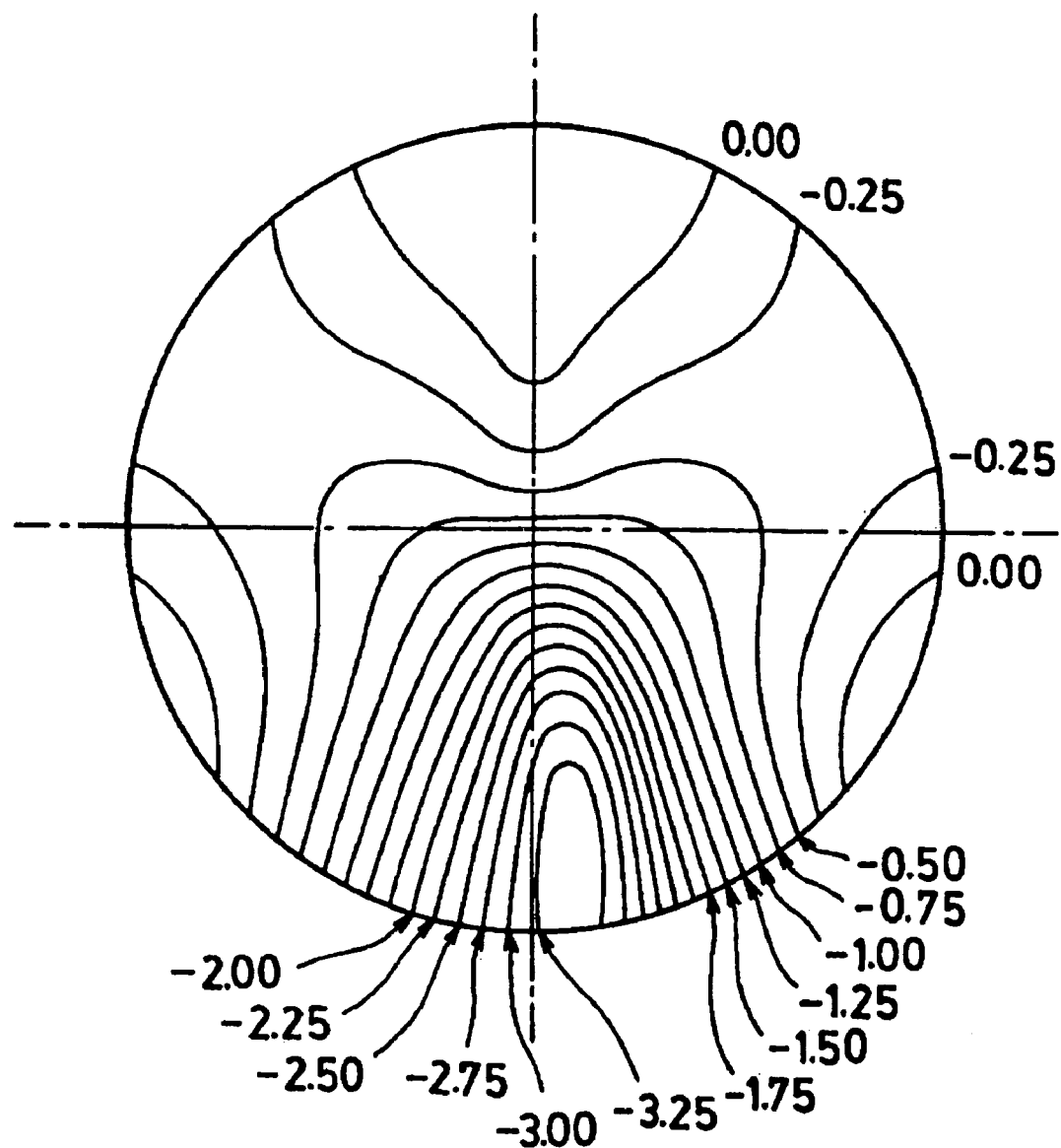
FIG. 47 is a view showing a diopter distribution in the horizontal direction on a refractive surface on the concave surface side of the lens according to Example 1.
Figure 48:
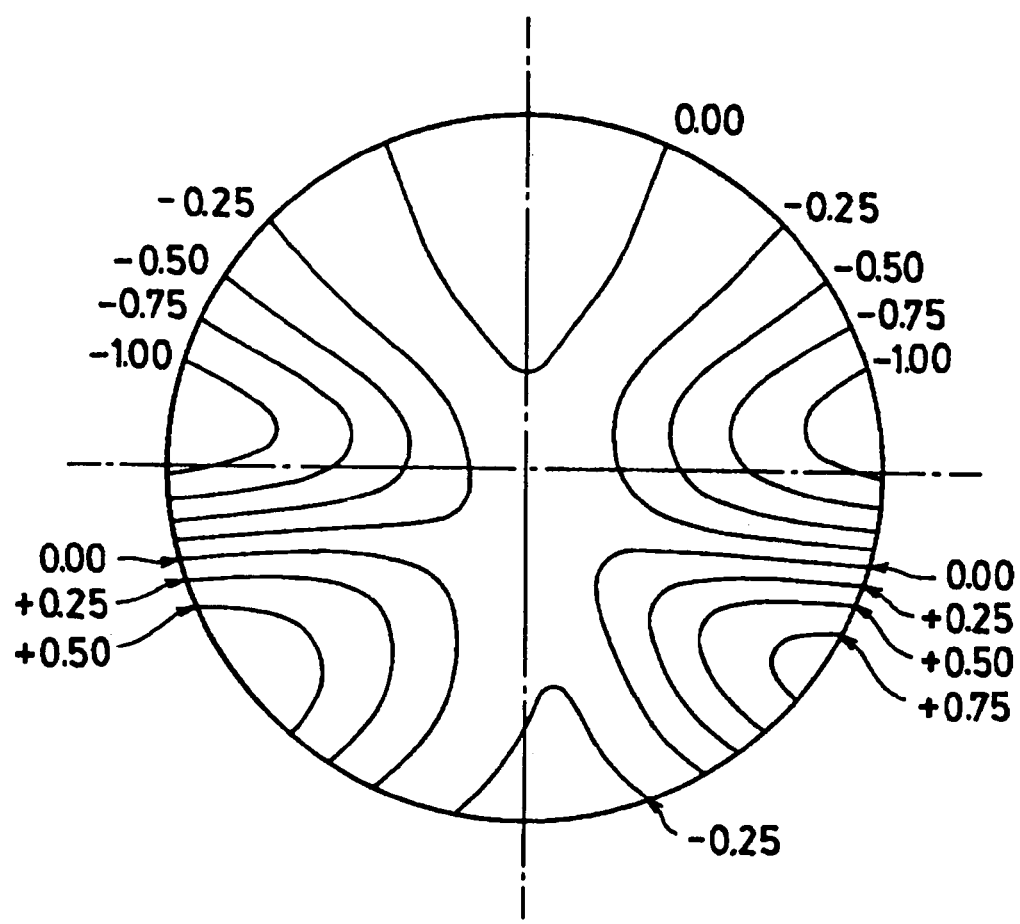
FIG. 48 is a view showing a diopter distribution in the vertical direction on the refractive surface on the concave surface side of the lens according to Example 1.
Figure 49:
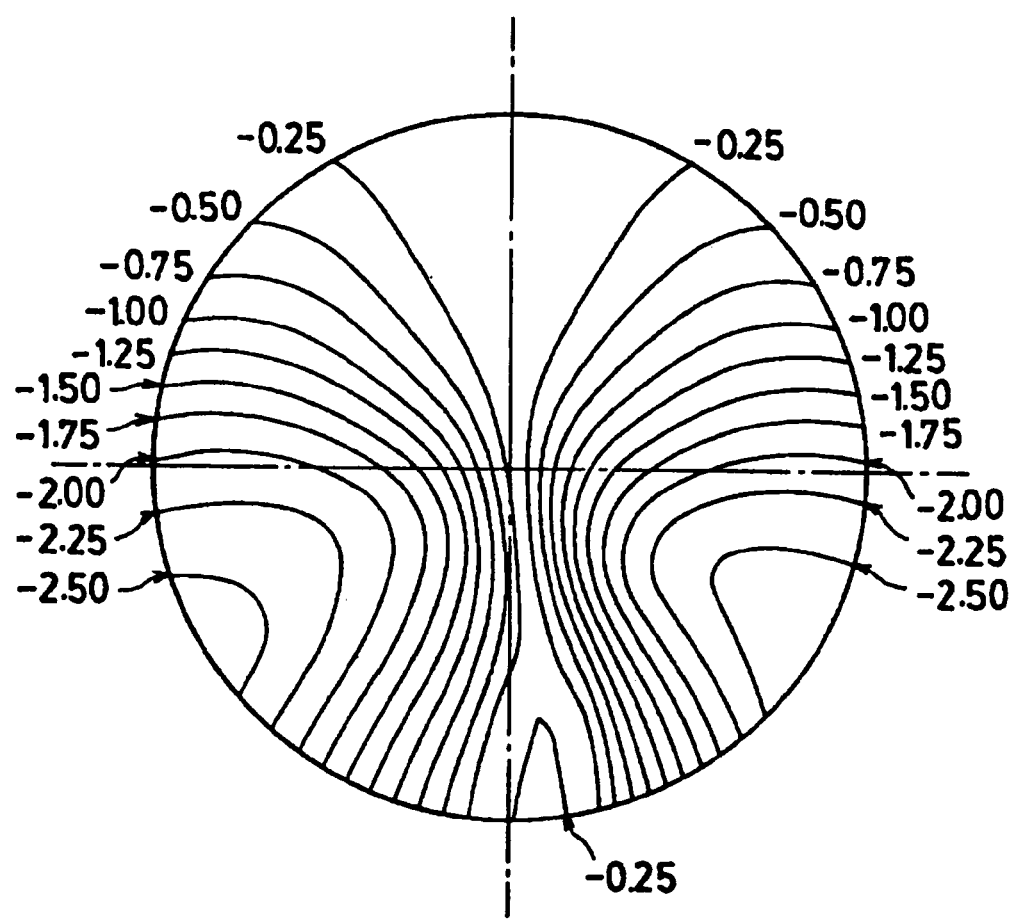
FIG. 49 is a view showing an astigmatism distribution on a refractive surface on the convex surface side of a lens according to prior arts.
Figure 50:
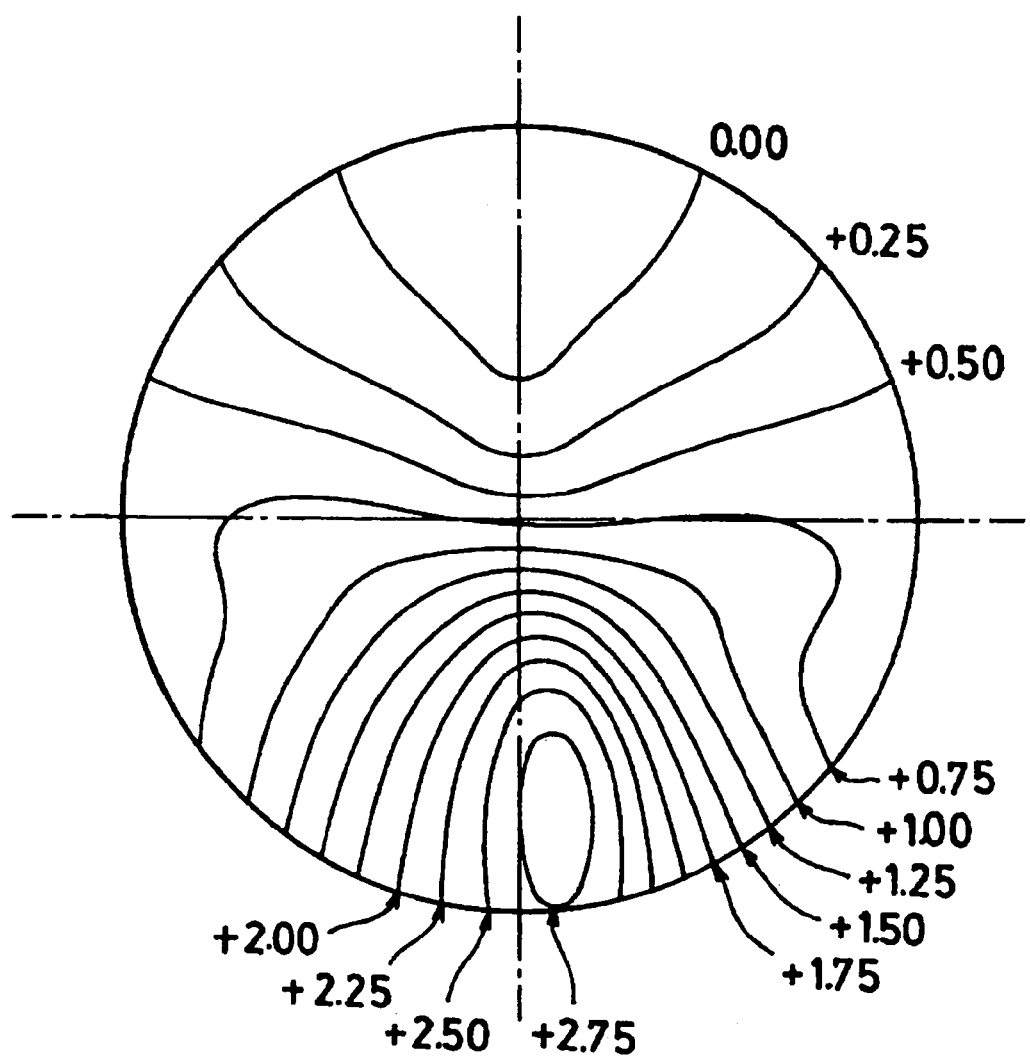
FIG. 50 is a view showing an average diopter distribution on the refractive surface on the convex surface side of the lens according to prior arts.
Figure 51:
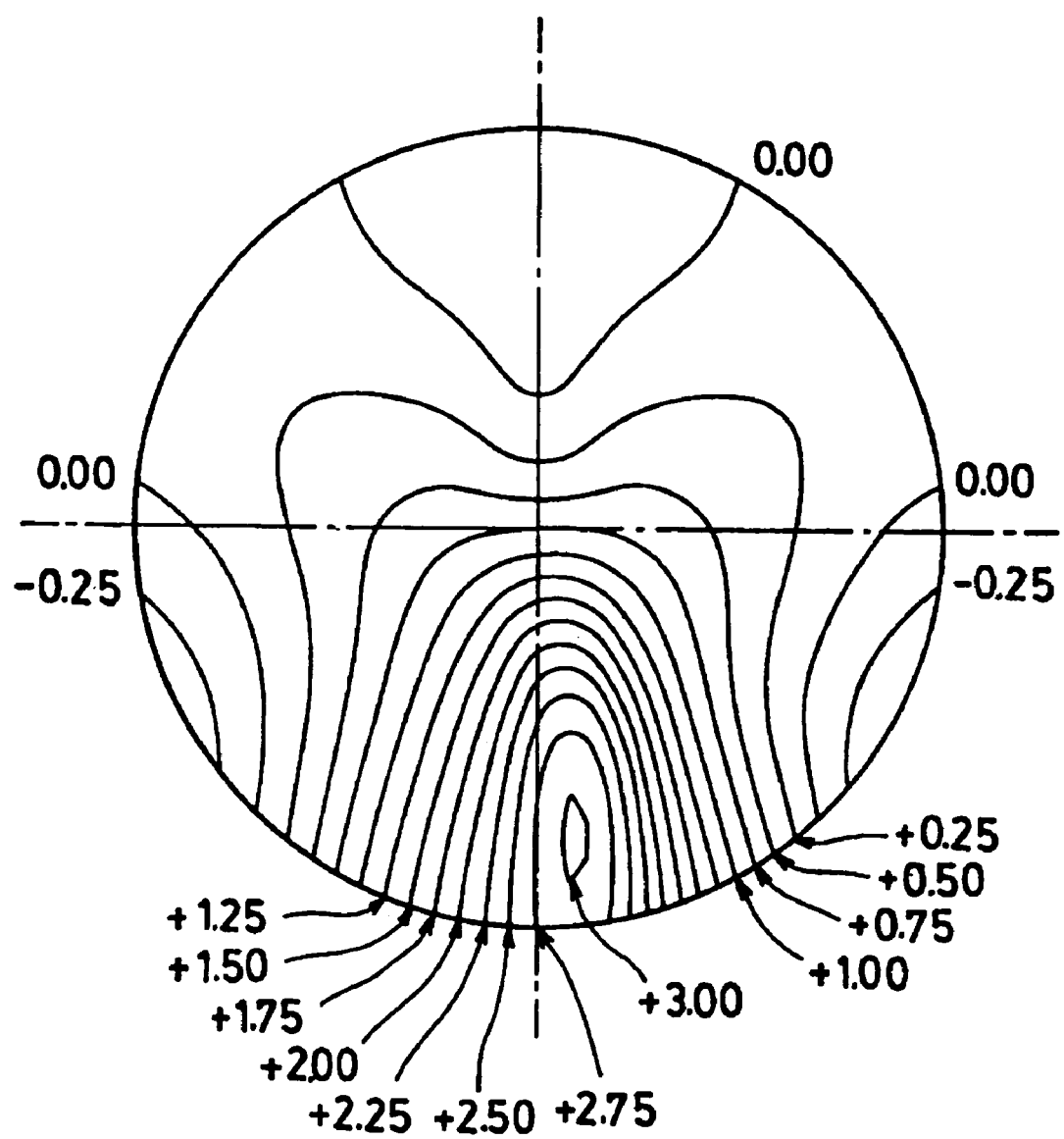
FIG. 51 is a view showing a diopter distribution in the horizontal direction on the refractive surface on the convex surface side of the lens according to prior arts.
Figure 52:
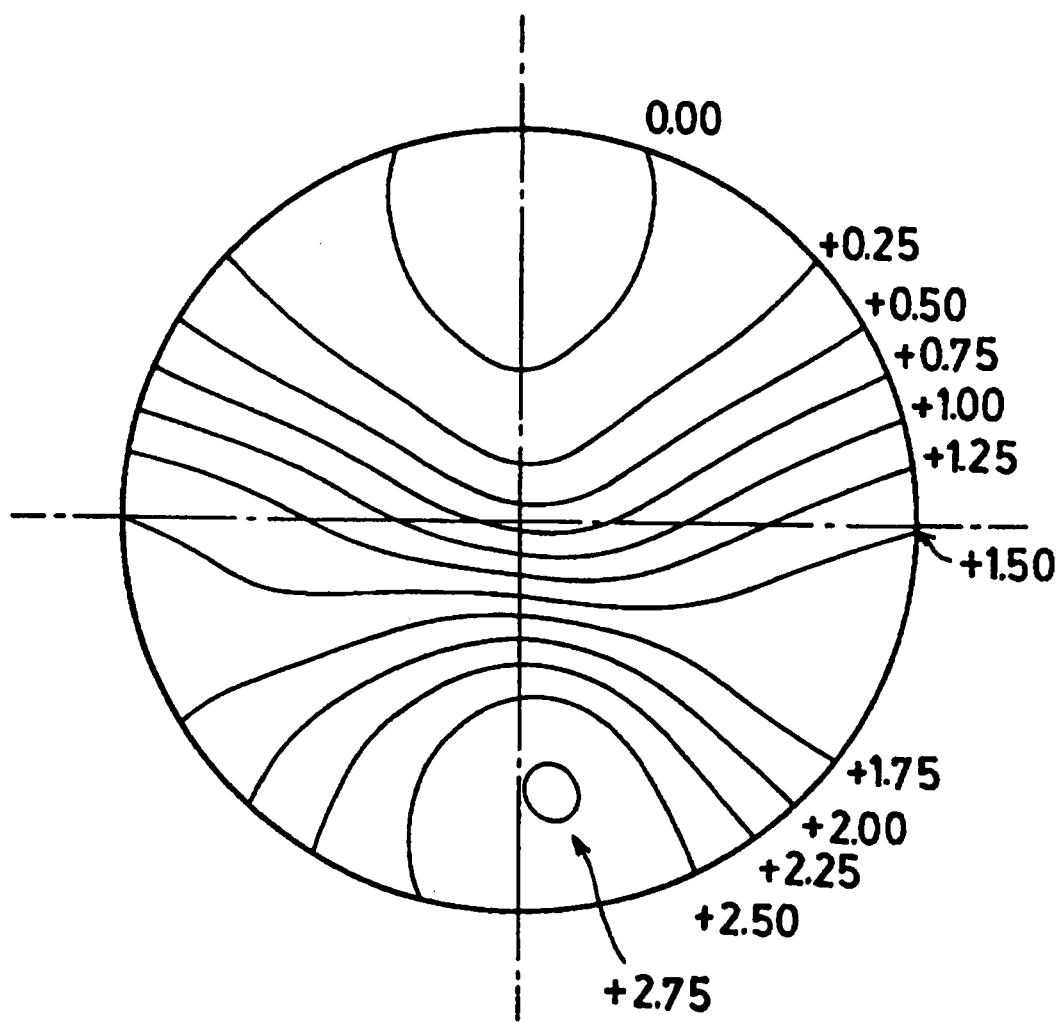
FIG. 52 is a view showing a diopter distribution in the vertical direction on the refractive surface on the convex surface side of the lens according to prior arts.
Figure 53:
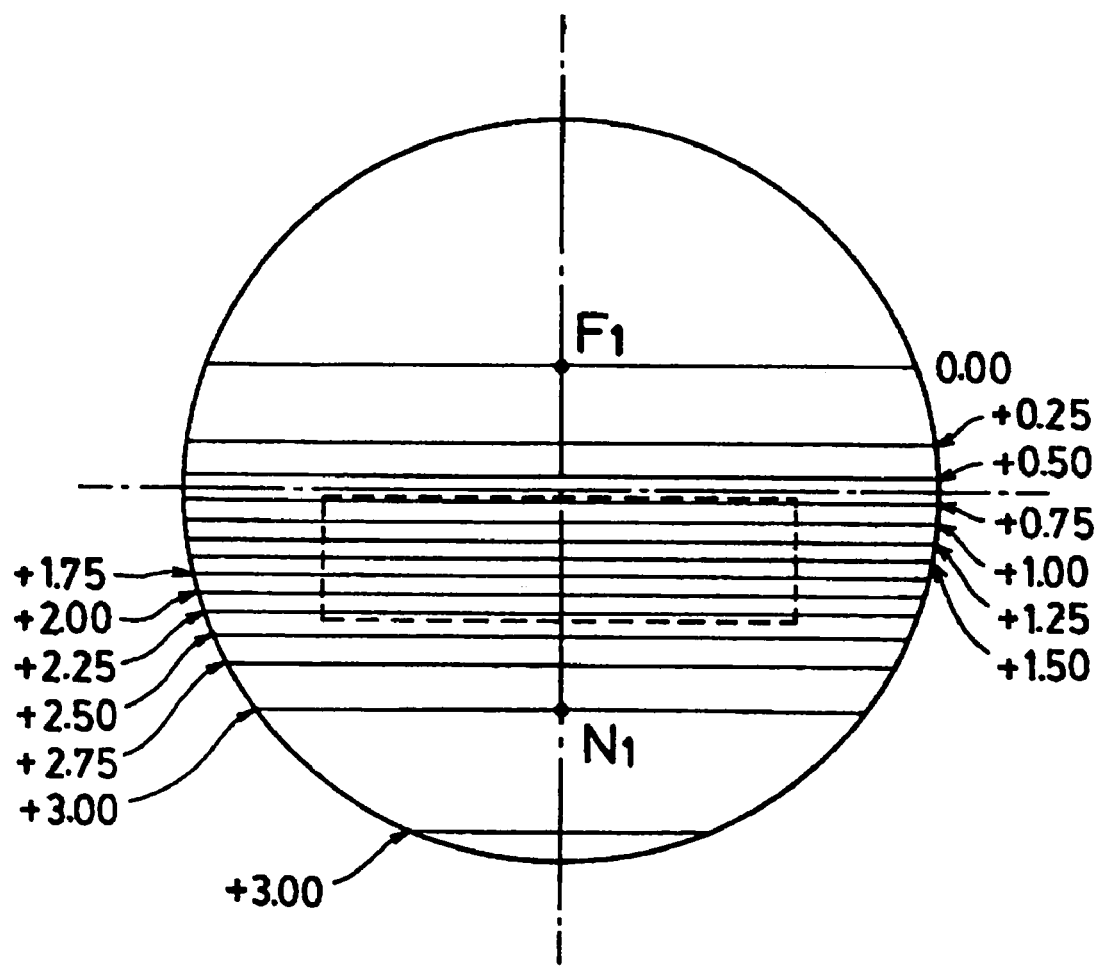
FIG. 53 is a view showing a diopter distribution in the vertical direction on the object side surface of lenses according to Modification Example 1 of an embodiment.
Figure 54:
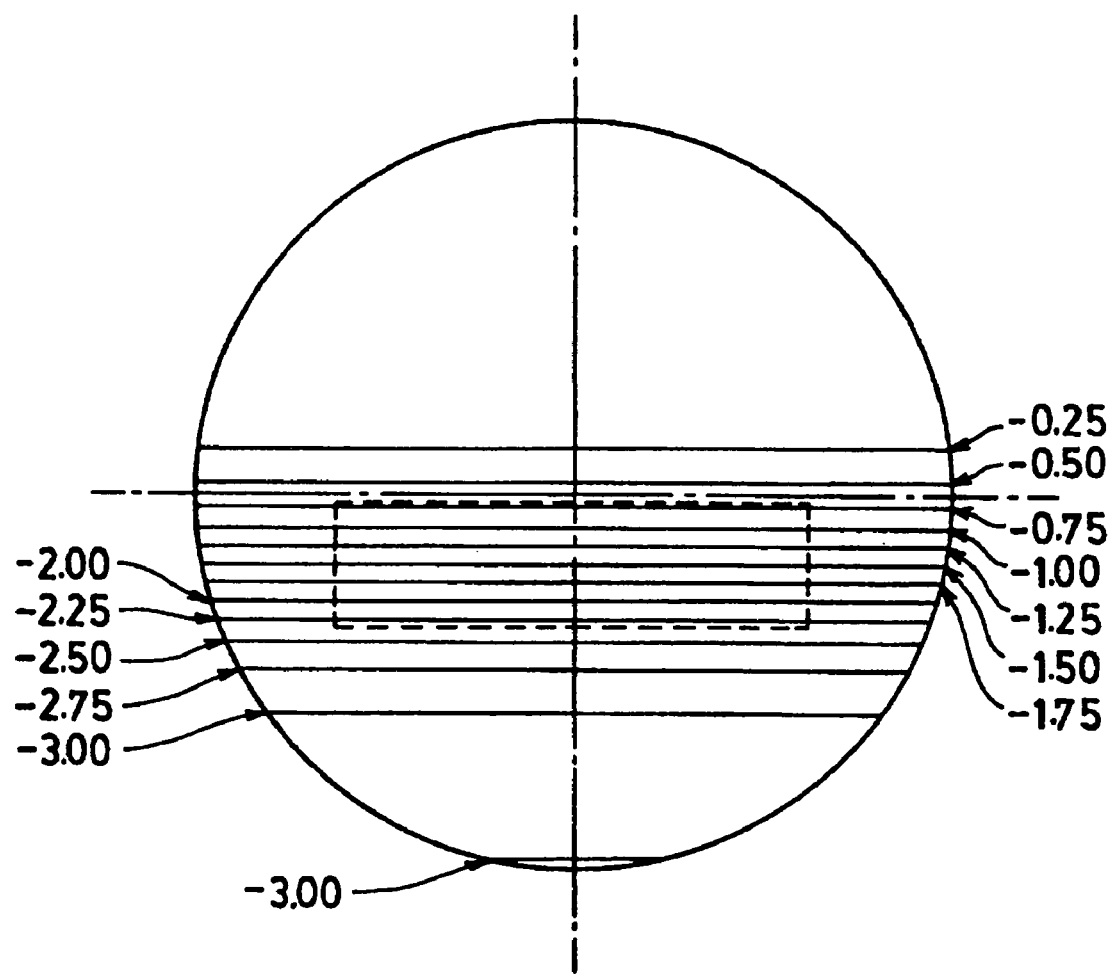
FIG. 54 is a view showing a surface astigmatism distribution on the object side surface of the lenses according to Modification Example 1 of the embodiment.
Figure 55:
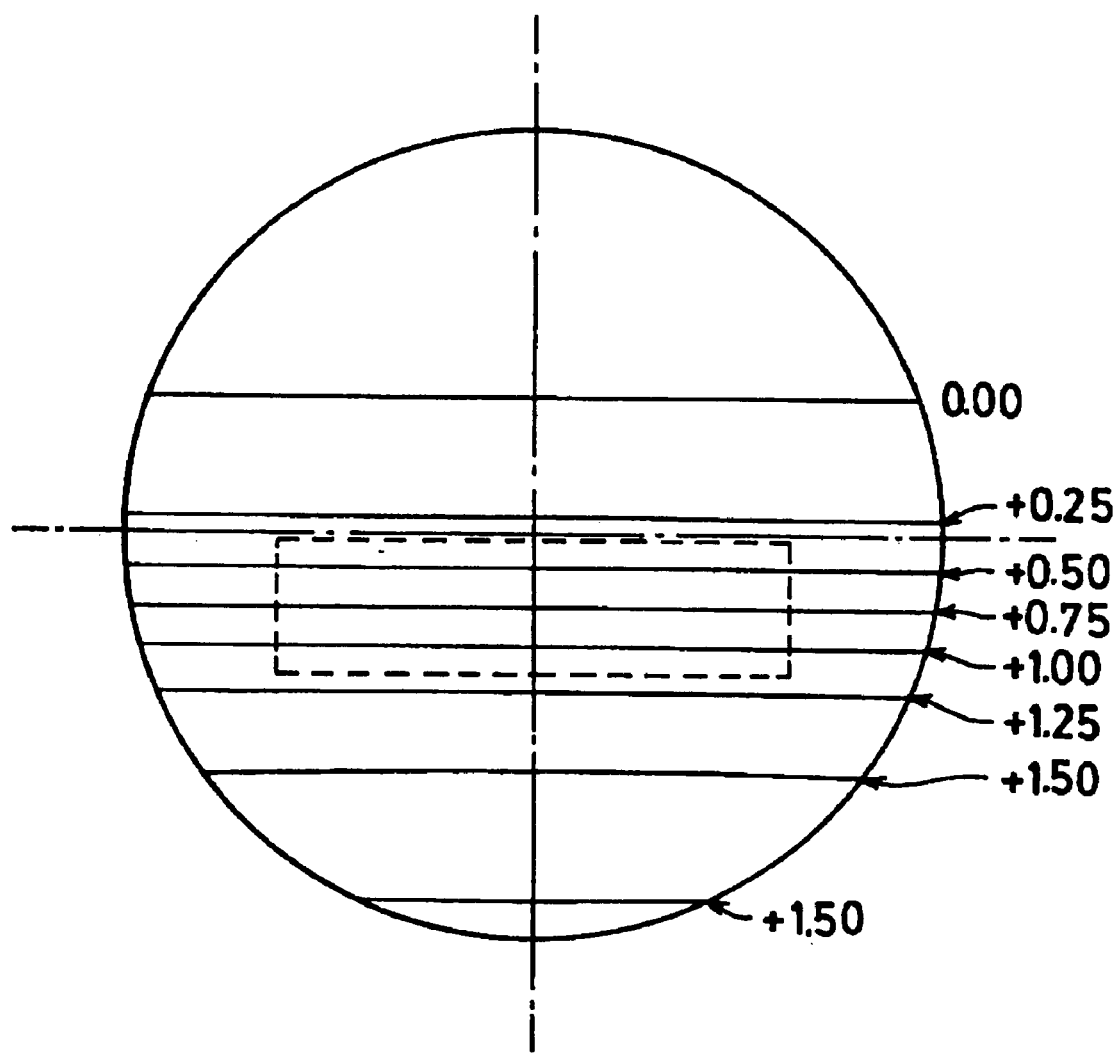
FIG. 55 is a view showing a surface average diopter distribution on the object side surface of the lenses according to Modification Example 1 of the embodiment.
Figure 56:
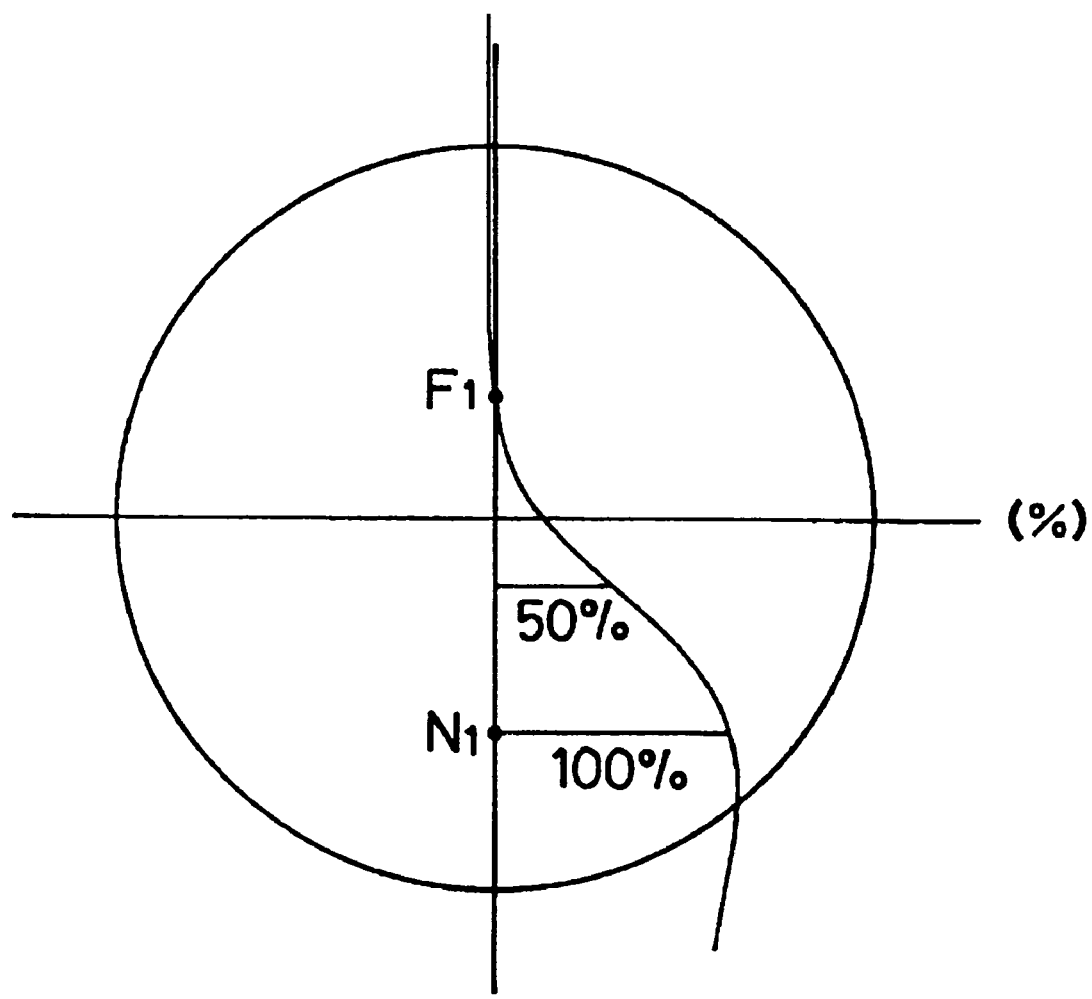
FIG. 56 is a view showing a diopter change in the vertical direction on the object side surface of the lenses according to Modification Example 1 of the embodiment.
Figure 57:
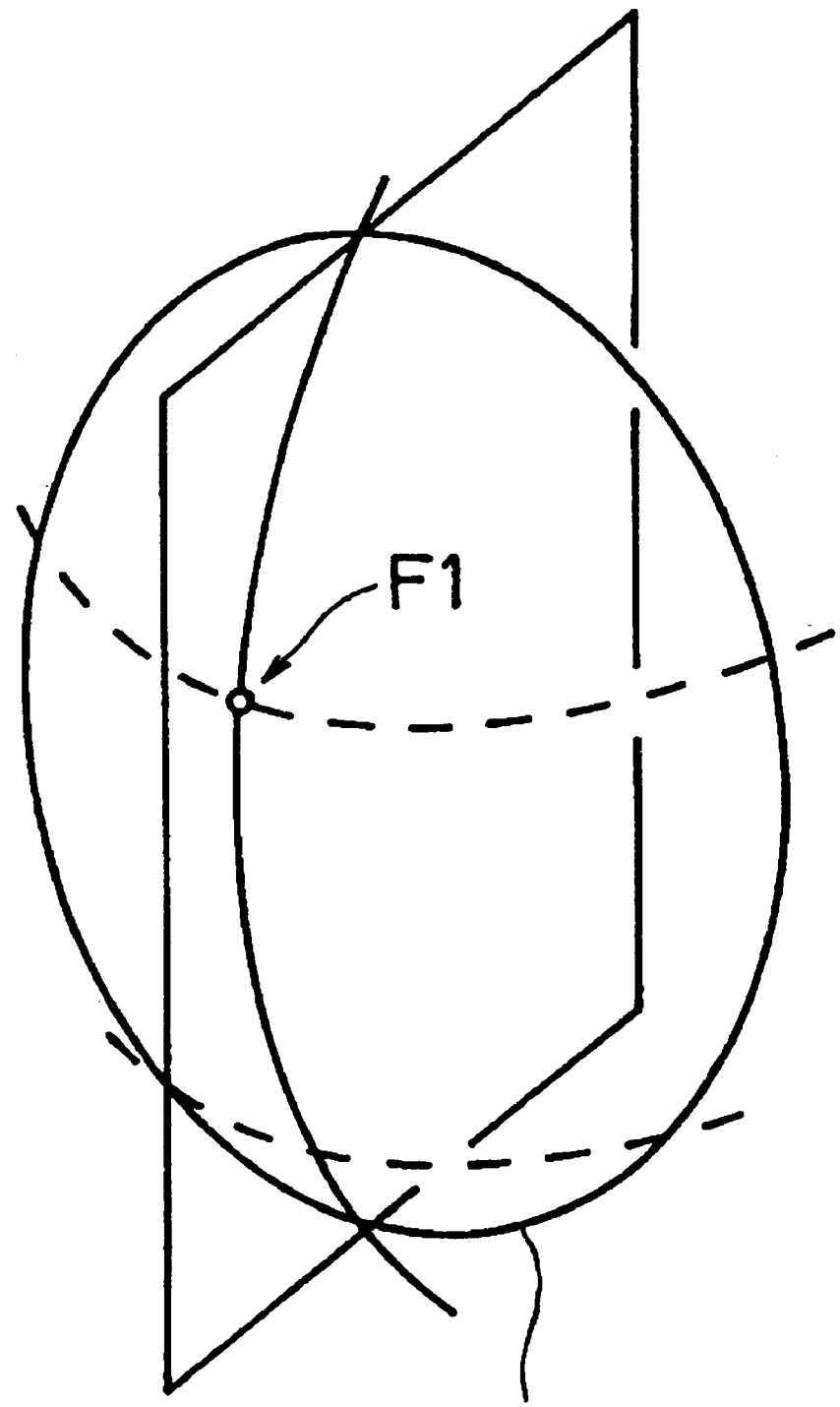
FIG. 57 is a view showing an example of a general sweep surface of a lens according to Modification Example 2 of the embodiment.
Figure 58:
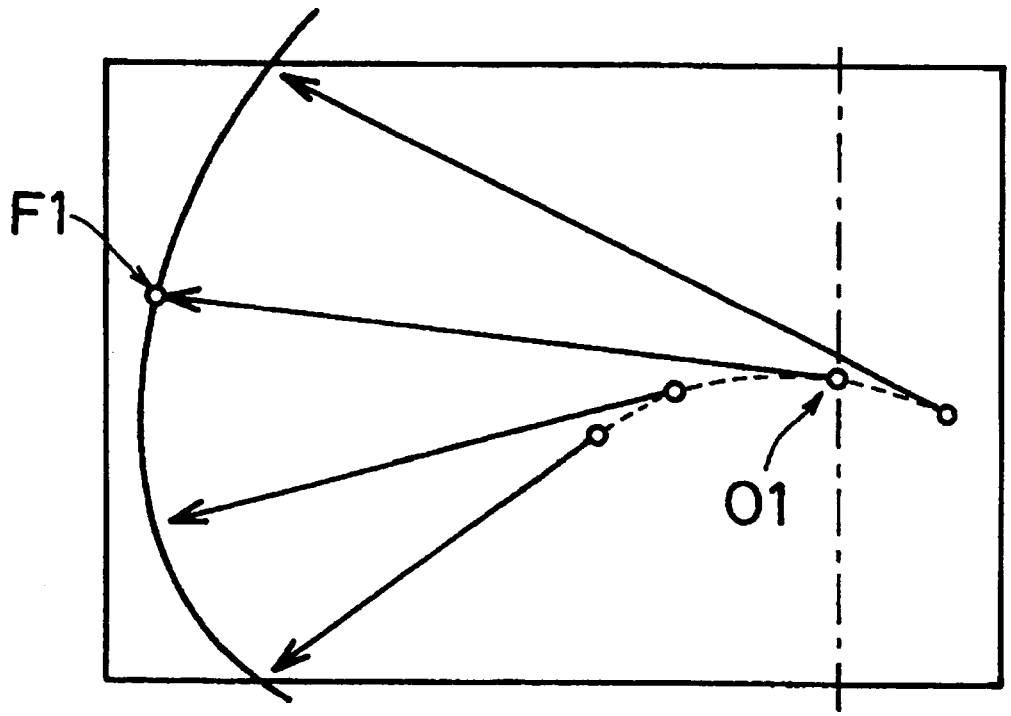
FIG. 58 is a view of a meridian shown by a solid line in FIG. 57 when viewed from the side of the lens.
Figure 59:
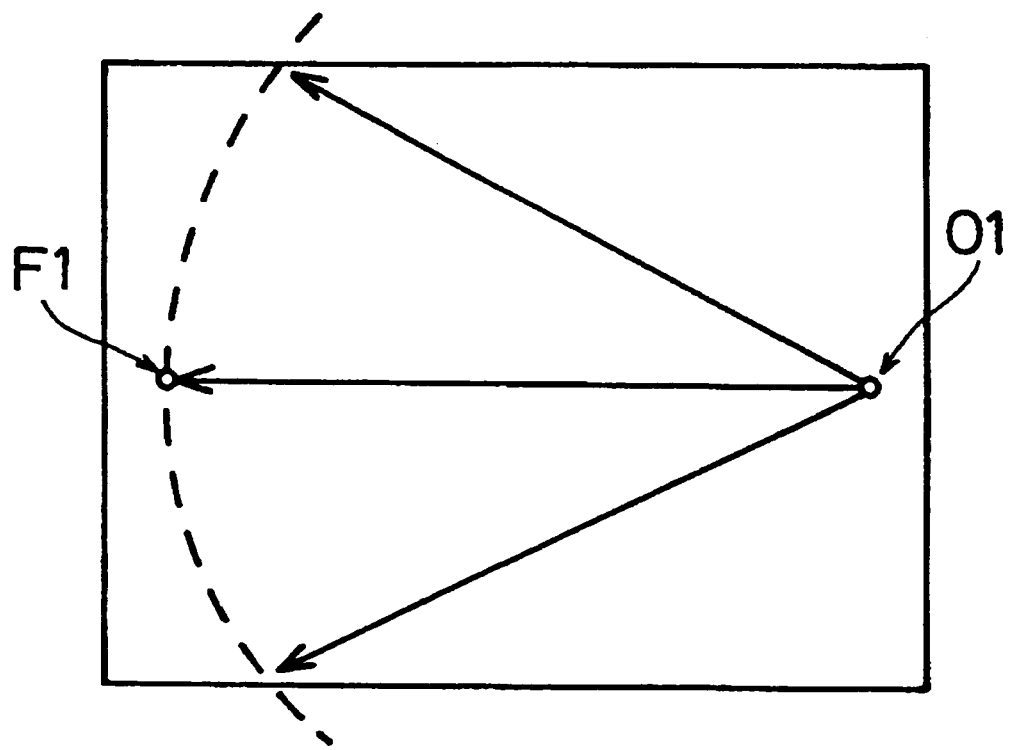
FIG. 59 is a view of a sweep line shown by a dotted line in FIG. 57 when viewed from the upper side of the lens.
Figure 60:
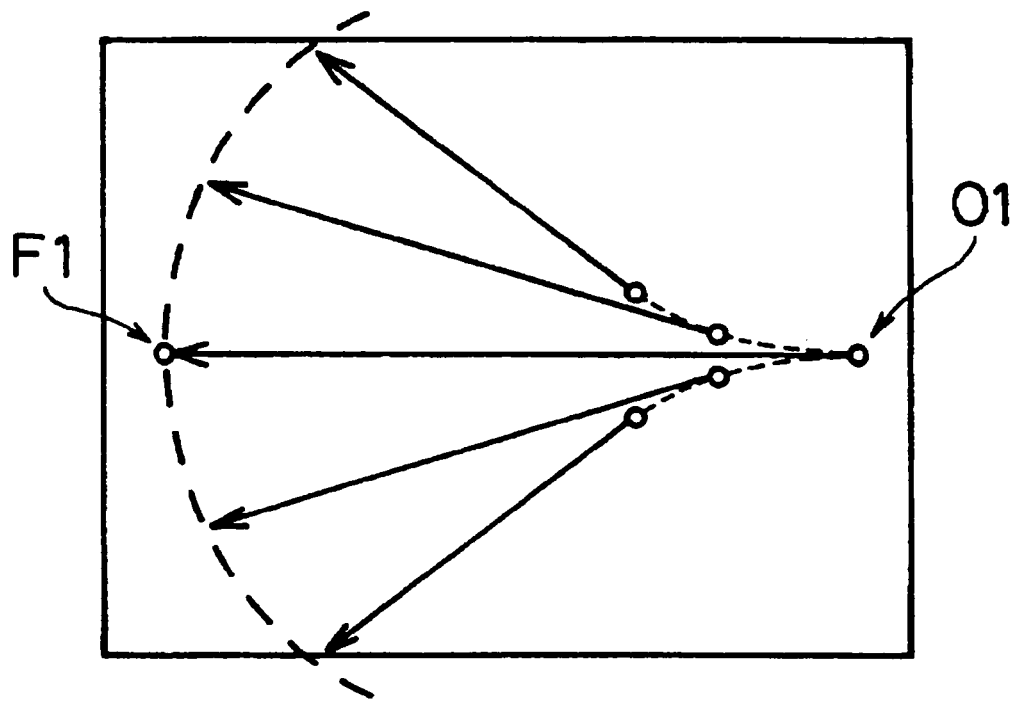
FIG. 60 is a first modification example of the sweep line shown in FIG. 59 when viewed from the upper side of the lens.
Figure 61:
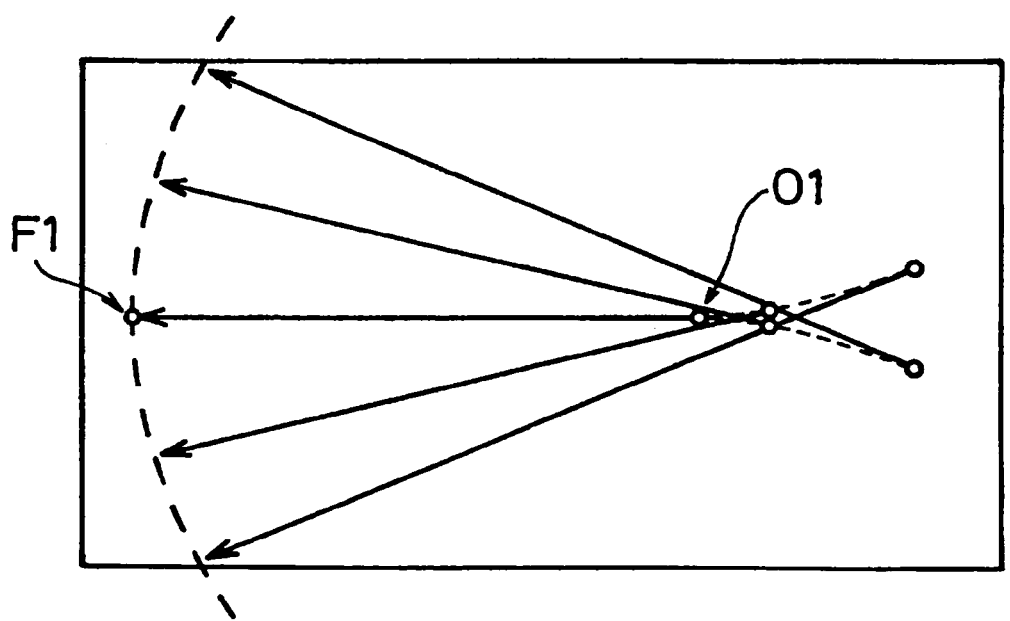
FIG. 61 is a second modification example of the sweep line shown in FIG. 59 when viewed from the upper side of the lens.
Figure 62:
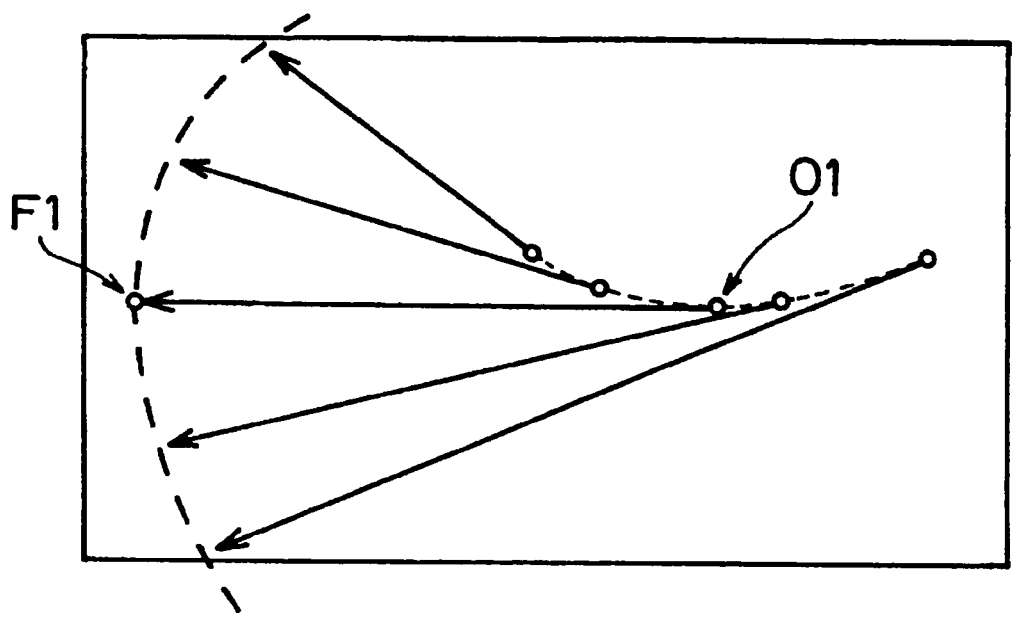
FIG. 62 is a third modification example of the sweep line shown in FIG. 59 when viewed from the upper side of the lens.
Figure 63:
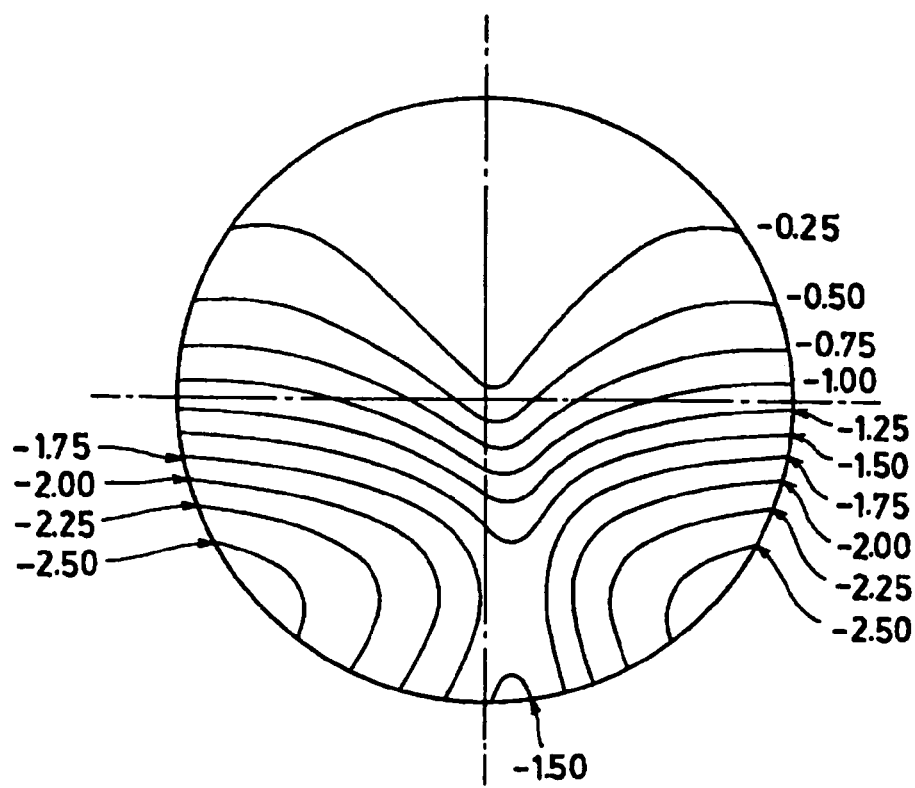
FIG. 63 is a view showing a surface astigmatism distribution on the object side surface of a lens according to Modification Example 3 of the embodiment.
Figure 64:
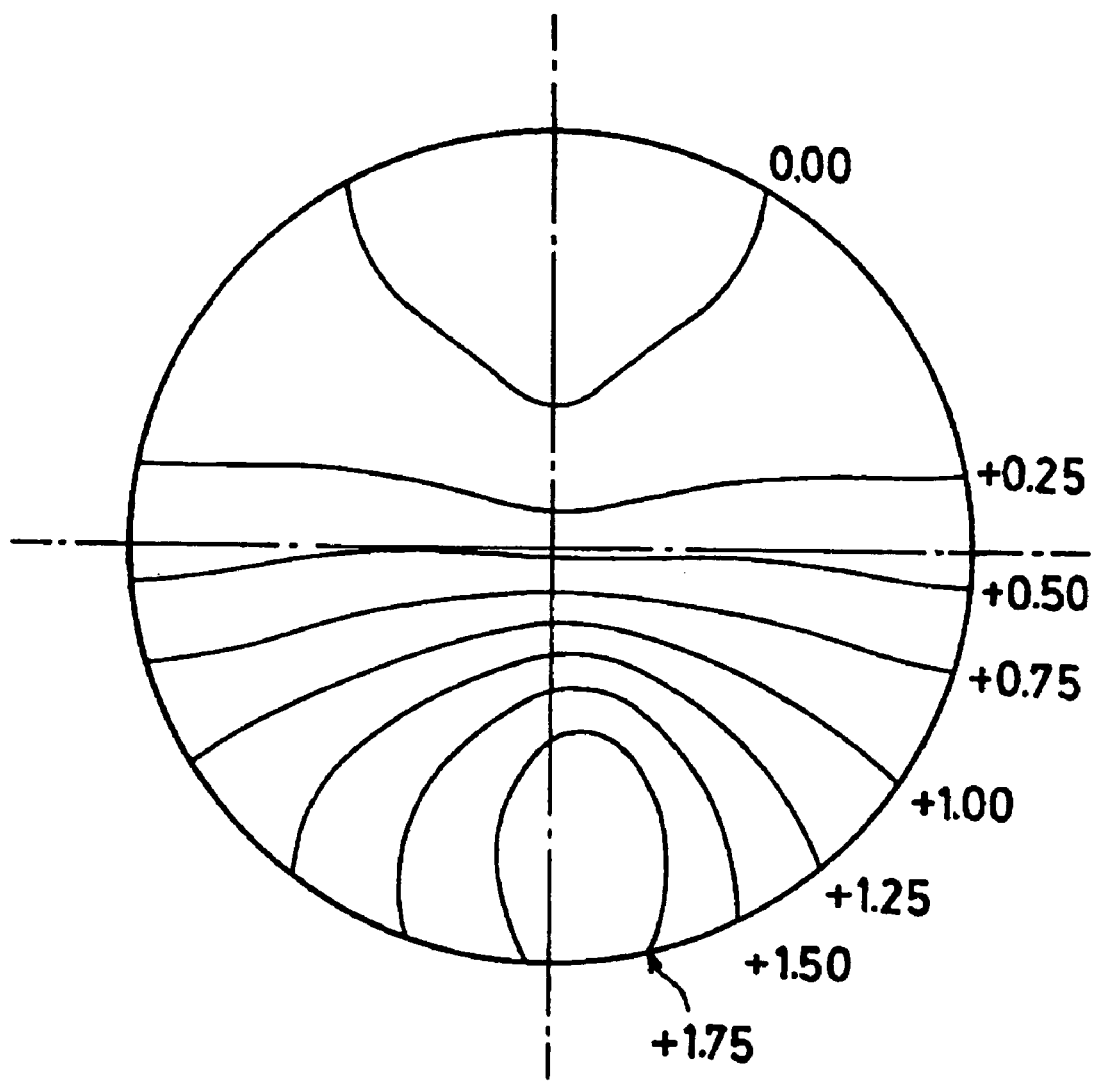
FIG. 64 is a view showing a surface average diopter distribution on the object side surface of the lens according to Modification Example 3 of the embodiment.
Figure 65:
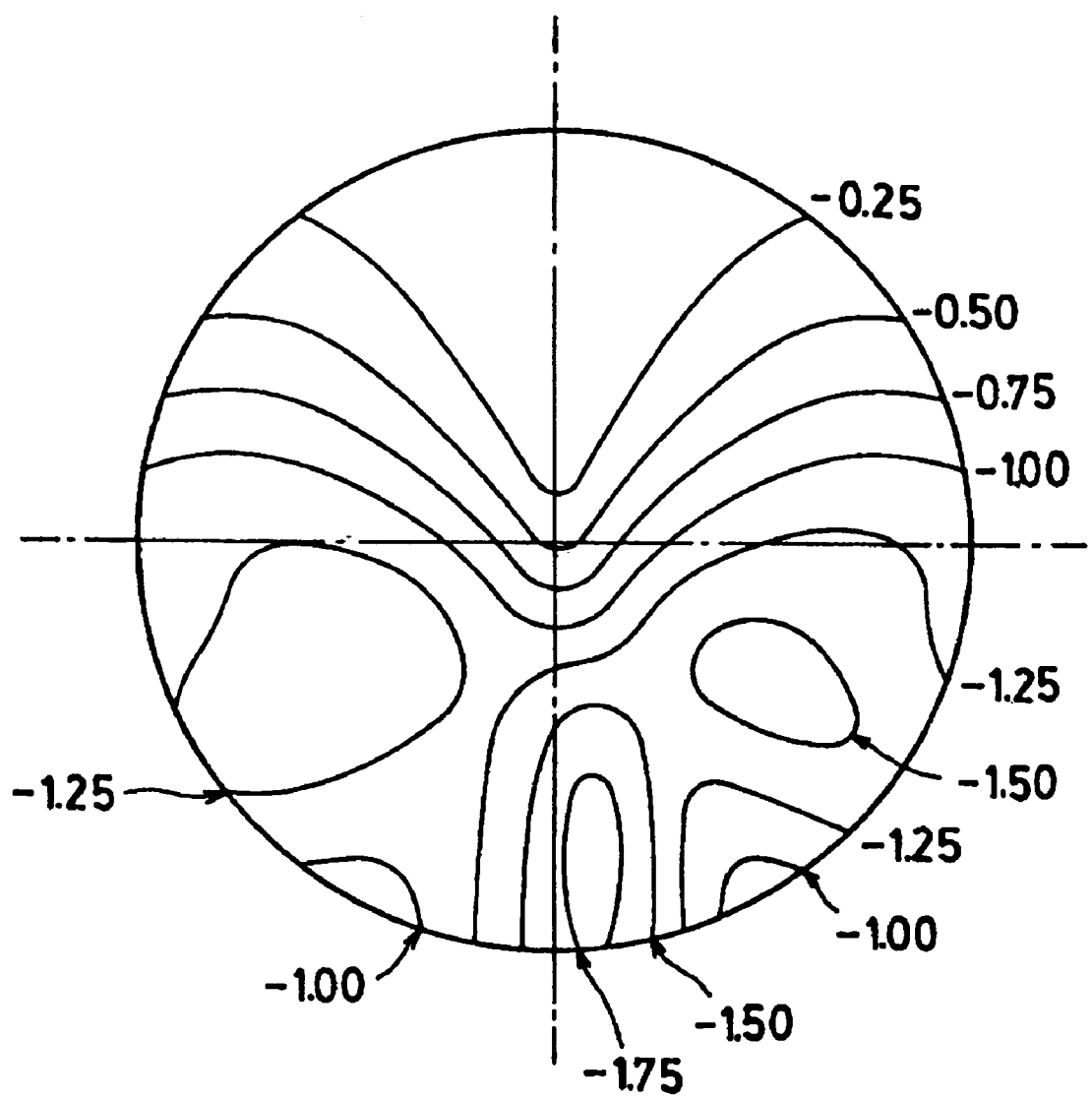
FIG. 65 is a view showing a surface astigmatism distribution on the eyeball side surface of the lens according to Modification Example 3 of the embodiment.
Figure 66:
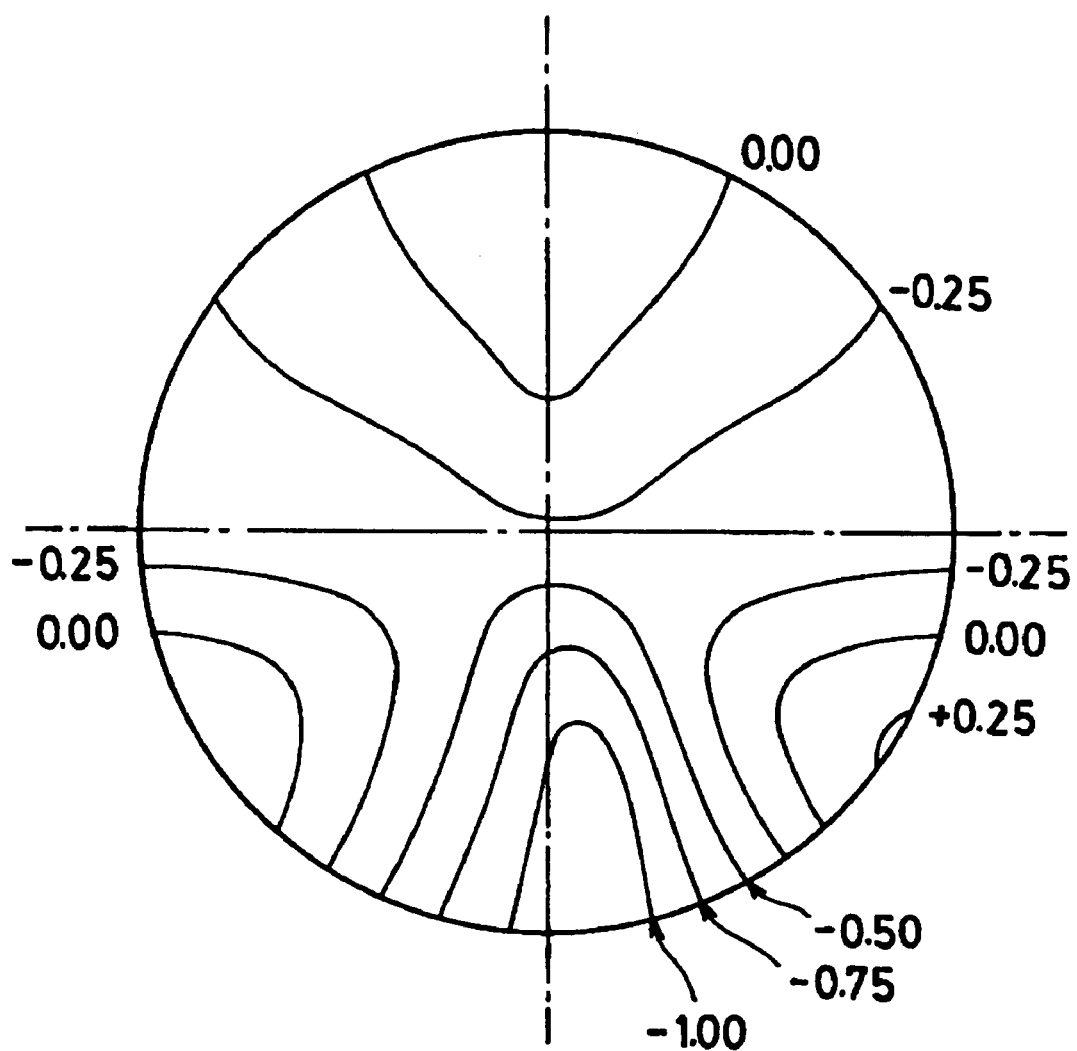
FIG. 66 is a view showing a surface average diopter distribution on the eyeball side surface of the lens according to Modification Example 3 of the embodiment.

The invention claimed is:

1. a bi-aspherical type progressive-power lens with a progressive refractive power action dividedly allotted to a first refractive surface being an object side surface and a second refractive surface being an eyeball side surface, wherein when on the first refractive surface, a surface refractive power in a horizontal direction and a surface refractive power in a vertical direction, at a farsightedness diopter measurement position F1, are DHf and DVf respectively, and on the first refractive surface, a surface refractive power in a horizontal direction and a surface refractive power in a vertical direction, at a nearsightedness diopter measurement position N1, are DHn and DVn respectively, relation of DHn and DVn are expressed by $DHf+DHn<DVf+DVn$, and $DHn<DVn$, surface astigmatism components at F1 and N1 of the first refractive surface are offset by the second refractive surface, and a combination of the first and second refractive surfaces gives a farsightedness diopter (Df) and an addition diopter (ADD) based on prescription values, and a distribution of astigmatism on the first refractive surface is bilaterally symmetrical with respect to one meridian passing through the farsightedness diopter measurement position F1, a distribution of astigmatism on the second refractive surface is bilaterally asymmetrical with respect to one meridian passing through a farsightedness diopter measurement position F2 of the second refractive surface, and a position of a nearsightedness diopter measurement position N2 on the second refractive surface is shifted inward to a nose by a predetermined distance.

2. The bi-aspherical type progressive-power lens according to claim 1, wherein a distribution of transmission astigmatism in a near portion of the bi-aspherical type progressive-power lens is arranged such that a nose side is dense and a temple side is sparse.

3. A method of designing a bi-aspherical type progressive-power lens with a progressive refractive power action dividedly allotted to a first refractive surface being an object side surface and a second refractive surface being an eyeball side surface, wherein when on the first refractive surface, a surface refractive power in a horizontal direction and a surface refractive power in a vertical direction, at a farsightedness diopter measurement position F1, are DHf and DVf respectively, and on the first refractive surface, a surface refractive power in a horizontal direction and a surface refractive power in a vertical direction, at a nearsightedness diopter measurement position N1, are DHn and DVn respectively, the relation of DHn and DVn is expressed by $DHf+DHn<DVf+DVn$, and $DHn<DVn$, surface astigmatism components at F 1 and Ni of the first refractive surface are offset by the second refractive surface, and a combination of the first and second refractive surfaces gives a farsightedness diopter (Df) and an addition diopter (ADD) based on prescription values, and a distribution of astigmatism on the first refractive surface is bilaterally symmetrical with respect to one meridian passing through the farsightedness diopter measurement position F1, a distribution of astigmatism on the second refractive surface is bilaterally asymmetrical with respect to one meridian passing through a farsightedness diopter measurement position F2 of the second refractive surface, and a position of a nearsightedness diopter measurement position N2 on the second refractive surface is shifted inward to a nose by a predetermined distance.

4. The method of designing a bi-aspherical type progressive-power lens according to claim 3, wherein a distribution of transmission astigmatism in a near portion of the bi-aspherical type progressive-power lens is arranged such that a nose side is dense and a temple side is sparse.

5. A bi-aspherical type progressive-power lens with a progressive refractive power action dividedly allotted to a first refractive surface being an object side surface and a second refractive surface being an eyeball side surface, when on the first refractive surface, a surface refractive power in a horizontal direction and a surface refractive power in a vertical direction, at a farsightedness diopter measurement position F1, are DHf and DVf respectively, and on the first refractive surface, a surface refractive power in a horizontal direction and a surface refractive power in a vertical direction, at a nearsightedness diopter measurement position N1, are DHn and DVn respectively, the relation of DHn and DVn is expressed by $DHf+DHn<DVf+DVn$, and $DHn<DVn$, surface astigmatism components at F1 and N1 of the first refractive surface are offset by the second refractive surface, and a combination of the first and second refractive surfaces gives a farsightedness diopter (Df) and an addition diopter (ADD) based on prescription values, and a distribution of average diopter on the first refractive surface is bilaterally symmetrical with respect to one meridian passing through the farsightedness diopter measurement position F1, a distribution of average diopter on the second refractive surface is bilaterally asymmetrical with respect to one meridian passing through a farsightedness diopter measurement position F2 of the second refractive surface, and a position of a nearsightedness diopter measurement position N2 on the second refractive surface is shifted inward to a nose by a predetermined distance.

6. The bi-aspherical type progressive-power lens according to claim 5, wherein a distribution of transmission astigmatism in a near portion of the bi-aspherical type progressive-power lens is arranged such that a nose side is dense and a temple side is sparse.

7. A method of designing a bi-aspherical type progressive-power lens with a progressive refractive power action dividedly allotted to a first refractive surface being an object side surface and a second refractive surface being an eyeball side surface, wherein when on the first refractive surface, a surface refractive power in a horizontal direction and a surface refractive power in a vertical direction, at a farsightedness diopter measurement position F1, are DHf and DVf respectively, and on the first refractive surface, a surface refractive power in a horizontal direction and a surface refractive power in a vertical direction, at a nearsightedness diopter measurement position N1, are DHn and DVn respectively, the relation of DHn and DVn is expressed by $DHf+DHn<DVf+DVn$, and $DHn<DVn$, surface astigmatism components at F1 and N1 of the first refractive surface are offset by the second refractive surface, and a combination of the first and second refractive surfaces gives a farsightedness diopter (DO and an addition diopter (ADD) based on prescription values, and a distribution of average diopter on the first refractive surface is bilaterally symmetrical with respect to one meridian passing through the farsightedness diopter measurement position F1, a distribution of average diopter on the second refractive surface is bilaterally asymmetrical with respect to one meridian passing through a farsightedness diopter measurement position F2 of the second refractive surface, and a position of a nearsightedness diopter measurement position N2 on the second refractive surface is shifted inward to a nose by a predetermined distance.

8. The method of designing a bi-aspherical type progressive-power lens according to claim 7, wherein
a distribution of transmission astigmatism in a near portion of the bi-aspherical type progressive-power lens is arranged such that a nose side is dense and a temple side is sparse.

9. A bi-aspherical type progressive-power lens with a progressive refractive power action dividedly allotted to a first refractive surface being an object side surface and a second refractive surface being an eyeball side surface,
wherein when on the first refractive surface, a surface refractive power in a horizontal direction and a surface refractive power in a vertical direction, at a nearsightedness diopter measurement position N1, are DHn and DVn respectively, the relation of DHn and DVn is expressed by, $DVn-DHn>ADD/2$, a surface astigmatism component at N1 of the first refractive surface is offset by the second refractive surface, and a combination of the first and second refractive surfaces gives a nearsightedness diopter (Dn) and an addition diopter (ADD) based on prescription values.

10. The bi-aspherical type progressive-power lens according to claim 9
wherein when on the first refractive surface, a surface refractive power in a horizontal direction and a surface refractive power in a vertical direction, at a farsightedness diopter measurement position F1, are DHf and DVf respectively, the relation of DHf and DVf is expressed by $DHf+DHn<DVf+DVn$, and $DVn-DVf>ADD/2$, and $DHn-DHf>ADD/2$, surface astigmatism components at F1 and N1 of the first refractive surface are offset by the second refractive surface, and a combination of the first and second refractive surfaces gives a farsightedness diopter (Df) and an addition diopter (ADD) based on prescription values.

11. The bi-aspherical type progressive-power lens according to claim 9 or claim 10, wherein
said first refractive surface is bilaterally symmetrical with respect to one meridian passing through the farsightedness diopter measurement position F1, said second refractive surface is bilaterally asymmetrical with respect to one meridian passing through a farsightedness diopter measurement position F2 of said second refractive surface, and a position of a nearsightedness diopter measurement position N2 on said second refractive surface is shifted inward to a nose by a predetermined distance.

12. The bi-aspherical type progressive-power lens according to any one of claim 9 to claim 11, wherein
said first refractive surface is a rotation surface with one meridian passing through the farsightedness diopter measurement position F1 as a generating line, the second refractive surface is bilaterally asymmetrical with respect to one meridian passing through a farsightedness diopter measurement position F2 on the second refractive surface, and an arrangement of a nearsightedness diopter measurement position N2 on the second refractive surface is shifted inward to a nose by a predetermined distance.

13. The bi-aspherical type progressive-power lens according to any one of claim 9 to claim 11, wherein
on the first refractive surface, a sectional curve in the horizontal direction passing through the farsightedness diopter measurement position F1 is not a perfect circle but has a predetermined refractive power change, and a sectional curve of a cross section in the vertical direction including a normal line at an arbitrary position on the sectional curve in the horizontal direction is substantially the same as a meridian passing through the farsightedness diopter measurement position F1.

14. The bi-aspherical type progressive-power lens according to any one of claim 9 to claim 13, wherein in a structure of a combination of the first and second refractive surfaces giving the farsightedness diopter (Dl) and the addition diopter (ADD) based on the prescription values and providing as necessary a prism refractive power (PD, an aspherical correction is performed to at least one or more items of occurrence of astigmatism and a diopter error and occurrence of distortion of an image in a peripheral visual field, due to the fact that the sight line in a wearing state and a lens surface can not intersect at right angles.

15. A method of designing a bi-aspherical type progressive-power lens with a progressive refractive power action dividedly allotted to a first refractive surface being an object side surface and a second refractive surface being an eyeball side surface, wherein
when on the first refractive surface, a surface refractive power in a horizontal direction and a surface refractive power in a vertical direction, at a nearsightedness diopter measurement position N1, are DHn and DVn respectively, the relation of DHn and DVn is expressed by $DVn-DHn>ADD/2$, and a surface astigmatism component at N1 of the first refractive surface is offset by the second refractive surface, and a combination of the first and second refractive surfaces gives a nearsightedness diopter (Dn) and an addition diopter (ADD) based on prescription values.

16. The method of designing a bi-aspherical type progressive-power lens according to claim 15, wherein
when on the first refractive surface, a surface refractive power in a horizontal direction and a surface refractive power in a vertical direction, at a farsightedness diopter measurement position F1, are DHf and DVf respectively, the relation of DHf and DVf is expressed by $DHf+DHn<DVf+DVn$, and $DVn-DVf>ADD/2$, and $DHn-DHf>ADD/2$, surface astigmatism components at F1 and N1 of the first refractive surface are offset by the second refractive surface, and a combination of the first and second refractive surfaces gives a farsightedness diopter (Df) and an addition diopter (ADD) based on prescription values.

17. The method of designing a bi-aspherical type progressive-power lens according to claim 15 or claim 16, wherein
said first refractive surface is bilaterally symmetrical with respect to one meridian passing through the farsightedness diopter measurement position F1, the second refractive surface is bilaterally asymmetrical with respect to one meridian passing through a farsightedness diopter measurement position F2 of the second refractive surface, and a position of a nearsightedness diopter measurement position N2 on the second refractive surface is shifted inward to a nose by a predetermined distance.

18. The method of designing a bi-aspherical type progressive-power lens according to any one of claim 15 to claim 17, wherein
said first refractive surface is a rotation surface with one meridian passing through the farsightedness diopter measurement position F1 as a generating line, the second refractive surface is bilaterally asymmetrical with respect to one meridian passing through a farsightedness diopter measurement position F2 on the second refractive surface, and a position of a nearsightedness diopter measurement position N2 on the second refractive surface is shifted inward to a nose by a predetermined distance.

19. The method of designing a bi-aspherical type progressive-power lens according to any one of claim 15 to claim 17, wherein
on the first refractive surface, a sectional curve in the horizontal direction passing through the farsightedness diopter measurement position F1 is not a perfect circle but has a predetermined refractive power change, and a sectional curve of a cross section in the vertical direction including a normal line at an arbitrary position on the sectional curve in the horizontal direction is substantially the same as a meridian passing through the farsightedness diopter measurement position F1.

20. The method of designing a bi-aspherical type progressive-power lens according to any one of claim 15 to claim 19, wherein in a structure of a combination of the first and second refractive surfaces giving the farsightedness diopter (Df) and the addition diopter (ADD) based on the prescription values and providing as necessary a prism refractive power (PD, an aspherical correction is performed to at least one or more items of occurrence of astigmatism and a diopter error and occurrence of distortion of an image in a peripheral visual field, due to the fact that a sight line and a lens surface in a wearing state intersect at right angles.

21. A bi-aspherical type progressive-power lens with a progressive refractive power action dividedly allotted to a first refractive surface being an object side surface and a second refractive surface being an eyeball side surface, wherein
when a surface refractive power in a horizontal direction and a surface refractive power in a vertical direction, at a far vision diopter measurement position F1 on the first refractive surface, are DHf and DVf respectively, and
a surface refractive power in a horizontal direction and a surface refractive power in a vertical direction, at a near vision diopter measurement position N1 on the first refractive surface, are DHn and DVn respectively, a relational formula is expressed by $DVn-DVf > ADD/2$, surface astigmatism components at F1 and N1 of the first refractive surface are offset by the second refractive surface, and a combination of the first and second refractive surfaces gives an addition diopter (ADD) based on prescription values, and at an arbitrary position in a rectangle surrounded by two horizontal lines positioned at vertically ±4 mm from a center at a position of 50% of a change of the sectional diopter in the vertical direction from F1 to the same height position as N1, the center and the same height position being on the sectional curve in the vertical direction passing through F1, and two vertical lines positioned at horizontally ±15 mm from a vertical straight line passing through F1, an absolute value of a vertical differential value is larger than the absolute value of a horizontal differential value, regarding a differential value of a surface vertical sectional power on said first refractive surface.

22. A bi-aspherical type progressive-power lens with a progressive refractive power action dividedly allotted to a first refractive surface being an object side surface and a second refractive surface being an eyeball side surface, wherein
when a surface refractive power in a horizontal direction and a surface refractive power in a vertical direction, at a far vision diopter measurement position F1 on the first refractive surface, are DHf and DVf respectively, and
a surface refractive power in a horizontal direction and a surface refractive power in a vertical direction, at a near vision diopter measurement position N1 on the first refractive surface, are DHn and DVn respectively, a relational formula is expressed by $DVn-DVf > ADD/2$, surface astigmatism components at F1 and N1 of the first refractive surface are offset by the second refractive surface, and a combination of the first and second refractive surfaces gives an addition diopter (ADD) based on prescription values, and at a arbitrary position in a rectangle surrounded by two horizontal lines positioned at vertically ±4 mm from a center at a position of 50% of a change of the sectional diopter in the vertical direction from F1 to the same height position as N1, the center and the same height position being on the sectional curve in the vertical direction passing through F1, and two vertical lines positioned at horizontally ±15 mm from a vertical straight line passing through F1, an absolute value of a vertical differential value is larger than the absolute value of a horizontal differential value, regarding a differential value of a surface astigmatism amount of said first refractive surface, and at an arbitrary position in said rectangle,
the absolute value of a vertical differential value is larger than the absolute value of a horizontal differential value, regarding the differential value of a surface average diopter on said first refractive surface.

23. A method of designing a bi-aspherical type progressive-power lens with a progressive refractive power action dividedly allotted to a first refractive surface being an object side surface and a second refractive surface being an eyeball side surface, wherein
when a surface refractive power in a horizontal direction and a surface refractive power in a vertical direction, at a far vision diopter measurement position F1 on the first refractive surface, are DHf and DVf respectively, and
a surface refractive power in a horizontal direction and a surface refractive power in a vertical direction, at a near vision diopter measurement position N1 on the first refractive surface, are DHn and DVn respectively, a relational formula is expressed by $DVn - DVf > ADD/2$, surface astigmatism components at F1 and N1 of the first refractive surface are offset by the second refractive surface, and a combination of the first and second refractive surfaces gives an addition diopter (ADD) based on prescription values, and at an arbitrary position in a rectangle surrounded by two horizontal lines positioned at vertically ±4 mm from a center at a position of 50% of a change of the sectional diopter in the vertical direction from F1 to the same height position as N1, the center and the same height position being on the sectional curve in the vertical direction passing through F1, and two vertical lines positioned at horizontally ±15 mm from a vertical straight line passing through F1, an absolute value of a vertical differential value is larger than the absolute value of a horizontal differential value, regarding a differential value of a surface vertical sectional power on said first refractive surface.

24. A method of designing a bi-aspherical type progressive-power lens with a progressive refractive power action dividedly allotted to a first refractive surface being an object side surface and a second refractive surface being an eyeball side surface, wherein when a surface refractive power in a horizontal direction and a surface refractive power in a vertical direction, at a far vision diopter measurement position F1 on the first refractive surface, are DHf and DVf respectively, and a surface refractive power in a horizontal direction and a surface refractive power in a vertical direction, at a near vision diopter measurement position N1 on the first refractive surface, are DHn and DVn respectively, a relational formula is expressed by $DVn - DVf > ADD/2$, surface astigmatism components at F1 and N1 of the first refractive surface are offset by the second refractive surface, and a combination of the first and second refractive surfaces gives an addition diopter (ADD) based on prescription values, and at a arbitrary position in a rectangle surrounded by two horizontal lines positioned at vertically ±4 mm from a center at a position of 50% of a change of the sectional diopter in the vertical direction from F1 to the same height position as N1, the center and the same height position being on the sectional curve in the vertical direction passing through F1, and two vertical lines positioned at horizontally ±15 mm from a vertical straight line passing through F1, an absolute value of a vertical differential value is larger than the absolute value of a horizontal differential value, regarding a differential value of a surfacd astigmatism amount of said first refractive surface, and at an arbitrary position in said rectangle, the absolute value of a vertical differential value is larger than the absolute value of a horizontal differential value, regarding the differential value of a surface average diopter on said first refractive surface.

* * * * *

UNITED STATES PATENT AND TRADEMARK OFFICE
CERTIFICATE OF CORRECTION

PATENT NO. : 7,399,080 B2  Page 1 of 1
APPLICATION NO. : 10/579295
DATED : July 15, 2008
INVENTOR(S) : Akira Kitani, Yoshihiro Kikuchi and Takashi Hatanaka It is certified that error appears in the above-identified patent and that said Letters Patent is hereby corrected as shown below:

In col. 51, lines 8 claim 1, 20 claim 1, 25 claim 1, 28 claim 1, 46 claim 3, 58 claim 3, 63 claim 3 and 66 claim 3, replace "farsightedness" with --far vision--; lines 13 claim 1, 30 claim 1 and 51 claim 3, replace "nearsightedness" with --near vision--; and in line 36 claim 1, replace "transmission astigmatism" with --transmission average diopter--.

In col. 52, lines 17 claim 5, 30 claim 5, 36 claim 5, 40 claim 5 and 58 claim 7, replace "farsightedness" with --far vision--; lines 1 claim 3, 22 claim 5, 42 claim 5 and 63 claim 7, replace "nearsightedness" with --near vision--; and lines 7 claim 4 and 47 claim 6, replace "transmission astigmatism" with --transmission average diopter--.

In col. 53, lines 4 claim 7, 9 claim 8, 13 claim 8, 45 claim 10, 54 claim 10, 59 claim 11 and 62 claim 11, replace "farsightedness" with --far vision--; lines 15 claim 7, 30 claim 9, 39 claim 9 and 64 claim 11, replace "nearsightedness" with --near vision--; line 20 claim 8, replace "transmission astigmatism" with --transmission average diopter--; and line 57 claim 11, delete "or claim 10".

In col. 54, lines 4 claim 12, 7 claim 12, 16 claim 13, 22 claim 13, 27 claim 14, 57 claim 16 and 66 claim 16, replace "farsightedness" with --far vision--; in lines 9 claim 12, 42 claim 15 and 51 claim 15, replace "nearsightedness" with --near vision--; lines 2 claim 12 and 14 claim 13, replace "any of claim 9 to claim 11" with --claim 9--; and line 25 claim 14, replace "any of claim 9 to claim 13" with --claim 9--.

In col. 55, lines 4 claim 17, 7 claim 17, 17 claim 17, 20 claim 17, 30 claim 19, 36 claim 19 and 41 claim 20, replace "farsightedness" with --far vision--; lines 9 claim 17 and 22 claim 18, replace "nearsightedness" with --near vision--; line 2, delete "or claim 16"; lines 14 claim 18 and 27 claim 19, replace "any of claim 15 to claim 17" with --claim 15--; and line 39 claim 20, replace "any of claim 15 to claim 19" with --claim 15--.

Signed and Sealed this

Sixteenth Day of February, 2010

David J. Kappos
*Director of the United States Patent and Trademark Office*